United States Patent
Mishra et al.

(10) Patent No.: US 10,241,953 B2
(45) Date of Patent: Mar. 26, 2019

(54) DYNAMIC DATA-LINK SELECTION OVER COMMON PHYSICAL INTERFACE

(71) Applicant: QUALCOMM Incorporated, San Diego, CA (US)

(72) Inventors: Lalan Jee Mishra, San Diego, CA (US); Richard Dominic Wietfeldt, San Diego, CA (US); James Lionel Panian, San Marcos, CA (US)

(73) Assignee: QUALCOMM Incorporated, San Diego, CA (US)

( * ) Notice: Subject to any disclaimer, the term of this patent is extended or adjusted under 35 U.S.C. 154(b) by 205 days.

(21) Appl. No.: 15/228,877

(22) Filed: Aug. 4, 2016

(65) Prior Publication Data
US 2017/0039162 A1    Feb. 9, 2017

Related U.S. Application Data

(60) Provisional application No. 62/202,658, filed on Aug. 7, 2015, provisional application No. 62/366,538, filed on Jul. 25, 2016.

(51) Int. Cl.
*G06F 13/42* (2006.01)
*G06F 13/38* (2006.01)

(52) U.S. Cl.
CPC ........ *G06F 13/4282* (2013.01); *G06F 13/385* (2013.01)

(58) Field of Classification Search
CPC ............................ G06F 13/4282; G06F 13/385
See application file for complete search history.

(56) References Cited

U.S. PATENT DOCUMENTS

| 9,025,960 | B2 | 5/2015 | Fang et al. | |
|---|---|---|---|---|
| 9,065,699 | B2 | 6/2015 | Stratigos, Jr. | |
| 2003/0061431 | A1* | 3/2003 | Mears | G06F 13/28 710/305 |
| 2006/0149881 | A1* | 7/2006 | Clayton | G06F 13/385 710/302 |
| 2009/0037621 | A1* | 2/2009 | Boomer | G06F 13/4045 710/60 |

(Continued)

FOREIGN PATENT DOCUMENTS

CN          102650975 A       8/2012

OTHER PUBLICATIONS

International Search Report and Written Opinion—PCT/US2016/045902—ISA/EPO—dated Nov. 11, 2016.

*Primary Examiner* — Farley Abad
*Assistant Examiner* — Henry W Yu
(74) *Attorney, Agent, or Firm* — Loza & Loza LLP

(57) ABSTRACT

A hybrid virtual general purpose input/output (VGI) architecture is provided including a pair of devices coupled through a high-speed cable. The architecture enables a device to communicate sideband signals through the high-speed cable using two pins coupled to respective interconnects of a bus. In an aspect, the architecture may implement link selection without protocol consolidation where the device may configure the two pins for I2C (or I3C) signaling or VGI signaling. In another aspect, the architecture may implement link bridging with protocol consolidation where the device may transmit (or receive) I2C (or I3C) signals through the high-speed cable using a VGI communication protocol.

39 Claims, 30 Drawing Sheets

(56) References Cited

U.S. PATENT DOCUMENTS

| | | | |
|---|---|---|---|
| 2013/0080677 A1* | 3/2013 | Simmons | G06F 13/4068 710/316 |
| 2014/0108679 A1 | 4/2014 | Mishra et al. | |
| 2016/0077995 A1 | 3/2016 | Mishra et al. | |
| 2016/0135241 A1 | 5/2016 | Gujral et al. | |

* cited by examiner

VGI Function Header Table ~ 915

| Code | D0 | D1 | D2 | D3 | D4 | D5 | D6 | D7 | Hex Value | Function |
|---|---|---|---|---|---|---|---|---|---|---|
| Code-0 | 0 | 0 | 0 | 0 | 0 | 0 | 0 | 0 | 0x00 | Soft Reset |
| Code-1 | 1 | 0 | 0 | 0 | 1 | 1 | 1 | 0 | 0x71 | Broadcast |
| Code-2 | 0 | 1 | 0 | 0 | 1 | 0 | 1 | 1 | 0xD2 | Addressed I/O Packet |
| Code-3 | 0 | 0 | 1 | 0 | 1 | 1 | 0 | 1 | 0xB4 | Addressed Message Packet |
| Code-4 | 0 | 0 | 0 | 1 | 0 | 1 | 1 | 1 | 0xE8 | Addressed FCOM |
| Code-5 | 1 | 1 | 0 | 0 | 0 | 1 | 0 | 1 | 0xA3 | RFU |
| Code-6 | 1 | 0 | 1 | 0 | 0 | 0 | 1 | 1 | 0xC5 | Addressed ACK |
| Code-7 | 1 | 0 | 0 | 1 | 1 | 0 | 0 | 1 | 0x99 | Direct ACK |
| Code-8 | 0 | 1 | 1 | 0 | 1 | 1 | 0 | 0 | 0x66 | Direct NACK |
| Code-9 | 0 | 1 | 0 | 1 | 1 | 1 | 0 | 0 | 0x3A | Addressed NACK |
| Code-10 | 0 | 0 | 1 | 1 | 0 | 1 | 0 | 0 | 0x5C | RFU |
| Code-11 | 1 | 1 | 1 | 0 | 0 | 0 | 1 | 0 | 0x27 | Direct FCOM |
| Code-12 | 1 | 1 | 0 | 1 | 0 | 0 | 1 | 0 | 0x4B | Direct Message Packet |
| Code-13 | 1 | 0 | 1 | 1 | 0 | 1 | 0 | 0 | 0x2D | Direct I/O Packet |
| Code-14 | 0 | 1 | 1 | 1 | 1 | 0 | 0 | 1 | 0x8E | Listen Only Query |
| Code-15 | 1 | 1 | 1 | 1 | 1 | 1 | 1 | 1 | 0xFF | Lowest Speed Mode |

DYNAMIC DATA-LINK SELECTION OVER COMMON PHYSICAL INTERFACE

CLAIM OF PRIORITY UNDER 35 U.S.C. § 119

The present Application for Patent claims priority to U.S. Provisional Application No. 62/202,658 entitled "DYNAMIC DATA-LINK SELECTION OVER COMMON PHYSICAL INTERFACE" filed Aug. 7, 2015, and to U.S. Provisional Application No. 62/366,538 entitled "DYNAMIC DATA-LINK SELECTION OVER COMMON PHYSICAL INTERFACE" filed Jul. 25, 2016, which are assigned to the assignee hereof and hereby expressly incorporated by reference herein.

INTRODUCTION cl Field of the Disclosure

The present disclosure relates generally to dynamic data-link selection over a common physical interface.

Background

General purpose input/output (GPIO) enables an integrated circuit designer to provide generic pins that may be customized for particular applications. For example, a GPIO pin is programmable to be either an output or an input pin depending upon a user's needs. A GPIO circuit or peripheral will typically control groups of pins which can vary based on the interface requirement. Because of the programmability of GPIO pins, they are commonly included in microprocessor and microcontroller applications. For example, an applications processor in mobile devices may use a number of GPIO pins to conduct handshake signaling such as inter-processor communication (IPC) with a modem processor.

With regard to such handshake signaling, a sideband signal is deemed as "symmetric" if it must be both transmitted and received by a processor. If there are n symmetric sideband signals that need to be exchanged, each processor requires n*2 GPIOs (one GPIO to transmit a given signal and one GPIO to receive that signal). For example, a symmetric IPC interface between a modem processor and an application processor may comprise five signals, which translates to 10 GPIO pins being necessary for the resulting IPC signaling. The need for so many GPIO pins for IPC communication increases manufacturing cost. Moreover, devoting too many GPIOs for IPC limits the GPIO availability for other system-level peripheral interfaces. The problem cannot be solved by moving the IPC communication onto the main data bus between the processors in that certain corner conditions may be violated.

SUMMARY

The following presents a simplified summary of some aspects of the disclosure to provide a basic understanding of such aspects. This summary is not an extensive overview of all contemplated features of the disclosure, and is intended neither to identify key or critical elements of all aspects of the disclosure nor to delineate the scope of any or all aspects of the disclosure. Its sole purpose is to present various concepts of some aspects of the disclosure in a simplified form as a prelude to the more detailed description that is presented later.

In an aspect of the disclosure, an apparatus is provided. The apparatus includes a communication interface circuit and a processing circuit. The processing circuit is configured to via the communication interface circuit detect at least one of first data to be transmitted to a first device using a serial bus communication protocol or second data to be transmitted to a second device using a virtual general purpose input/output communication protocol, determine whether to transmit the first data or the second data, configure a physical interconnect line coupled to the apparatus for either the serial bus communication protocol or the virtual general purpose input/output communication protocol based on the determination, and transmit, through the physical interconnect line, the first data to the first device using the serial bus communication protocol or the second data to the second device using the virtual general purpose input/output communication protocol. In an aspect, the processing circuit configures the physical interconnect line by coupling one of a first communication module that includes the first data or a second communication module that includes the second data to the physical interconnect line. In an aspect, the processing circuit determines whether to transmit the first data or the second data through the physical interconnect line based on a priority setting. In an aspect, at least a portion of the physical interconnect line is configured in a cable that couples a host device to a remote device. In an aspect, the first data comprises a set of I2C signals, and the second data comprises a set of general purpose input/output signals. In an aspect, the processing circuit configured to detect the at least one of first data to be transmitted to the first device using the serial bus communication protocol or the second data to be transmitted to the second device using the virtual general purpose input/output communication protocol is further configured to monitor a first communication module for a transmission attempt of the first data and monitor a second communication module for a transmission attempt of the second data. In an aspect, the processing circuit is further configured to determine at least one of an amount of data transmitted through the physical interconnect during a transmission or an amount of time of the transmission, and reconfigure the physical interconnect line coupled to the apparatus for either the serial bus communication protocol or the virtual general purpose input/output communication protocol when the amount of data exceeds a first threshold or when the amount of time exceeds a second threshold. In an aspect, the processing circuit is further configured to receive, through the physical interconnect line, third data from the first device using the serial bus communication protocol or fourth data from the second device using the virtual general purpose input/output communication protocol. In an aspect, the first device is a memory device situated in a cable that couples a host device to a remote device, wherein at least a portion of the physical interconnect line is configured in the cable, and wherein the third data is stored in the first device and comprises configuration data associated with the cable.

In an aspect of the disclosure, an apparatus is provided. The apparatus comprising means for detecting at least one of first data to be transmitted to a first device using a serial bus communication protocol or second data to be transmitted to a second device using a virtual general purpose input/output communication protocol, means for determining whether to transmit the first data or the second data, means for configuring a physical interconnect line coupled to the apparatus for either the serial bus communication protocol or the virtual general purpose input/output communication protocol based on the determination, and means for transmitting, through the physical interconnect line, the first data to the first device using the serial bus communication protocol or the second data to the second device using the virtual general purpose input/output communication protocol. In an aspect, the apparatus further comprises means for determining at least one of an amount of data transmitted through the physical interconnect during a transmission or an amount of time of the transmission, and means for reconfiguring the physical interconnect line coupled to the apparatus for either the serial bus communication protocol or the virtual general purpose input/output communication protocol when the amount of data exceeds a first threshold or when the amount of time exceeds a second threshold. In an aspect, the apparatus further comprises means for receiving, through the physical interconnect line, third data from the first device using the serial bus communication protocol or fourth data from the second device using the virtual general purpose input/output communication protocol.

In an aspect of the disclosure, an apparatus is provided. The apparatus includes a communication interface circuit and a processing circuit. The processing circuit is configured to via the communication interface circuit obtain first data configured for transmission to a first device using a serial bus communication protocol, store the first data in a first message register associated with the serial bus communication protocol, wherein the first message register is mapped to a second message register at a second device, the second message register associated with the serial bus communication protocol, and transmit the first data to the second message register at the second device through a physical interconnect line using a virtual general purpose input/output communication protocol. In an aspect, the processing circuit is further configured to obtain second data configured for transmission to a second device using a virtual general purpose input/output communication protocol, wherein the first data comprises a set of I2C signals, and the second data comprises a set of general purpose input/output signals, store the second data in a first register associated with the virtual general purpose input/output communication protocol, wherein the first register is mapped to a second register at the second device, the second register associated with the virtual general purpose input/output communication protocol, and transmit the second data to the second register at the second device through the physical interconnect line using a virtual general purpose input/output communication protocol. In an aspect, the first data is tunneled to the second message register in a message associated with the virtual general purpose input/output communication protocol. In an aspect, the processing circuit is configured to transmit the first data using virtual general input/output signals in a first frame, and wherein the processing circuit is configured to transmit the second data using virtual general input/output signals in a second frame. In an aspect, the first frame includes a first header that identifies the first frame as a messaging frame, and the second frame includes a second header that identifies the second frame as a virtual general purpose input/output frame. In an aspect, at least a portion of the physical interconnect line is configured in a cable that couples a host device to a remote device. In an aspect, the first device is a memory device situated in a cable that couples a host device to a remote device, wherein at least a portion of the physical interconnect line is configured in the cable.

In an aspect of the disclosure, an apparatus is provided. The apparatus comprising means for obtaining first data configured for transmission to a first device using a serial bus communication protocol, means for storing the first data in a first message register associated with the serial bus communication protocol, wherein the first message register is mapped to a second message register at a second device, the second message register associated with the serial bus communication protocol, and means for transmitting the first data to the second message register at the second device through a physical interconnect line using a virtual general purpose input/output communication protocol. In an aspect, the apparatus further comprises means for obtaining second data configured for transmission to a second device using a virtual general purpose input/output communication protocol, wherein the first data comprises a set of I2C signals, and the second data comprises a set of general purpose input/output signals, means for storing the second data in a first register associated with the virtual general purpose input/output communication protocol, wherein the first register is mapped to a second register at the second device, the second register associated with the virtual general purpose input/output communication protocol, and means for transmitting the second data to the second register at the second device through the physical interconnect line using a virtual general purpose input/output communication protocol.

In an aspect of the disclosure, an apparatus is provided. The apparatus includes a communication interface circuit and a processing circuit. The processing circuit is configured to via the communication interface circuit obtain first data configured for transmission to a second device using a virtual general purpose input/output communication protocol, wherein the apparatus is coupled to the second device through a cable, store the first data in a first message tunneling register at the apparatus, and transmit the first data to a second message tunneling register at the second device using a virtual general purpose input/output communication protocol, wherein the first data is forwarded by one or more intermediate devices situated in the cable until the first data is received at the second message tunneling register. In an aspect, the processing circuit is further configured to obtain second data configured for transmission to an intermediate device of the one or more intermediate devices using a virtual general purpose input/output communication protocol, store the second data in the first message tunneling register at the apparatus, obtain a node identifier associated with the intermediate device, and transmit the second data and the node identifier to a third message tunneling register at the intermediate device using a virtual general purpose input/output communication protocol, wherein the second data is forwarded by the one or more intermediate devices situated in the cable until the second data is received at the intermediate device associated with the node identifier.

In an aspect of the disclosure, an apparatus is provided. The apparatus comprising means for obtaining first data configured for transmission to a second device using a virtual general purpose input/output communication protocol, wherein the apparatus is coupled to the second device through a cable, means for storing the first data in a first message tunneling register at the apparatus, means for transmitting the first data to a second message tunneling register at the second device using a virtual general purpose input/output communication protocol, wherein the first data is forwarded by one or more intermediate devices situated in the cable until the first data is received at the second message tunneling register. In an aspect, the apparatus further comprises means for obtaining second data configured for transmission to an intermediate device of the one or more intermediate devices using a virtual general purpose input/output communication protocol, means for storing the second data in the first message tunneling register at the apparatus, means for obtaining a node identifier associated with the intermediate device, and means for transmitting the second data and the node identifier to a third message tunneling register at the intermediate device using a virtual general purpose input/output communication protocol, wherein the second data is forwarded by the one or more intermediate devices situated in the cable until the second data is received at the intermediate device associated with the node identifier.

A cable for enabling communication between a host device and a peripheral device is provided. The cable includes a first device situated at a first end of the cable, the first device including a first virtual general purpose input/output interface and a second virtual general purpose input/output interface, the first virtual general purpose input/output interface coupled to the host device through a first physical interconnect line. The cable further includes a second device situated at a second end of the cable, the second device including a third virtual general purpose input/output interface and a fourth virtual general purpose input/output interface, the fourth virtual general purpose input/output interface coupled to the peripheral device through a second physical interconnect line, wherein the first and second devices are configured to communicate along a length of the cable via the second and third virtual general purpose input/output interfaces using a virtual general purpose input/output communication protocol, and a third device coupled to the first device, the third device configured to communicate with the first device using a serial bus communication protocol. The first virtual general purpose input/output interface is configured to transmit, to the host device through the first physical interconnect line, data from the third device using either the serial bus communication protocol or using the virtual general purpose input/output communication protocol. In an aspect, the serial bus communication protocol is an I2C protocol and wherein the data comprises a set of I2C signals. In an aspect, the first device is a first retimer circuit, the second device is a second retimer circuit, and the third device is a memory device.

In an aspect of the disclosure, a high-speed cable is provided. The high-speed cable comprising a first virtual GPIO (VGI) interface configured to serially transmit a transmit set of virtual GPIO signals organized into first frames over a dedicated transmit line in a sideband channel, and wherein the first VGI interface is further configured to retrieve a transmit set of I2C signals from messaging signal registers and to serially transmit the transmit set of I2C signals over the dedicate transmit line, and a second virtual GPIO (VGI) interface configured to receive the transmit set of VGIP signals and the transmit set of I2C signals.

In an aspect of the disclosure, a method for an integrated circuit is provided. The method comprising receiving a set of GPIO signals at a virtual GPIO interface in a first device, serially transmitting over a dedicated transmit pin the set of GPIO signals to a high-speed cable as first virtual GPIO signals in first frames, wherein each first frame includes a first header that identifies the first frame as a virtual GPIO frame, receiving a set of I2C signals at the virtual GPIO interface, and serially transmitting the set of I2C signals over the dedicated transmit pin to the high-speed cable as second virtual GPIO signals in second frames, wherein each second frame includes a second header that identifies the second frame as a messaging frame. In an aspect, the method further comprises transmitting PCI express signals over a main channel in the high-speed cable from the first device to the remote device.

In an aspect of the disclosure, a method for an integrated circuit is provided. The method comprising receiving a set of GPIO signals at a virtual GPIO interface in a first device, serializing the set of GPIO signals into a virtual GPIO frame, selecting, at a multiplexer in the first device, for the virtual GPIO frame, serially transmitting, from the multiplexer, the virtual GPIO frame over a dedicated transmit pin to a high-speed cable, selecting, at the multiplexer, for a frame of I2C signals, and serially transmitting, from the multiplexer, the I2C frame over the dedicated transmit pin to the high-speed cable.

These and other aspects of the disclosure will become more fully understood upon a review of the detailed description, which follows. Other aspects, features, and implementations of the disclosure will become apparent to those of ordinary skill in the art, upon reviewing the following description of specific implementations of the disclosure in conjunction with the accompanying figures. While features of the disclosure may be discussed relative to certain implementations and figures below, all implementations of the disclosure can include one or more of the advantageous features discussed herein. In other words, while one or more implementations may be discussed as having certain advantageous features, one or more of such features may also be used in accordance with the various implementations of the disclosure discussed herein. In similar fashion, while certain implementations may be discussed below as device, system, or method implementations it should be understood that such implementations can be implemented in various devices, systems, and methods.

DRAWINGS

Various features, nature and advantages may become apparent from the detailed description set forth below when taken in conjunction with the drawings in which like reference characters identify correspondingly throughout.

FIG. 14 illustrates some example code words for the header in the enhanced VGI hybrid frame of FIG. 13.

DETAILED DESCRIPTION

Figure 1:
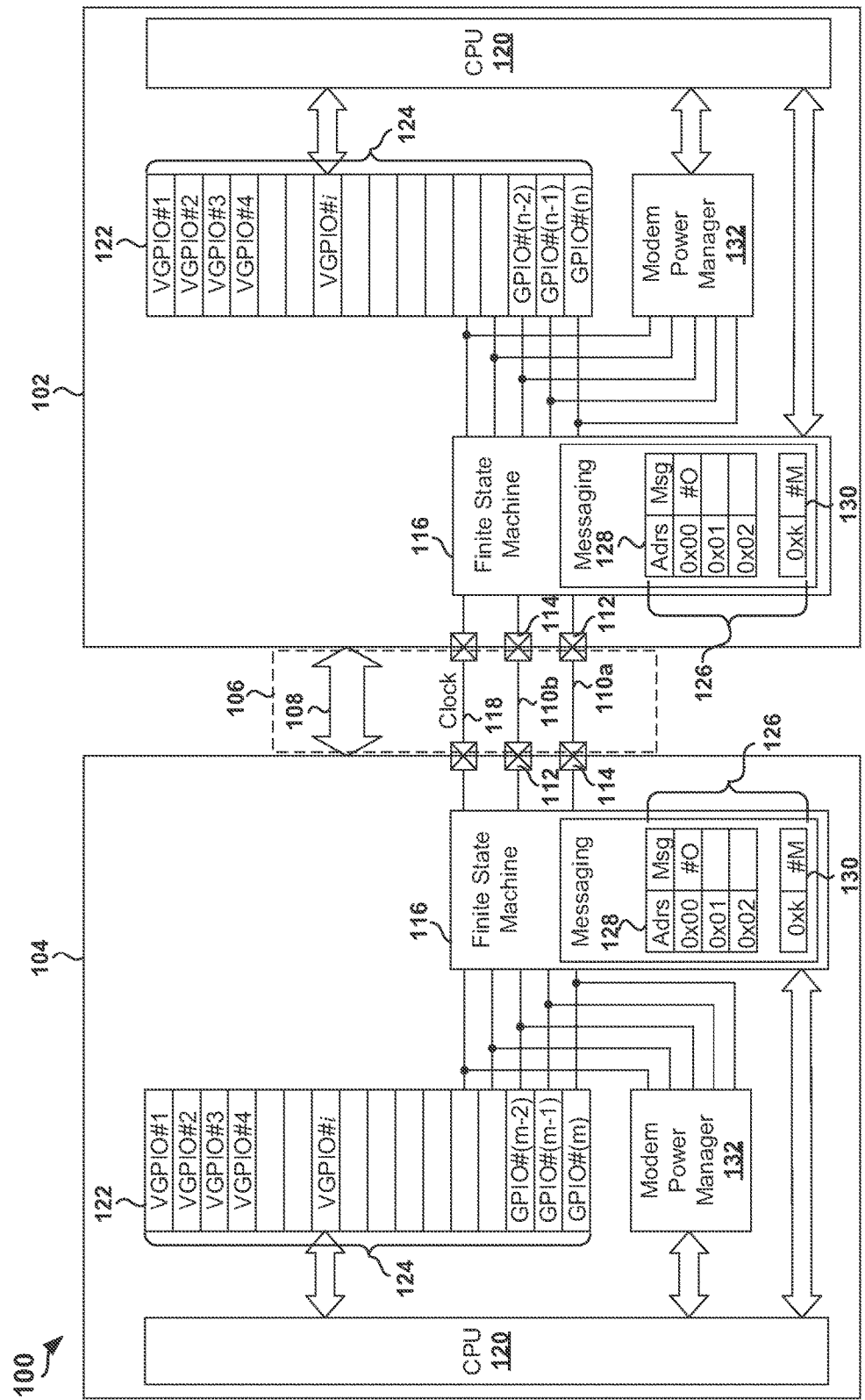
FIG. 1 is block diagram of an example hybrid virtual GPIO architecture.

In the following description, specific details are given to provide a thorough understanding of the embodiments. However, it will be understood by one of ordinary skill in the art that the embodiments may be practiced without these specific detail. For example, circuits may be shown in block diagrams in order not to obscure the embodiments in unnecessary detail. In other instances, well-known circuits, structures and techniques may not be shown in detail in order not to obscure the embodiments.

Virtual GPIO (VGI) circuits and techniques have been developed in which a plurality of GPIO signals are serialized as "virtual" GPIO signals and transmitted over a transmit pin from a transmitting device to a receive pin on a receiving device. The receiving device deserializes the received virtual GPIO signals into GPIO signals and presents them to a GPIO interface. The GPIO interface may then interrupt its host processor with the status of any changed GPIO signals that trigger such an interrupt. A VGI system may therefore provide substantial pin savings. Given its pin savings, VGI in combination with an Inter-Integrated Circuit interface (I2C interface) has been proposed to accommodate the sideband signaling in high-speed cables such as a Peripheral Component Interface express (PCIe) as approved by the PCI Special Interest Group (PCI-SIG). However, the I2C clock and data lines in an I2C interface demand two separate pins at each end of the high-speed cable.

In an aspect of the present disclosure, a dynamic data-link selection architecture is provided for sideband signaling across a high-speed cable. For example, the high-speed cable may be used to couple a first device (e.g., a host device, such as a system on chip (SoC)) to a second device (e.g., a peripheral device) to enable communication between the first and second devices. The high-speed cable may include a main band channel, such as a Peripheral Component Interconnect Express (PCIe) main band. Since the use of this main band channel is conventional, the following discussion will focus on the sideband signaling in a separate sideband channel in the high-speed cable. As previously mentioned, the high-speed cable couples between two devices, and each of the devices may include the dynamic data-link selection architecture. One data-link selection by the dynamic data-link selection architecture selects for a virtual general purpose input/output (GPIO) protocol (also referred to as a virtual general purpose input/output communication protocol) using a virtual GPIO (VGI) interface that enables a device to use a pair of pins as if they constituted a larger plurality of GPIO pins. Another selection by the dynamic data-link selection architecture selects for an alternative data-link protocol. The following discussion will assume that this alternative data-link protocol includes the Inter-Integrated Circuit (I2C) communication protocol, but it can be appreciated that this additional data link protocol may comprise alternative serial data communication protocols, such as the I3C protocol. The dynamic data-link selection architecture may have a protocol consolidation aspect or it may have a no-protocol-consolidation aspect.

Overview of Protocol Consolidation

I2C signals are an example of messaging signals. As used herein, the phrase "messaging signals" refers to signals that would conventionally be transmitted over a dedicated transmit pin, such as practiced in the Inter-Processor Communication (IPC) or Serial Peripheral Interface (SPI) protocols. Therefore, messaging signals may include an address so that the receiving processor may route the received messaging signal to the appropriate register. In contrast, GPIO signals are conventionally transmitted and received over dedicated pins such that no addresses need be associated with the GPIO signals. As will be explained further herein, a VGI interface serializes GPIO signals into serialized virtual GPIO signals that are transmitted over a common transmit pin. Therefore, two devices may each have a VGI interface and may agree upon a frame structure for the virtual GPIO signaling. A transmitting and receiving VGI device may determine the identity of a GPIO signal by its location within a virtual GPIO frame.

The virtual GPIO architecture is deemed as "virtual" in that, to the system-level applications creating the virtual GPIO signals, it is as if those virtual GPIO signals were being accommodated for input/output on conventional GPIO pins. In other words, an SoC or processor having the virtual GPIO architecture disclosed herein experiences no functional difference between GPIO signals and virtual GPIO signals. However, only two pins are used to transmit and receive the virtual GPIO signals that would otherwise each need their own dedicated pair of GPIO pins (if the GPIO signal is symmetric). In a protocol tunneling aspect, the virtual GPIO architecture may be deemed as "hybrid" in that the dedicated transmit pin that is used to transmit the virtual GPIO signals is also used to transmit the messaging signals to a remote processor. Similarly, the dedicated receive pin that is used to receive the virtual GPIO signals is also used to receive the messaging signals from the remote processor.

The virtual GPIO signals disclosed herein will be discussed with regard to accommodating IPC between a first device and a second device over the sideband channel in the high-speed cable. However, it will be appreciated that the virtual GPIO circuits and techniques disclosed herein are widely applicable to SoC or application specific integrated circuits (ASICs) requiring GPIO capabilities.

The disclosed hybrid virtual GPIO architecture makes the health of the transmitting device transparent to the receiving device. This may be advantageous during the debugging stage for software implementation as it indicates to the receiving device the time that a transmitting device became inoperative. To enable such a robust virtual GPIO capability, each device/integrated circuit includes a dedicated transmit pin coupled to a transmit line in the sideband channel of the high-speed cable, and a dedicated receive pin coupled to a receive line in the sideband channel of the high-speed cable. In that regard, the virtual GPIO signals may be divided into a transmit set for transmission over the transmit line and a receive set for reception on the receive line. If the signaling is symmetric, the number of signals in the transmit set for each processor is the same. However, the hybrid virtual GPIO architecture disclosed herein can accommodate asymmetric signaling in which the transmit set of virtual GPIO signals for one processor is not the same size as the transmit set for a remote processor. Analogous to the virtual GPIO signals, the messaging signals are also transmitted over the dedicated transmit pin and received on the dedicated receive pin.

FIG. 1 illustrates a hybrid virtual GPIO architecture 100 including a first device 102 and a second device 104 coupled together through a high-speed cable 106 including a main channel 108, such as a PCEe channel. Since each device couples to a dedicated transmit line and a dedicated receive line, a transmit line 110a within a sideband channel in high-speed cable 106 for the first device 102 is thus the receive line for the second device 104. Similarly, a transmit line 110b for second device 104 is the receive line for first device 102. The first device 102 and the second device 104 may each include a dedicated transmit pin 112 to couple to the corresponding transmit line (e.g., line 110b for second device 104). Similarly, each integrated circuit may include a dedicated receive pin 114 to couple to the corresponding receive line (e.g., line 110a for the second device 104). A finite state machine (FSM) 116 in each of the first device 102 and second device 104 controls transmission and reception using these dedicated lines and pins with regard to an external clock signal 118 from an external clock source, such as a 32 KHz sleep clock.

The first device 102 and the second device 104 each includes a processor 120 (also referred to as a central processing unit (CPU)). Each processor 120 transmits and receives GPIO signals from each hybrid GPIO interface 122 in a conventional fashion. These GPIO signals, however, are not transmitted or received through conventional GPIO pins. Instead, they are transmitted and received as a set of virtual GPIO signals 124 through the corresponding FSM 116 using the dedicated transmit and receive pins. Each FSM 116 also interfaces directly with the corresponding processor with regard to receiving and transmitting messaging signals 126 (e.g., the I2C signals). Since messaging signals 126 are not GPIO signals, they do not couple through the GPIO interfaces. Each FSM 116 transmits and receives messaging signals 126 through its dedicated transmit pin 112 and receive pin 114. These pins are thus "hybrid" pins in that they are used for both virtual GPIO signals 124 and the tunneled messaging signals 126.

It should be noted that the virtual GPIO signals 124 do not each have their own dedicated pins as is the case for conventional GPIO signals. Therefore, the hybrid virtual GPIO architecture 100 may achieve a significant reduction of pins (e.g., on the first device 102 and/or the second device 104) as compared to a conventional GPIO embodiment in which virtual GPIO signals 124 would each require their own pin. Messaging signals 126 would conventionally require another dedicated transmit pin and another dedicated receive pin as well, such as the data and clock pin used for an I2C interface. It can be appreciated that these additional pins may also be eliminated in the hybrid virtual GPIO architecture 100.

Figure 2A:
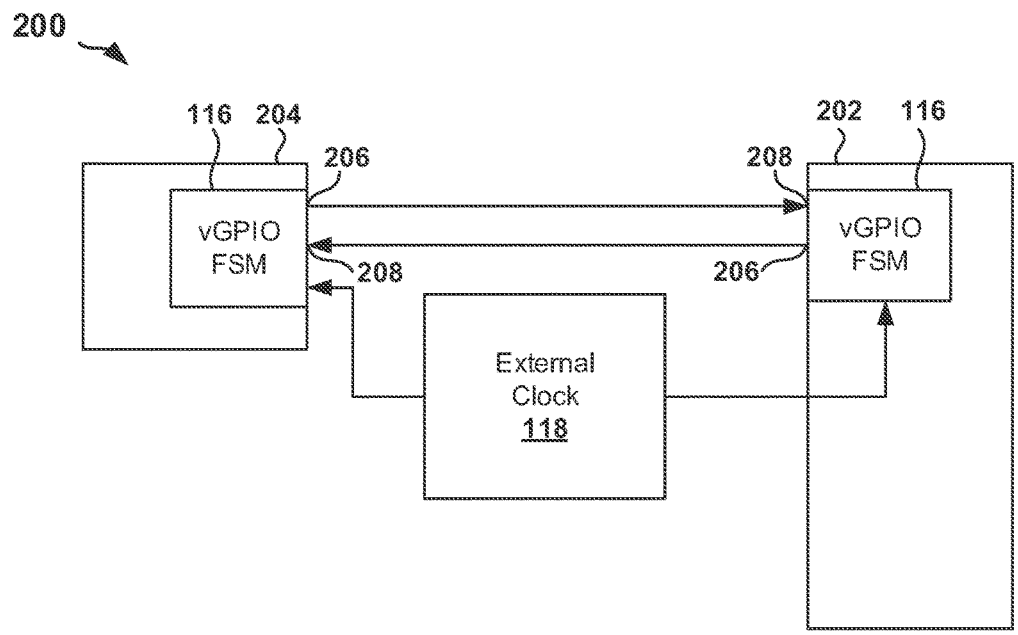
FIG. 2A is a high-level block diagram for a hybrid virtual GPIO architecture in which a processor communicates with a single remote processor.
Figure 2B:
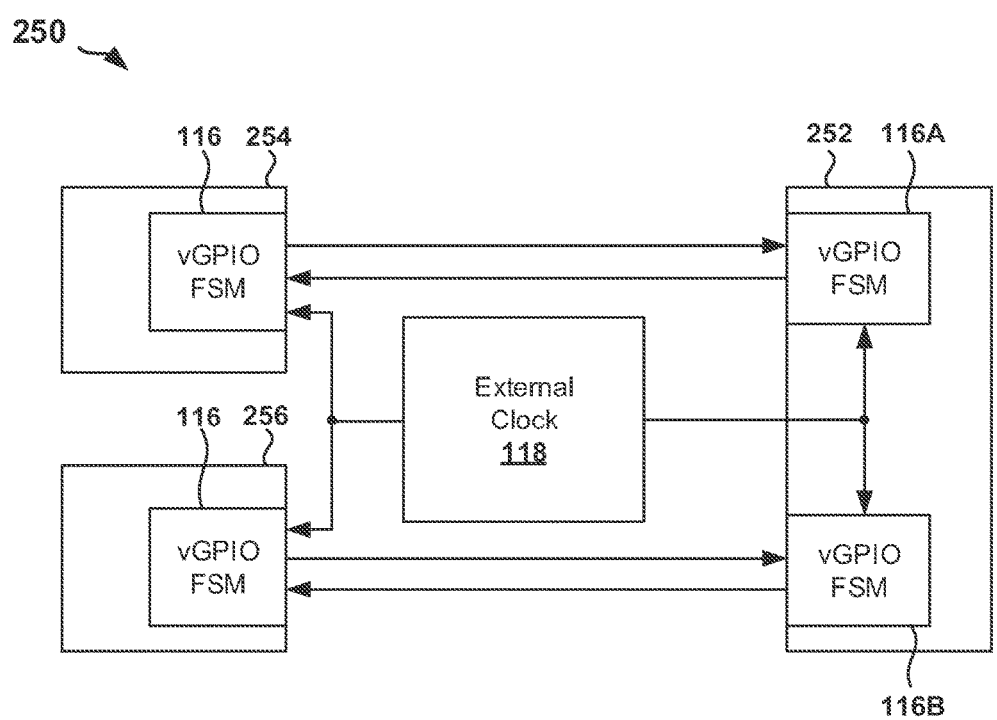
FIG. 2B is a high-level diagram for a hybrid virtual GPIO architecture in which a processor communicates with two remote processors.

An integrated circuit may include just one FSM 116 or may include a plurality of these elements for interfacing with multiple external systems. FIG. 2A illustrates a hybrid virtual GPIO architecture 200 in which a first device 202 includes a single FSM 116 for communicating with a remote device 204, which includes its own FSM 116. In contrast, a device 252 shown in FIG. 2B includes an FSM 116A and an FSM 116B for communicating with remote processors in devices 254 and 256, respectively. In that regard, an SoC, such as the processors discussed herein, may be configured with as many FSMs as is necessary to accommodate hybrid virtual GPIO signaling with other SoCs. Regardless of the number of FSMs a processor may have, each FSM communicates using its own dedicated transmit pin 206 and a receive pin 208 as indicated in FIG. 2A.

Referring again to FIG. 1, because virtual GPIO signals 124 are accommodated using a finite state machine (e.g., FSM 116), the processors 120 of the first and second devices 102, 104 may be asleep or in another type of dormant state and yet be able to receive virtual GPIO signals 124 and messaging signals 126. In this fashion, hybrid virtual GPIO architecture 100 not only advantageously economizes the number of pins for each GPIO interface 122, but also consumes low power.

As used herein, the term "pin" is a generic term that includes a structure, such as a pad or an actual pin that an integrated circuit uses to couple to leads on a circuit board or other physical interconnect (e.g., package interconnect or through-hole via interconnect). Each of the first and second devices 102, 104 may accommodate the input/output interfacing of a plurality of n virtual GPIO signals 124 using lines 110a and 110b, wherein n is an arbitrary integer that is greater than one. Similarly, each of the first and second devices 102, 104 can accommodate the input/output interfacing of a plurality of m messaging signals 126 using lines 110a and 110b, m being a positive integer that is greater than one. Since virtual GPIO signals 124 and messaging signals 126 do not have dedicated pins in contrast to conventional GPIO signals, virtual GPIO signals 124 and messaging signals 126 are serialized in FSMs 116 for transmission on lines 110a and 110b. Upon reception, each FSM 116 deserializes the received serialized virtual GPIO signals and the received serialized messaging signals. Thus, each FSM 116 functions as a serializer/deserializer with regard to virtual GPIO signals 124 and messaging signals 126.

A processor may need to receive an interrupt signal in response to changes in selected ones of the GPIO signals or the messaging signals. With respect to virtual GPIO signals 124 and messaging signals 126, a modem power manager (MPM) 132 monitors the selected GPIO signals or messaging signals as programmed through interrupt configuration registers (not illustrated). Each virtual GPIO signal 124 has a corresponding interrupt configuration register. Should a virtual GPIO signal 124 be required to generate an interrupt in response to that signal changing state, the corresponding configuration register would be programmed accordingly. Similarly, should a virtual GPIO signal 124 or messaging signal 126 be one that does not generate an interrupt regardless of whether that signal has changed state, the corresponding interrupt configuration register would also be programmed accordingly. In some aspects, the MPM 132 may also include a finite state machine. Thus, similar to FSM 116, the MPM 132 is a low power device and is active regardless of whether its processor is in a sleep mode or some other dormant state.

The virtual GPIO signals 124 may be subdivided into a transmit set and a receive set. In a symmetric system, each transmit set would have the same number of signals. Similarly, each receive set would have the same number of signals. However, it can be appreciated that the hybrid virtual GPIO architecture 100 may accommodate an asymmetric signaling configuration in which the transmit sets of virtual GPIO signals 124 and messaging signals 126 have different sizes, and in which the receive sets of GPIO signals 124 and messaging signals 126 also have different sizes. Regardless of whether the hybrid virtual GPIO architecture 100 is symmetric or asymmetric, each FSM 116 receives the transmit set of virtual GPIO signals 124 in parallel from the GPIO interface 122 in the sense that each signal in these transmit sets is carried on its own lead between GPIO interface 122 and FSM 116. The messaging signals are not GPIO signals and thus do not couple through GPIO interface 122. In that regard, the hybrid interface as represented by each FSM 116 may be given some peripheral address by the corresponding processor 120. Each FSM 116 may be configured to decode an address field 128 in the messaging signals 126 so that a given messaging signal 126 may be stored in a corresponding messaging register (e.g., messaging register 130). These messaging registers 130 are each mapped to some offset of the general address for FSM 116 within the address space for a corresponding processor (e.g., processor 120 in the first device 102 or in the second device 104). In response to an interrupt from the MPM 132, the processor 120 can then access messaging registers 130 to obtain the appropriate messaging signals 126. Similar to the virtual GPIO signals 124, messaging signals 126 may be subdivided into a transmission set and a receive set. Regardless of whether the architecture is symmetric or asymmetric, the resulting transmission of these transmit sets by the FSM 116 takes place over a single transmit pin 112. The transmit set of virtual GPIO signals 124 from one processor (e.g., processor 120 of the second device 104) becomes the receive set of virtual GPIO signals 124 for the remote processor (e.g., processor 120 of the first device 102). Similarly, the transmit set of messaging signals 126 becomes the receive set of messaging signals 126 for the remote processor. The FSM 116 of the remote processor then deserializes the receive set of virtual GPIO signals 124 so that they may be presented in parallel to GPIO interface 122.

Each FSM 116 includes configuration registers (not illustrated) that store the previous state for the transmit set of virtual GPIO signals 124 and for messaging signals 126. In this fashion, each FSM 116 can monitor the present state of the transmit set of virtual GPIO signals 124 as received from GPIO interface 122 and only trigger a serial transmission of the corresponding transmit set if the present state has changed with regard to the previous state. In other words, the FSM 116 will trigger a serial transmission of a transmit set only if one or more of the signals within the transmit set has changed state as detected through the storage of the previous state in configuration registers. Each processor 120 knows the addresses for the messaging signal registers 130 and may thus write into them the desired transmit set and may also read any changes in the receive set. The FSM 116 monitors whether the transmit set of messaging signals 126 has changed with respect to their previous transmission and will trigger a transmission of the transmit set to the remote processor accordingly. The MPM 132 monitors whether the receive sets have changed as discussed previously and interrupts the corresponding processor 120 so that the changed receive set may be processed.

Figure 3:
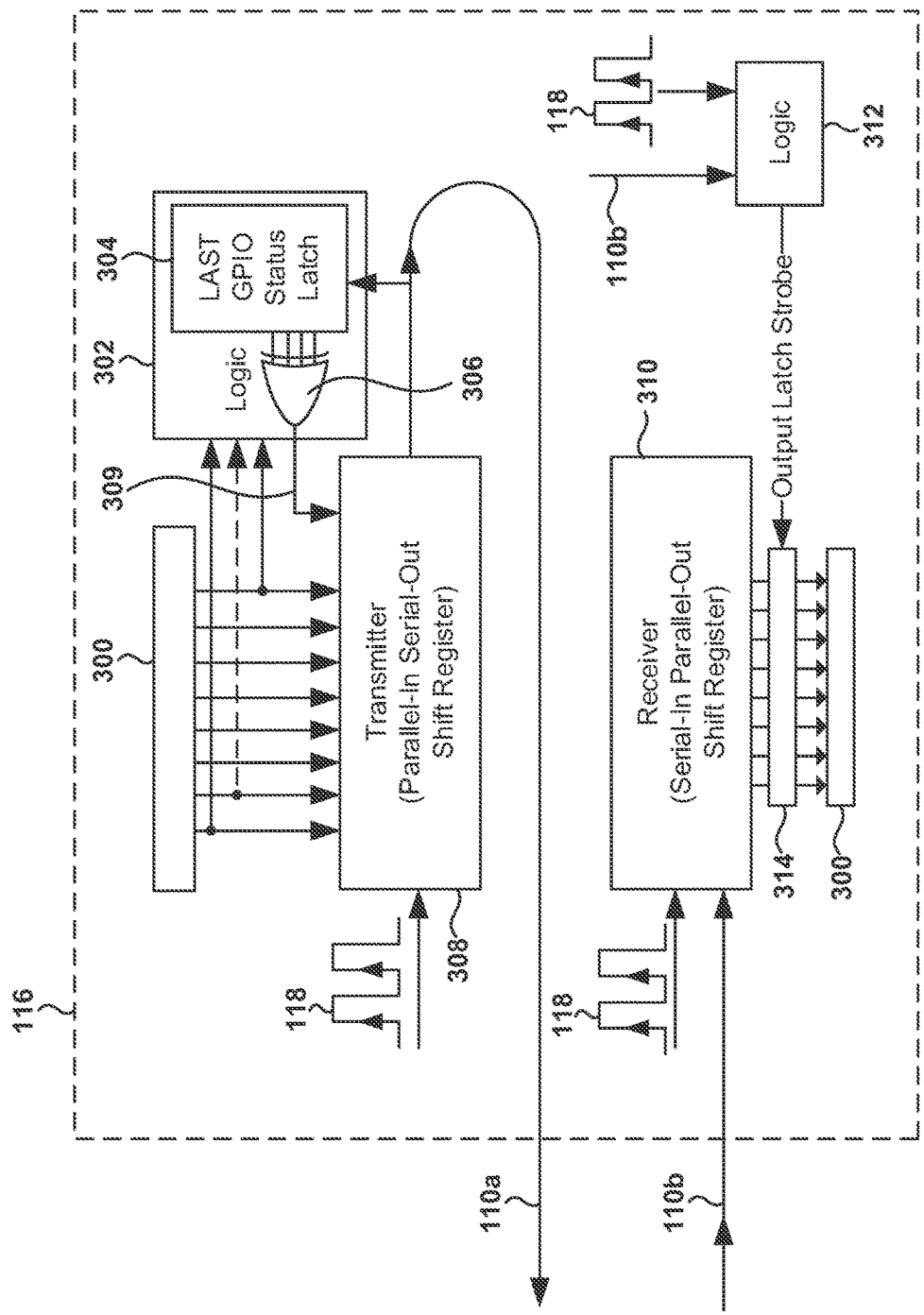
FIG. 3 is a block diagram for a hybrid virtual GPIO finite state machine that responds to an external clock.

As discussed above, each FSM 116 acts as a serializer/deserializer to serialize each transmit set and to deserialize each receive set. FIG. 3 is a block diagram of an FSM 116 to better illustrate these operations. The FSM 116 exchanges the virtual GPIO signals 124 and messaging signals 126 with the corresponding processor 120 through a multiplexing module 300. The multiplexing module 300 interfaces with the corresponding processor through virtual GPIO interface 122 with regard to virtual GPIO signals 124 and interfaces directly with the corresponding processor 120 with regard to messaging signals 126. In one embodiment, each FSM 116 includes a logic circuit 302 that will authorize the transmission of the transmit set of virtual GPIO signals 124 or the transmit set of messaging signals 126 over transmit line 110*a* only if there has been a change in either transmit set. Logic circuit 302 thus compares the current state for the transmit set of virtual GPIO signals 124 (or messaging signals 126) to the previous state for this set of transmit signals as stored in corresponding configuration registers 304. For example, logic circuit 302 may include an XOR gate 306 to perform this comparison. The multiplexing module 300 loads the transmit set in parallel into a parallel-in-serial-out (PISO) shift register 308. If an enable signal 309 from the XOR gate 306 goes high (indicating a change between the current state and the previous state for the transmit set), PISO shift register 308 is enabled to serially shift out its contents onto transmit line 110*a* responsive to cycles of external clock 118.

The FSM 116 also deserializes a receive set of virtual GPIO signals 124 or messaging signals 126 in an analogous fashion using a serial-in-parallel-out (SIPO) shift register 310. The receive set of virtual GPIO signals 124 and messaging signals 126 is generated by the remote processor and transmitted by the remote processor onto receive line 110*b*. This receive set of virtual GPIO signals 124 (or messaging signals 126) is successively shifted into SIPO shift register 310 responsive to cycles of external clock 118. The FSM 116 is configured to transmit the transmit set and to receive the receive set of virtual GPIO signals 124 and messaging signals 126 in frames having a separate start bit and an end bit as discussed further herein.

Figure 4:
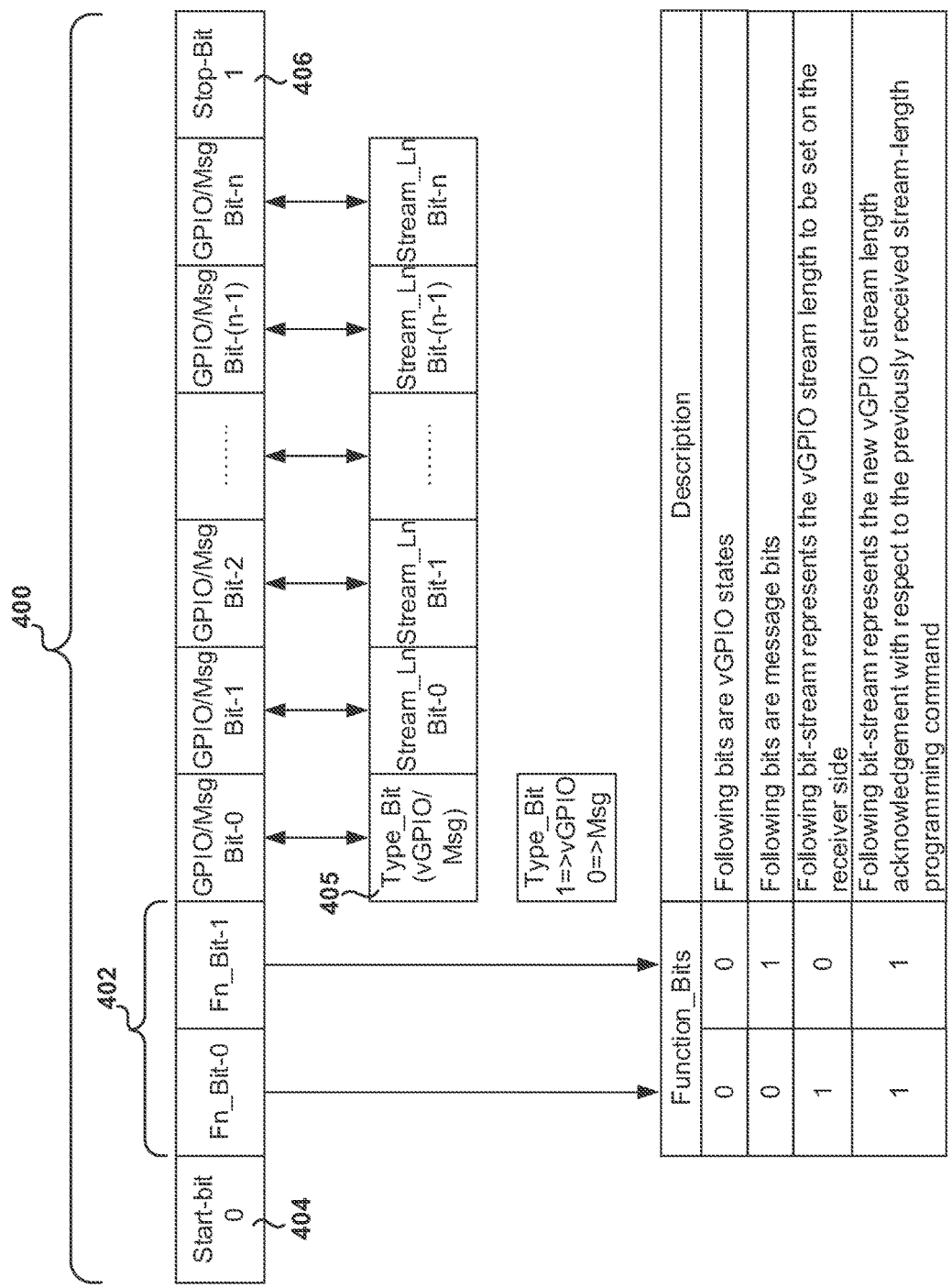
FIG. 4 illustrates the format for a virtual GPIO/messaging signal frame.

The previously discussed frames may have a predefined size. In one embodiment, the frame size is determined by a header to be a certain number of bits in length. An example frame 400 is shown in FIG. 4. A header 402 may include two function bits (e.g., Fn_Bit-0 and Fn_Bit-1 in FIG. 4). In one embodiment, if both function bits have a logic value 0, the following bits are virtual GPIO signals 124. If Fn_Bit-0 has a logic value 0 and Fn_Bit-1 has a logic value 1, then the following bits are messaging signals 126. If Fn_Bit-0 has a logic value 1 and Fn_Bit-1 has a logic value 0, then the following bits represent the virtual GPIO frame length to be expected by the remote processor. Similarly, if both function bits have a logic value 1, the following bits represent an acknowledgement by the remote processor of the desired frame length. If the transmit set of virtual GPIO signals 124 (or the transmit set of messaging signals 126) is less than this fixed frame size, the unused bits within each frame may be don't care values. Alternatively, each FSM 116 may be configured to alter the size of the transmitted frames depending upon the number of bits needed for a given application. It will be appreciated that the preceding discussion of coding using two function bits is merely an example and that other headers and coding protocols may be used to identify whether a frame is carrying virtual GPIO signals 124, messaging signals 126, an identification of the virtual GPIO frame length, an acknowledgment of the virtual GPIO frame length, an identification of the messaging signal frame length, or an acknowledgment of the messaging signal frame length. In one embodiment, frame 400 may also include a type bit (e.g., the Type_Bit 405 in FIG. 4) that is associated with programming and acknowledgement frames as discussed further below. For example, in one embodiment the type bit may be set to a logic value 1 (e.g., logic high) to identify a virtual GPIO frame and may be set to a logic value 0 (e.g., logic low) to identify a messaging signal frame.

The number of frames required to send a transmit set of virtual GPIO signals 124 or messaging signals 126 depends upon the number of signals in the particular transmit set and the frame size. For example, if an example frame size is eight bits and there are ten virtual GPIO signals 124 in a transmit set, then two frames would be required to send that transmit set using the eight-bit frames.

To detect the receipt of a complete frame for the receive set of virtual GPIO signals 124 or messaging signals 126, FSM 116 may include a logic circuit 312 as shown in FIG. 3 that counts the necessary number of cycles for external clock 118 after a receipt of the start bit for the frame. For example, suppose the receive set comprises ten virtual GPIO signals 124 that are received responsive to ten cycles of external clock 118. After detection of the start bit and waiting another ten cycles of external clock 118, logic circuit 312 would then expect receipt of an end bit. Should the end bit be detected accordingly, logic circuit 312 may then strobe an output latch 314 to receive in parallel the receive set of virtual GPIO signals 124 that had been shifted into SIPO shift register 310 as a complete frame. The latched receive set of virtual GPIO signals may then be presented to GPIO interface 122 through multiplexing module 300. Latching of a received set of messaging signals 126 occurs analogously although the received set of messaging signals are loaded into messaging signal registers 130 instead of being routed through GPIO interface 122.

Referring again to PISO shift register 308, it can be appreciated that this register is configured to frame the transmit set of virtual GPIO signals 124 and the messaging signals 126 with the start and end bits. The transmit set of virtual GPIO signals is thus transmitted in frame 400 that is demarcated by the start and end bits 404, 406. Since the transmit set for a transmitting processor becomes the receive set for the remote processor, the receive set is also framed accordingly. This framing is advantageous in that each processor can then monitor the health of the remote processor without needing any additional dedicated pins. For example, each FSM 116 may be configured to weakly pull its dedicated transmit pin 112 (and hence weakly pull transmit line 110*a*) to a supply voltage during a default state (no change in the current state versus the previous state for the transmit set of virtual GPIO signals). The start bit would be a logical zero for such an embodiment such that FSM 116 grounds transmit line 110*a* for transmission of the start bit.

In this fashion, each FSM 116 may readily detect receipt of the start bit by detecting that receive line 110*b* has been pulled to ground. In one embodiment, the start and stop bits are logical complements of each other. The stop bit would thus be a logic high value if the start bit is a logic zero. The payload of the frame may then extend from the type bit to a stop bit 406 that demarcates the frame end.

There is a possibility that a processor may have failed such that it inappropriately pulls its transmit line 110*a* to ground. The remote processor would thus detect this as a start bit and logic circuit 312 would begin counting toward the end of the frame accordingly. However, if the end bit is a logic one, then each FSM 116 charges transmit line 110*a* to the supply voltage to signal the end of a frame transmission. If a processor has failed such that the remote FSM 116 has detected what is deemed to be a start bit, logic circuit 312 will not detect the end bit and will notify its processor of the failure of the remote processor accordingly.

To allow sufficient setup time for reception, transmission of the frame 400 should take place with regard to a first clock edge and reception with regard to a remaining clock edge. For example, the bits in PISO shift register 308 may be shifted out for transmission on transmit line 110*a* responsive to the falling edges or negative edges for external clock 118. Conversely, received bits on receive line 110*b* may be shifted into SIPO shift register 310 responsive to the rising edges or positive edges of clock 118.

For one processor to detect an inactive state in the remote processor, each FSM 116 may be configured to weakly pull its transmit line high in a default state (in which there are no frames to transmit). As discussed previously, the start and stop bits have opposite logical states. A start bit 404 for frame 400 of FIG. 4 may thus have a logic value 0 (ground) such that transmit line 110*a* is pulled low for its transmission, whereas a stop bit 406 may be a logic value 1 such that the transmit line 110*a* is pulled high to a power supply voltage for its transmission. Referring again to FIG. 3, logic circuit 312 is configured to monitor receive line 110*b* with respect to the rising edges on external clock 118. A default logic state of a no-frame transmission is indicated by receive line 110*b* simply remaining high because of its weak pull-up as discussed earlier. Should logic circuit 312 detect at one of rising edges for external clock 118 that receive line 110*b* has been pulled low (indicating the zero value of start bit 404), logic circuit 312 waits for a sufficient number of clock cycles according to the predefined size of frame 400 to then detect the logic high value of stop bit 406. Receipt of stop bit 406 indicates to logic circuit 312 that a complete frame 400 has been fully shifted into SIPO shift register 310. At that point, logic circuit 312 strobes SIPO shift register 310 so that the received frame is provided in parallel to multiplexing module 300 through latch 314. The receive set of virtual GPIO signals (or messaging signals 126) may then be provided to the processor core accordingly through GPIO interface 122.

A relatively slow external clock 118, such as a 32 KHz sleep clock, may be ample for the signaling requirements of IPC. For example, suppose that the minimum setup and hold requirements for the transmission of the virtual GPIO signals 124 and the messaging signals 126 is two nanoseconds each and that the maximum expected lead or lag for receipt of the external clock 118 at an FSM 116 is six nanoseconds. It can be readily shown that the resulting maximum frequency for external clock 118 would be 62 MHz. A 32 KHz frequency, such as from a sleep clock, would thus provide very large margins of safety for such an embodiment. An example method of operation for the hybrid virtual GPIO architecture 100 will now be summarized.

Figure 5:
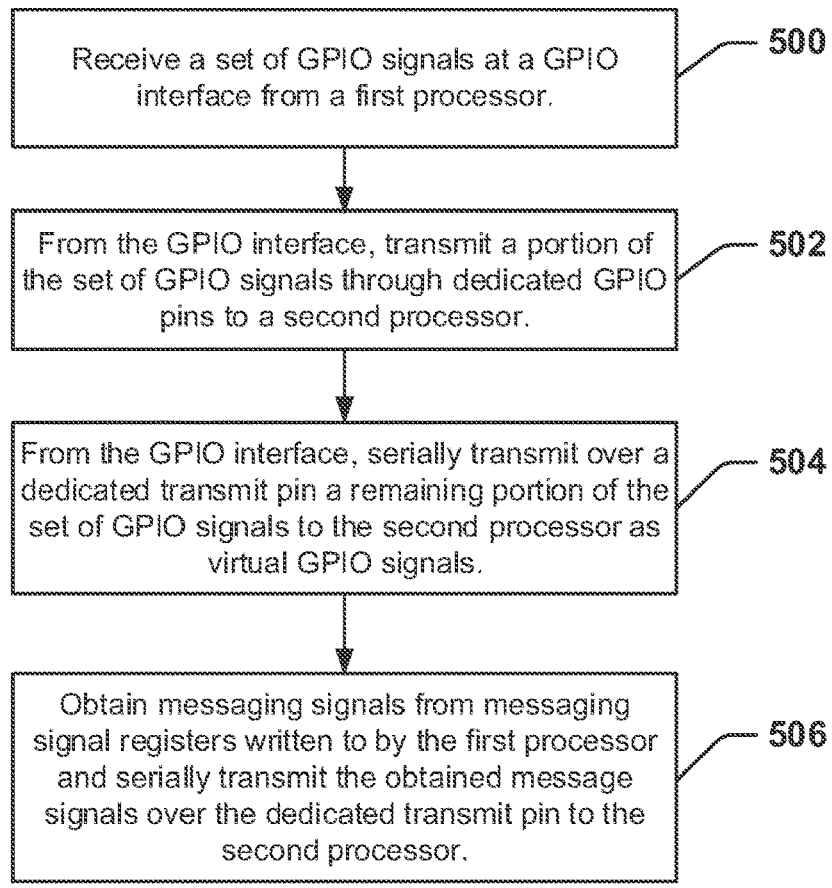
FIG. 5 is a flowchart for a method practiced by the GPIO architecture of FIG. 1.

A method of operation for the hybrid virtual GPIO architecture 100 is summarized in the flowchart of FIG. 5. The method may be performed by a device (e.g., the first device 102). The device may receive a set of GPIO signals at a GPIO interface from a first processor 500. The device may transmit, from the GPIO interface, a portion of the set of GPIO signals through GPIO pins to a second processor 502. For example, the second processor may be a remote processor located in another device (e.g., the second device 104). The device may serially transmit a remaining portion of the set of GPIO signals from the GPIO interface over a dedicated transmit pin to the second processor as virtual GPIO signals 504. The device may retrieve messaging signals from messaging signal registers written to by the first processor and serially transmit the retrieved messaging signals over the dedicated transmit pin to the second processor 506.

Consider the advantages of the disclosed hybrid virtual GPIO architecture 100; only two pins are necessary yet any number of virtual GPIO signals 124 and messaging signals 126 may be serialized and deserialized through the FSMs 116. The number of signals that may be serialized and deserialized may be based on the timing requirements for the virtual GPIO signals 124 with respect to the external clock 118 and any expected amount of clock lag or lead. Moreover, no other pins are necessary to make the health of one processor transparent to the opposing processor.

Figure 6:
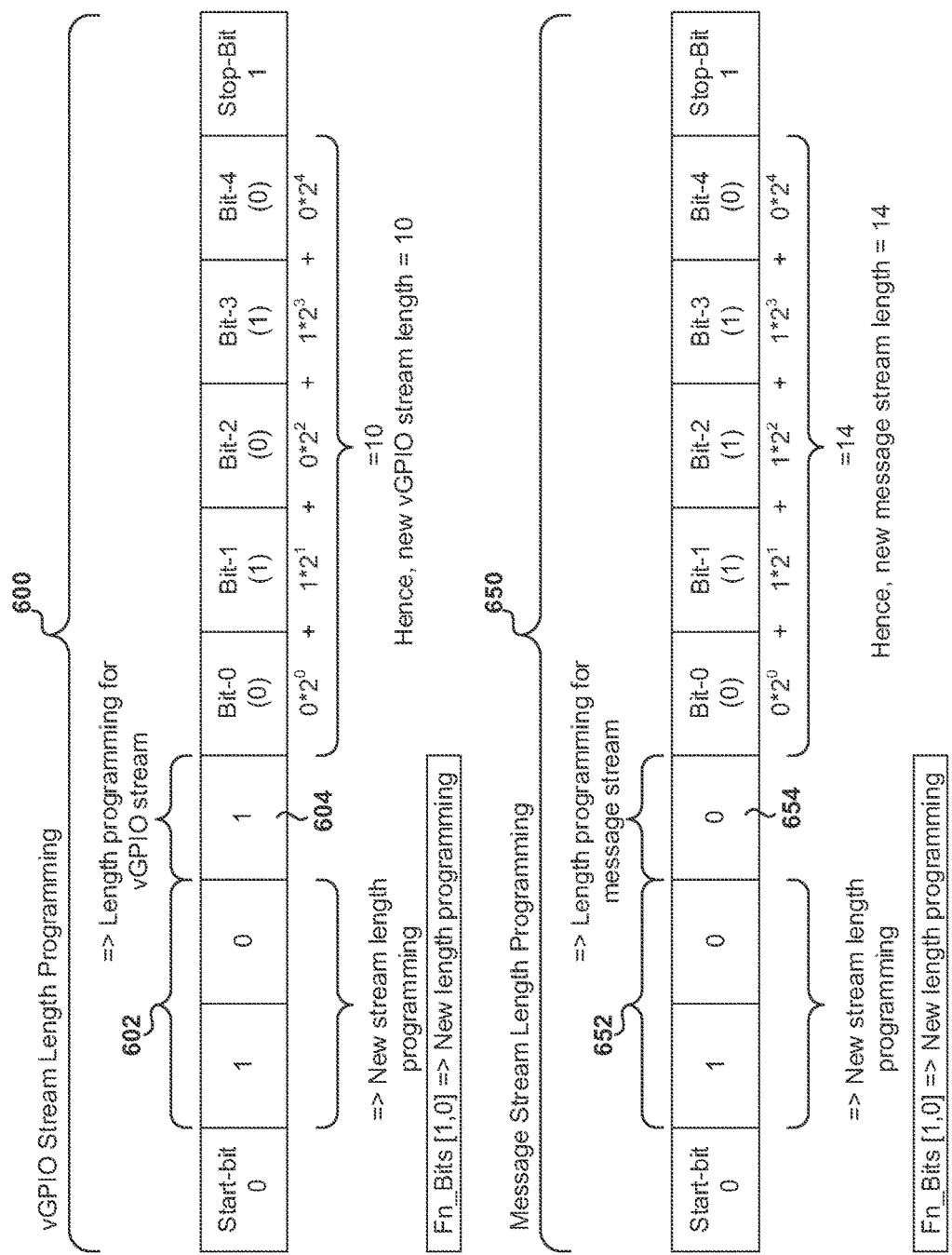
FIG. 6 illustrates length-programming frames used to program the virtual GPIO and messaging frame lengths.

It can be appreciated that with an overhead of two function bits, the frame 400 may be used to transmit various messaging signals 126 and virtual GPIO signals 124 over dedicated transmit pin 112. Example programming frames to set the virtual GPIO frame length (and to set the messaging signal frame length) are shown in FIG. 6. A programming frame 600 sets the virtual GPIO frame length. Similarly, a programming frame 650 sets the messaging signal frame length. The number of bits used to define the frame length (and thus the length of each programming frame) is predefined. Thus, once an FSM 116 sees a header (e.g., header 602, header 652) indicating that a programming length is being set (such as Fn_Bit-0 having a logic value 1 and Fn_Bit-1 having a logic value 0 as discussed previously), then it will read the frame length from the frame body. In that regard, an FSM 116 needs to know whether the length of a virtual GPIO frame or a messaging frame is being programmed. Thus, each header for programming frames (e.g., header 602 for programming frame 600, header 652 for programming frame 650) may be followed by a frame type bit (e.g., frame type bit 604, 654). For example, a frame type bit having a logic value 1 (e.g., frame type bit 604) may indicate that a virtual GPIO frame length is being programmed whereas a frame type bit (e.g., frame type bit 654) having a logic value 0 may indicate that a messaging signal frame length is being programmed. In one embodiment, each programming frame 600, 650 has five programming bits, ranging from a bit-0 to a bit-4. Each bit is the coefficient for a power of 2 as identified by its name. In other words, bit-0 is the coefficient for multiplying $2^0$, bit-1 is the coefficient for multiplying $2^1$, bit-2 is the coefficient for multiplying $2^2$, bit-3 is the coefficient for multiplying $2^3$, and bit-4 is the coefficient for multiplying $2^4$. The five programming bits can thus program a frame length from zero to 31. An additional programming bit would enable the programming of a frame length up to 63, and so on.

Figure 7:
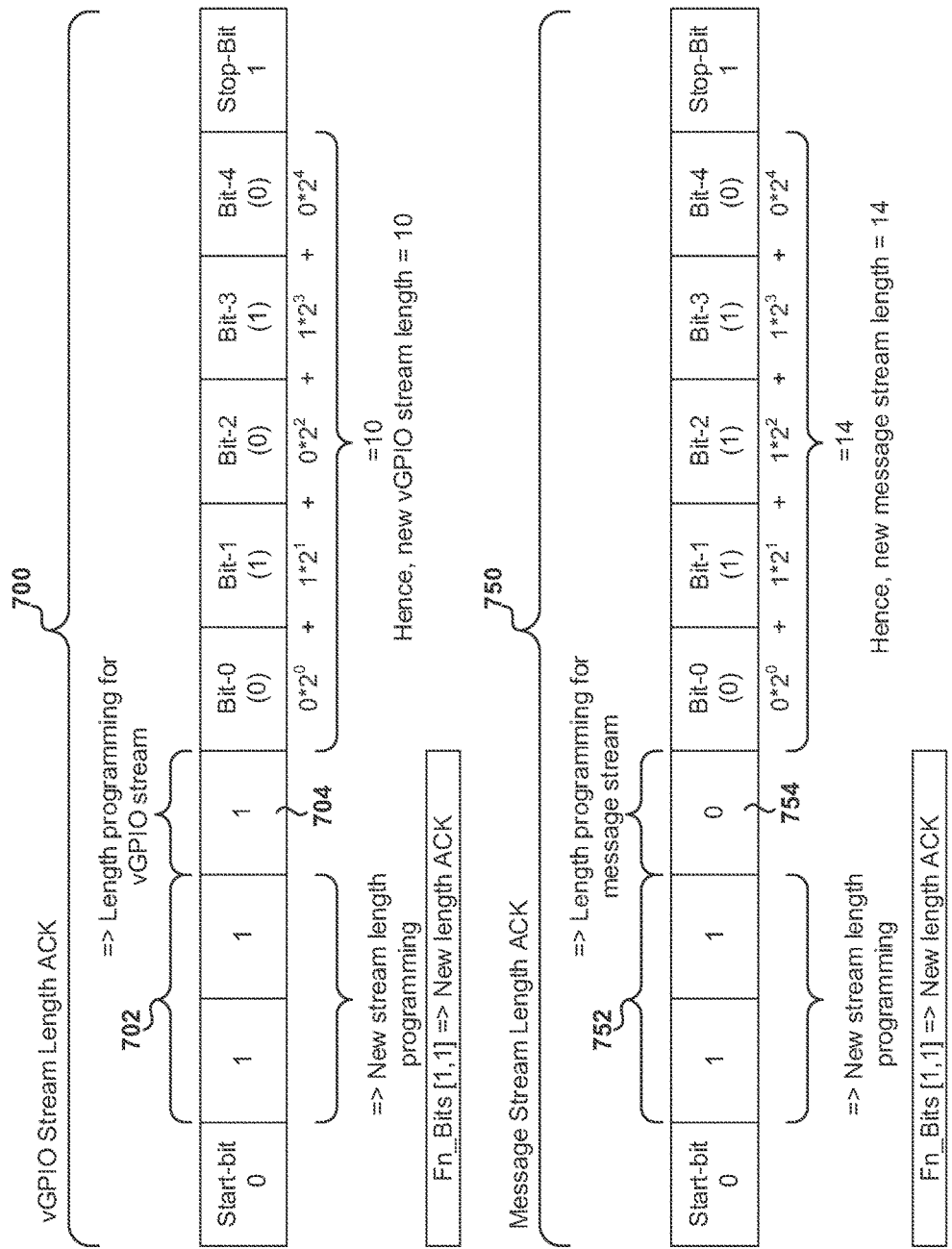
FIG. 7 illustrates acknowledgement frames transmitted to acknowledge the frame lengths programmed in response to the frames of FIG. 6.

When a remote FSM 116 receives a programming frame such as frame 600 or 650, it may proceed to acknowledge the defined frame length using an acknowledgment frame. Example acknowledgement frames are shown in FIG. 7. The frame 700 is a virtual GPIO acknowledgment frame whereas the frame 750 is a messaging signal acknowledgement frame. As shown in FIG. 7, each frame 700, 750 includes a header 702, 752 in which the function bits identify the frame as an acknowledgment frame. In one embodiment, a header (e.g., header 702) in which both function bits are logic ones identifies an acknowledgment frame. A frame type bit (e.g., frame type bit 704) following a header (e.g., the header 702) identifies the acknowledgment frame type. In one embodiment, a virtual GPIO acknowledgment frame 700 is identified by frame type bit 704 having a logic value of 1. Conversely, a messaging signal acknowledgment frame 750 may be identified by a frame type bit 754 having a logic value 0. The programming bits following the frame type bit (e.g., the frame type bit 704 or frame type bit 754) equal the programming bits in the corresponding frame (e.g., frame 600 or frame 650).

Figure 8:
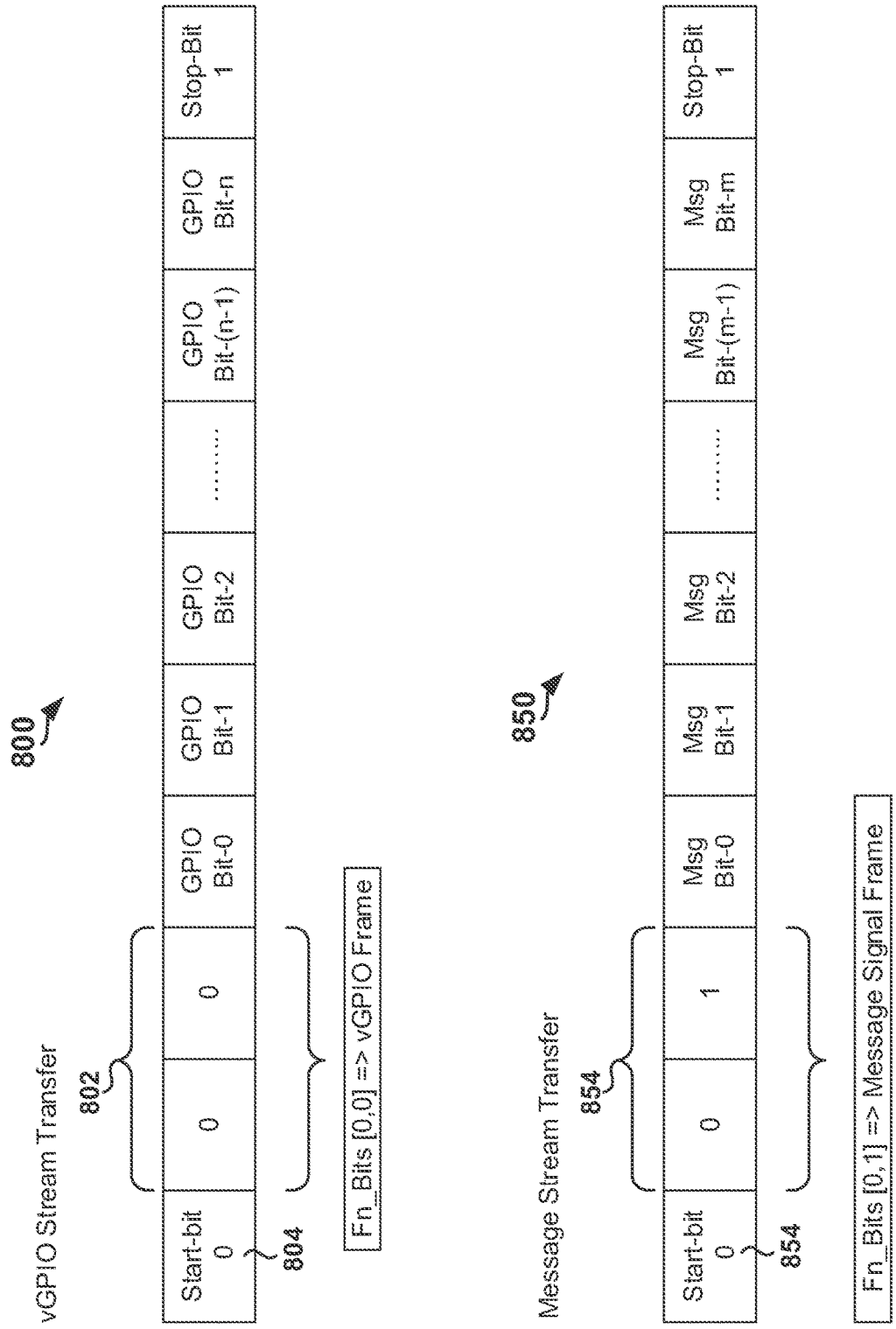
FIG. 8 illustrates an example virtual GPIO frame and an example messaging signal frame.

Once the frame lengths are thus programmed, a frame 800 of virtual GPIO signals 124 or a frame 850 of messaging signals may be transmitted as shown in FIG. 8. Referring again to FIG. 1, note that there are n virtual GPIO signals 124 and m messaging signals 126. Each frame (e.g., frame 800, 850) could thus be dedicated to just one GPIO port (one of the n GPIO signals 124) or it could include one bit each from the n GPIO signals 124. In other words, one could serially transmit GPIO words according to the various ports or they could be transmitted in parallel. The same serial/parallel consideration applies to the messaging signals. Regardless of whether each frame 800, 850 is carrying multiple ports or just one port, a header (e.g., header 802, 854) identifies whether the frame is a virtual GPIO frame or a messaging signal frame.

Figure 9:
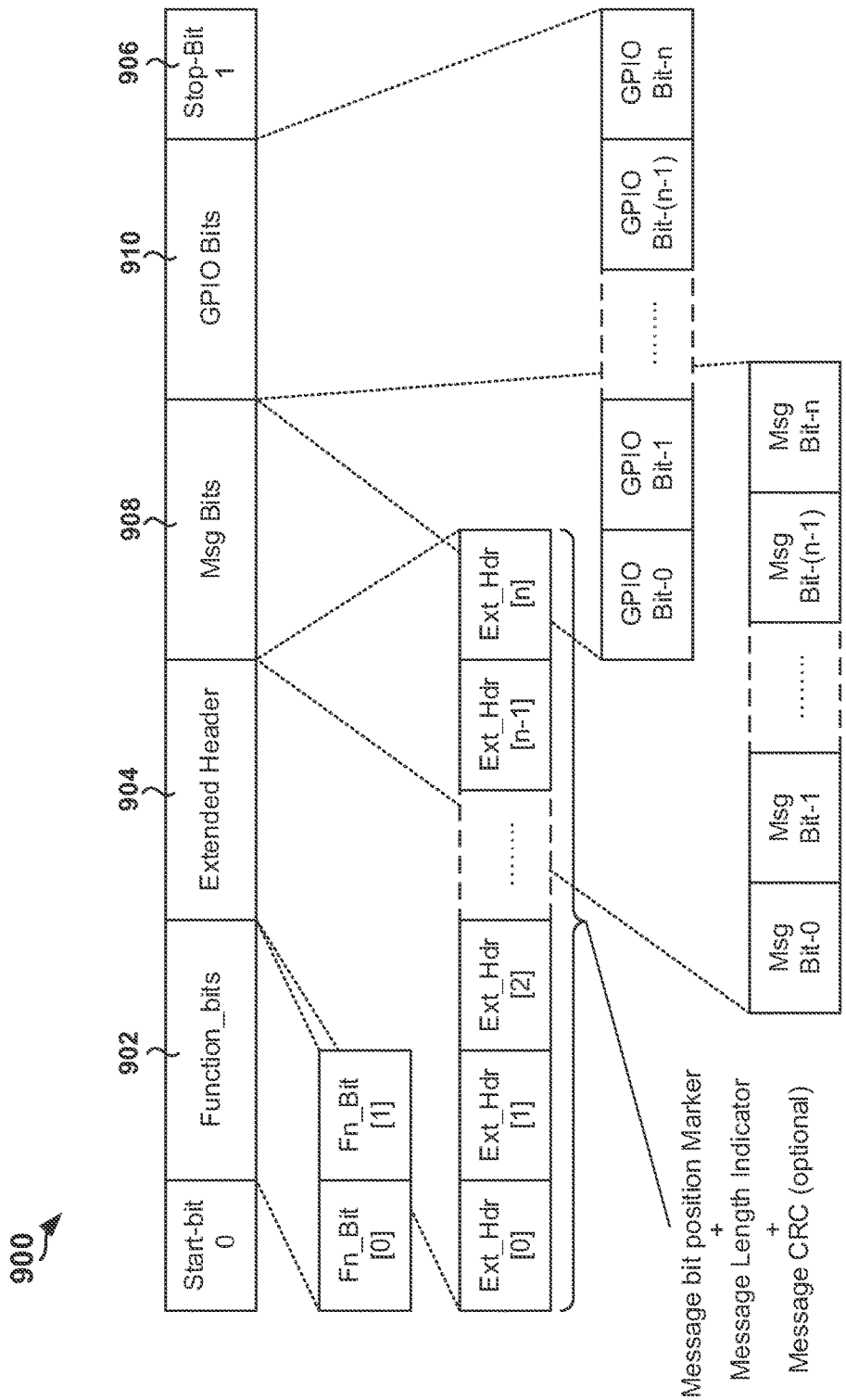
FIG. 9 illustrates an example combined virtual GPIO and messaging frame.

Rather than use separate frames to transmit the virtual GPIO signals 124 and messaging signals 126, these signals may be combined in an alternative embodiment for a hybrid virtual GPIO architecture in which each frame includes both virtual GPIO signals 124 and messaging signals 126. For example, FIG. 9 shows an example hybrid frame 900 that includes header 902 as well as an extended header 904. Extended header 904 indicates the bit position of the messaging signal bits and the virtual GPIO bits following extended header 904 and before stop bit 906. Depending upon the latency requirements, either the messaging bits 908 or the virtual GPIO bits 910 may be first in the frame body. In some embodiments, the extended header 904 may include error correction bits such as cyclic redundancy check (CRC) bits. Note that the extended header 904 need merely identify the position and length of just the virtual GPIO bits 910 or just the messaging bits 908 since the remaining bits are thus known by default to belong to the remaining bit category.

The common external clock 118 discussed above may be implemented by associating each FSM 116 with a clock pin for receiving the common clock 118. To avoid this additional pin demand, external clock 118 may be eliminated as discussed in U.S. Provisional No. 61/907,974, the contents of which are incorporated by reference herein. Referring again to FIG. 1, the hybrid virtual GPIO architecture 100 would thus be modified by eliminating external clock 118 and its corresponding pins. To eliminate any need for reserving a pin in each integrated circuit for receiving common clock 118, the transmission of a transmit set of signals is asynchronous with regard to the transmitting integrated circuit and the receiving integrated circuit. To enable such asynchronous transmission and reception, each FSM 116 may include or associate with an oscillator such as a ring oscillator. The transmitting FSM 116 pulse-width modulates the transmitted signal over the dedicated transmit pin responsive to each bit in the transmit set by counting the oscillations from the oscillator. The bits in the transmit set are then transmitted in frames of data, each bit in the frame being a pulse-width-modulated version of the corresponding bit in the transmit set. Each bit in the transmitted frame of data has a certain bit period that is used with respect to the pulse-width modulation. For example, if a transmit bit has one binary state, such as a binary zero, the FSM 116 may count a first number of oscillations so that a majority fraction of the bit period has expired. Upon counting the first number of oscillations, the FSM 116 pulses the dedicated transmit pin with a first binary voltage, such as with a power supply voltage VDD. At the start of the count, the dedicated transmit pin is pulsed in an opposite second binary voltage state, such as ground.

Conversely, if a transmit bit has an opposite binary state, such as a binary one, the FSM 116 may begin the transmit bit with a second binary voltage, such as ground, and proceed to count a second number of oscillations so that a minority fraction of the bit period has expired. Upon counting the second number of oscillations, the FSM 116 pulses the dedicated transmit pin with the first binary voltage. In this fashion, the voltage of the transmit line coupled to the dedicated transmit pin is pulsed with the first binary voltage according to a variable pulse width. If the current transmit bit has a first binary value, the transmit line is pulsed with the first binary voltage according to a first pulse width. Conversely, if the current transmit bit has an opposite second binary value, the transmit line is pulsed with the first binary voltage according to a second pulse width.

The receipt at an FSM (e.g., FSM 116) over its dedicated receive pin of a transmitted frame of data from a remote processor is demodulated in an analogous fashion. It is convenient for the default state (or idle mode) of each transmit line (which is the receive line for a receiving processor) to be charged to a power supply voltage VDD. This makes the health of the remote processor transparent to the receiving processor as discussed further below. The second binary voltage in such embodiments would then be ground. The receiving FSM 116 would then recognize the start of a received bit by detecting when the dedicated receive pin is discharged. The receiving FSM 116 may then begin counting oscillations from its oscillator. Two counts would then be generated: a first receive count of how many oscillations occur during the bit fraction in which the dedicated receive pin is charged to the first binary voltage, and a second receive count of how many oscillations occur during the bit fraction in which the dedicated receive pin is charged to the second binary voltage. By comparing the two receive counts, the receiving FSM 116 may determine whether the first pulse width or the second pulse width was applied to the received bit. The received frame of data is demodulated accordingly, such that no common clock is required to coordinate the transmission of the frames of data over the transmit lines. To distinguish such an FSM from FSM 116 that uses an external clock, the following FSM 116 will be denoted as an internal-clock FSM.

Figure 10:
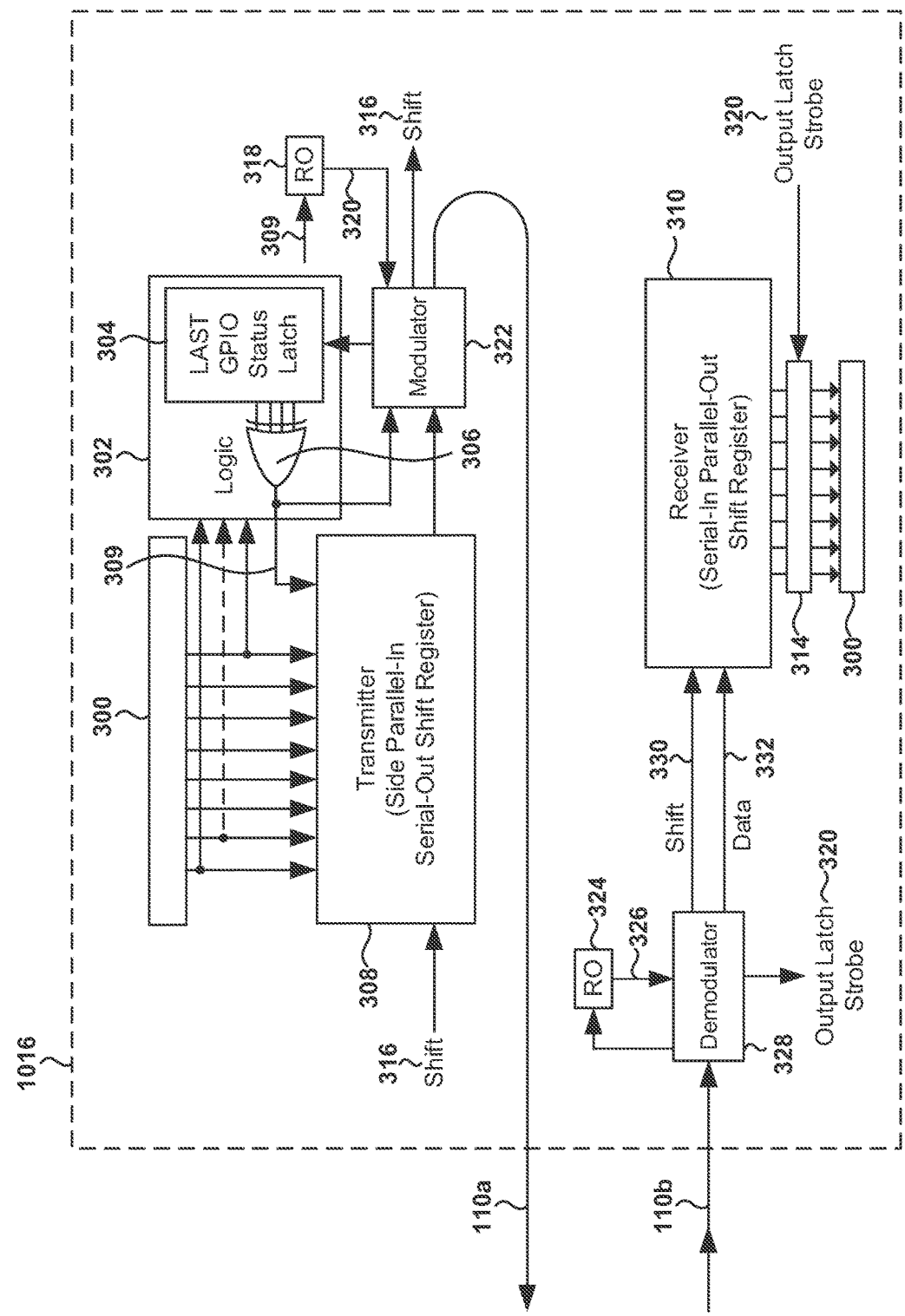
FIG. 10 illustrates a hybrid virtual GPIO finite state machine that does not use an external clock.

FIG. 10 is a block diagram of an internal-clock FSM 1016 to better illustrate its transmit and receive operations. The FSM 1016 receives a transmit set of virtual GPIO signals 124 from its GPIO interface 122 (shown in FIG. 1) through a multiplexing module 300. Alternatively, multiplexing module 300 may receive a transmit set of messaging signals 126 as discussed earlier with regard to the FSM 116. The FSM 1016 includes logic circuit 302 that will authorize the serial transmission of the transmit set of signals as pulse-width modulated signals over transmit line 110a if there has been a change in the transmit set as compared to a previous state of the transmit set. In this fashion, there is no unnecessary re-transmission of a transmit set that has not changed state as compared to a previous transmission. Logic circuit 302 thus compares the current transmit set of virtual GPIO signals to the previous transmit set stored in a latch or configuration register 304. To perform the comparison, logic circuit 302 may include an XOR gate 306 that XORs the current transmit set with the previous transmit set stored in configuration registers 304 (this previous transmit set may be designated as the "LAST GPIO Status" as shown in FIG. 10). Multiplexing module 300 loads the current transmit set in parallel into parallel-in-serial-out (PISO) shift register 308. If an enable signal 309 from XOR gate 306 goes high (indicating a change between the current transmit set and that stored in registers 304), PISO shift register 308 is then enabled to serially shift out its contents onto transmit line 110a responsive to a shift signal 316.

Each transmit set of signals comprises a frame of data that is stored in PISO shift register 308. The FSM 1016 includes a pulse-width modulator 322 that pulse-width modulates the transmit set of bits shifted out from PISO shift register 308 into a pulse-width-modulated output signal that is driven to the remote processor on transmit line 110a. This modulation is responsive to counts of oscillation cycles from an oscillator such as the counts of a transmit ring oscillator output signal 320 from a transmit ring oscillator (RO) 318. Modulator 322 and transmit ring oscillator 318 may be triggered by the assertion of enable signal 309 from XOR gate 306. Responsive to this triggering, modulator 322 strobes shift signal 316 so that PISO shift register 308 shifts an initial bit of the transmit set of signals to modulator 322.

Modulator 322 includes at least one counter (e.g., counters 1105 and 1110 shown in FIG. 11 described further below) that counts the cycles in ring oscillator output signal 320. Depending upon the desired pulse width from the pulse width modulation, the counter either counts to a first count or to a second count that is greater than the first count. After counting a sufficient number of cycles to satisfy the appropriate one of the first and second counts, the counter re-strobes shift signal 316 so that a subsequent bit from the frame of data stored in PISO shift register 308 is shifted into modulator 322. In this fashion, the transmit set of signals for a frame of data stored in PISO shift register 308 is shifted a bit at a time into modulator 322. Depending upon the binary value of each bit that is shifted out of PISO shift register 308, pulse-width modulator 322 pulse-width modulates a corresponding pulse transmitted over transmit line 110a. In that regard, each processor may be configured to weakly charge its transmit line 110a high to a power supply voltage VDD during a default state (no data transmission). In such an embodiment, the pulse transmission for a bit time period begins with discharging transmit line 110a to ground (VSS) as shown in the timing diagram of FIG. 11 for a frame of data. Each pulse-width-modulated bit transmission begins with the discharging of transmit line 110a to ground by some initial discharge fraction of the bit period such as 25% of the bit time period. Depending upon the bit value, modulator 322 either maintains the discharge of transmit line 110a for a majority of the bit period (e.g., 75%) or charges transmit line 110a back to VDD immediately after expiration of the initial discharge fraction of the bit period. In other words, one binary value may be modulated into a relatively narrow pulse of high voltage (VDD) in a bit period whereas a complement of the binary value may be modulated into a relatively wide pulse of high voltage (VDD) in a bit period.

Figure 11:
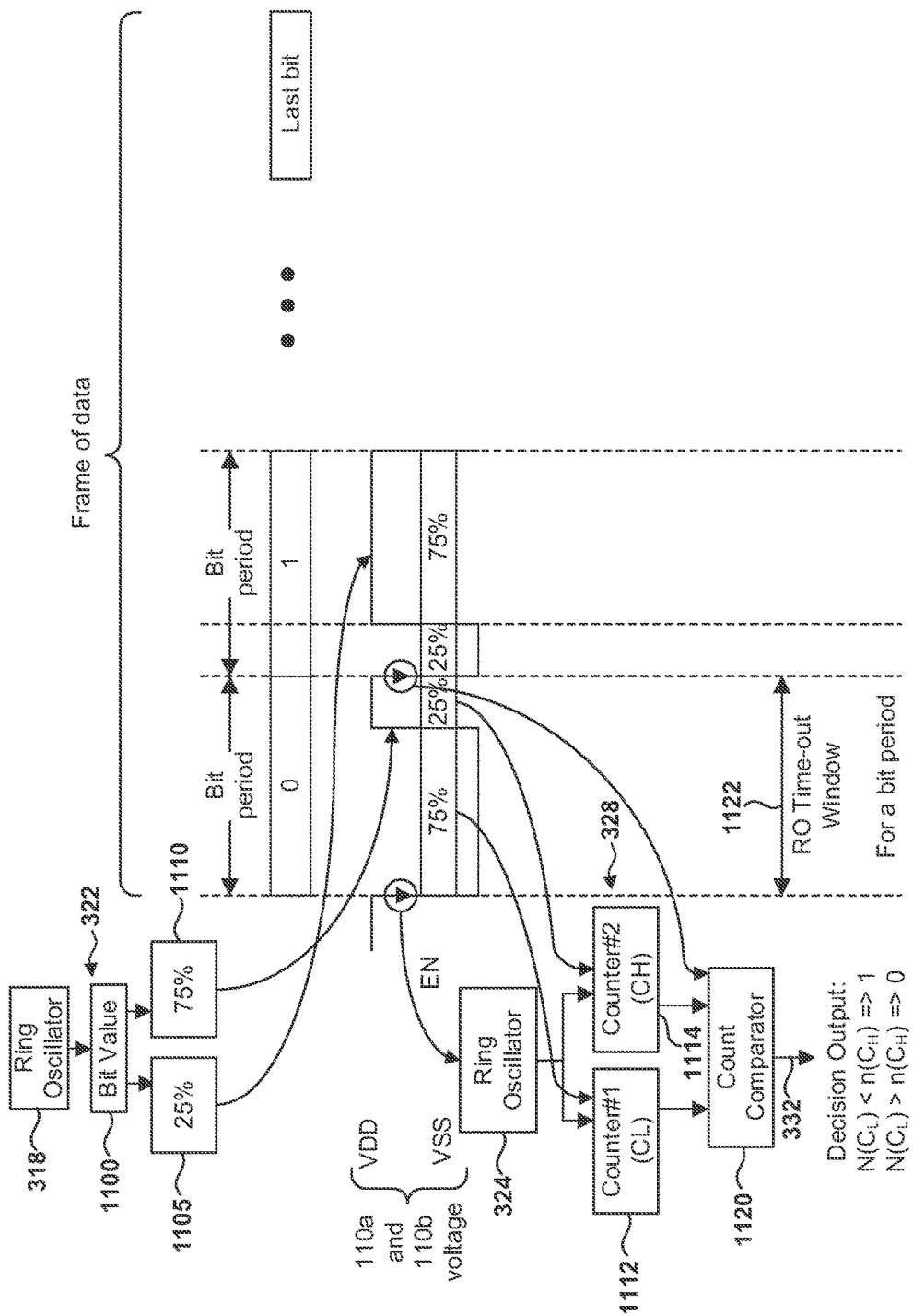
FIG. 11 is a timing diagram for the transmission of a frame of data through the finite state machine of FIG. 10 using a ring-oscillator pulse-width modulation (RO-PWM) technique.

The initial bit of the example data frame shown in FIG. 11 is a binary zero. In one embodiment, a binary zero may be modulated into a first pulse width in which transmit line 110a is maintained at ground for 75% of the bit period. Such a majority fraction of the bit period corresponds to a majority fraction counter 1110 counting to the second count. If the bit to be transmitted is a binary zero, pulse-width modulator 322 would thus keep transmit line 110a discharged until the second count is satisfied. When the second count is reached, pulse-width modulator 322 would then pulse transmit line 110a to the power supply voltage VDD for the remainder of the bit period. This pulse duration would then correspond to a minority fraction counter 1105 counting to the first count, which is just 25% of the bit period. The resulting voltage pulse transmitted over transmit line 110a for such a bit would then have a pulse width of just 25% of the bit period.

Conversely, a binary one may be modulated into a second pulse width in which transmit line 110a is grounded only during a minority discharge fraction such as the first 25% of the bit period. Transmit line 110a would then be discharged until the first count is satisfied. Once the first count is satisfied, pulse-width modulator 322 would then pulse transmit line 110a high to the power supply voltage VDD for the remainder of the bit period as determined by resetting majority fraction counter 410 to zero and counting until it satisfies the second count. The second pulse width during which the voltage for transmit line 110a is charged to the power supply voltage VDD would then comprise 75% of the bit period. It will appreciated, however, that different pulse widths may be used in alternative embodiment to signify the desired binary values.

In one embodiment, modulator 322 may comprise a logic circuit 1100. Depending upon the bit value, logic circuit 1100 either triggers minority fraction counter 1105 or majority fraction counter 1110 to begin counting. It will be appreciated, however, that a single counter may be used that counts to either the first or second count depending upon the desired pulse-width modulation. Upon triggering by logic circuit 1100, minority fraction counter 1105 or majority fraction counter 1110 counts the cycles from transmit ring oscillator (RO) 318. For example, minority fraction counter 1105 may be configured to count a sufficient number of cycles corresponding to 25% of the bit time period whereupon it asserts an output signal to signify that the first count is satisfied. Similarly, majority fraction counter 1110 may be configured to count a sufficient number of cycles corresponding to 75% of the bit time period whereupon it asserts its output signal. In this embodiment, modulator 322 is configured to discharge transmit line 110a to ground at the start of each bit time period. Depending upon the bit value, modulator 322 will charge transmit line 110a back to the power supply voltage VDD upon on the assertion of the output signal from the appropriate counter. For example, the first bit in the data frame is a binary zero so modulator 322 asserts transmit line 110a high to VDD upon counter 1105 asserting its output signal. Similarly, the second bit in the data frame is a binary one so modulator 322 asserts transmit line 110a high to VDD upon counter 1110 asserting its output signal. It will be appreciated that initial 25% low period is just an example and that other fractions of the bit time period may be implemented.

In one aspect, the combination of logic circuit 1100, counters 1105 and 1110, modulator 322, and PISO shift register 308 may be deemed to comprise a means for serially processing each signal in the transmit set into a series of corresponding pulse-width-modulated signals, wherein the means is configured to determine a pulse width for each serially processed signal by counting oscillations from an oscillator into one of a first count and a second count responsive to a binary value of the serially processed signal, and wherein the means is further configured to transmit the series of corresponding pulse-width-modulated signals through a dedicated transmit pin to a remote processor over the dedicated transmit pin.

Referring again to FIG. 10, the FSM 1016 also deserializes a receive set of signals (virtual GPIO and/or messaging signals) in an analogous fashion using serial-in-parallel-out (SIPO) shift register 310. A demodulator 328 demodulates a received pulse-width-modulated signal from a remote processor as received on receive line 110b. Demodulator 328 is configured to detect the start of a received frame of data from the received pulse-width-modulated signal such as by detecting the discharge of receive line 110b to trigger a receive ring oscillator 324 to begin oscillating a receive ring oscillator output signal 326. Note that in alternative aspects, oscillators 324 and 318 may include the same oscillator. Analogous to modulator 322, demodulator 328 may include a counter such as a low counter 1112 and a high counter 1114. In each bit period, low counter 1112 is triggered to count while receive line 110b is discharged. Conversely, high counter 1114 is triggered to count while receive line 110b is charged to the power supply voltage VDD. In alternative embodiments, counters 1112 and 1114 may be implemented using a single common counter that counts the number of oscillations in each binary voltage state for receive line 110b. By comparing the counts from counters 1112 and 1114, demodulator 328 may form a demodulated data signal 332 accordingly. In particular, if the count from high counter 1114 is greater than the count from low counter 1112 in a given bit period, demodulator 328 may drive demodulated data signal 332 high to the power supply voltage VDD to signify that a relatively wide pulse was received. Conversely, if the count from low counter 1112 is greater, demodulator 328 may discharge demodulated data signal 332 to VSS to signify that a relatively narrow pulse was received.

Demodulator 328 may also assert a shift signal 330 to SIPO shift register 310 upon detection from the counts of the bit time period boundaries. SIPO shift register 310 would then shift in demodulated data signal 332 from demodulator 328. The FSM module 1016 may be configured to process a predefined data frame size for the transmit and receive sets of signals as determined by the programming frames discussed above. Both counters 1112 and 1114 are initialized at the start of a bit time period. Low counter 1112 counts the cycles from receive ring oscillator 324 while the receive line 110b voltage is low whereas high counter 1114 counts the cycles from receive ring oscillator 324 while receive line voltage is high (VDD). Comparator 1120 thus performs the demodulation bit decision at the end of each bit time period by comparing a low count ($C_L$) from low counter 1112 to a high count ($C_H$) from high counter 1114. The bit periods may be determined from whenever high counter 1114 stops counting and outputs $C_H$ as triggered by receive line 110b being discharged. Counter 1114 may be initialized at each bit time boundary accordingly. At the end of each bit period, if $C_L$ is greater than $C_H$, comparator 1120 drives demodulated data signal 332 low, corresponding to the demodulation of a binary zero in one aspect. Conversely, if $C_H$ is greater than $C_L$ at the end of a bit period, comparator drives demodulated data signal 332 high, corresponding to the demodulation of a binary one in such an aspect. SIPO shift register 310 registers each demodulated bit decision responsive to a strobe of shift signal 330.

Enhanced VGI Messaging Techniques

The function bits discussed with regard to FIGS. 4 through 9 may be enhanced through error-correction coding. Although the error-correction coding increases latency, the function bits are then immune to bit errors that may be corrected through the error-correction coding. The user can then be assured that important function headers such as acknowledgement (ACK) and negative acknowledgement (NACK) will be delivered without errors. The following aspects will be directed to the use of Extended Hamming (8,4) code words to define unique functions, but it will be appreciated that other error correction techniques may be used.

Figure 12:
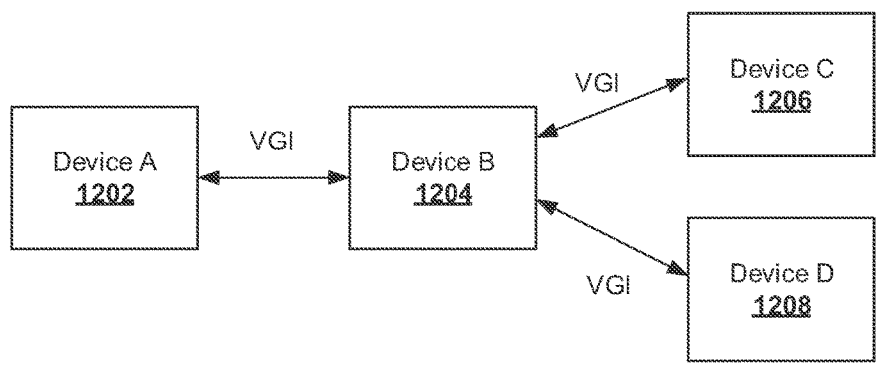
FIG. 12 illustrates a point-to-multi-point VGI network.

In addition, the network topology may be expanded to include both point-to-point and point-to-multi-point topologies. The first and second devices 102, 104 discussed earlier with regard to FIG. 1 are arranged in a point-to-point fashion. Due to this direct connection, the second device 104 need not address messages to the first device 102 since only first device 102 has its receive pin coupled to the transmit pin of the second device 104. In contrast, FIG. 12 illustrates a point to multipoint VGPIO (VGI) network including device A 1202, device B 1204, device C 1206, and device D 1208. Should device A 1202 need to communicate with device C 1206 or device D 1208, that communication must be routed through device B 1204 using an address. In contrast, should device A 1202 need to instead communicate with a directly-adjacent device such as device B 1204, such a communication needs no addressing. Thus, a VGI frame in the network of FIG. 12 may include a header that identifies whether the frame is addressed or instead is a point-to-point frame (designated herein as a "direct" frame).

Figure 13:
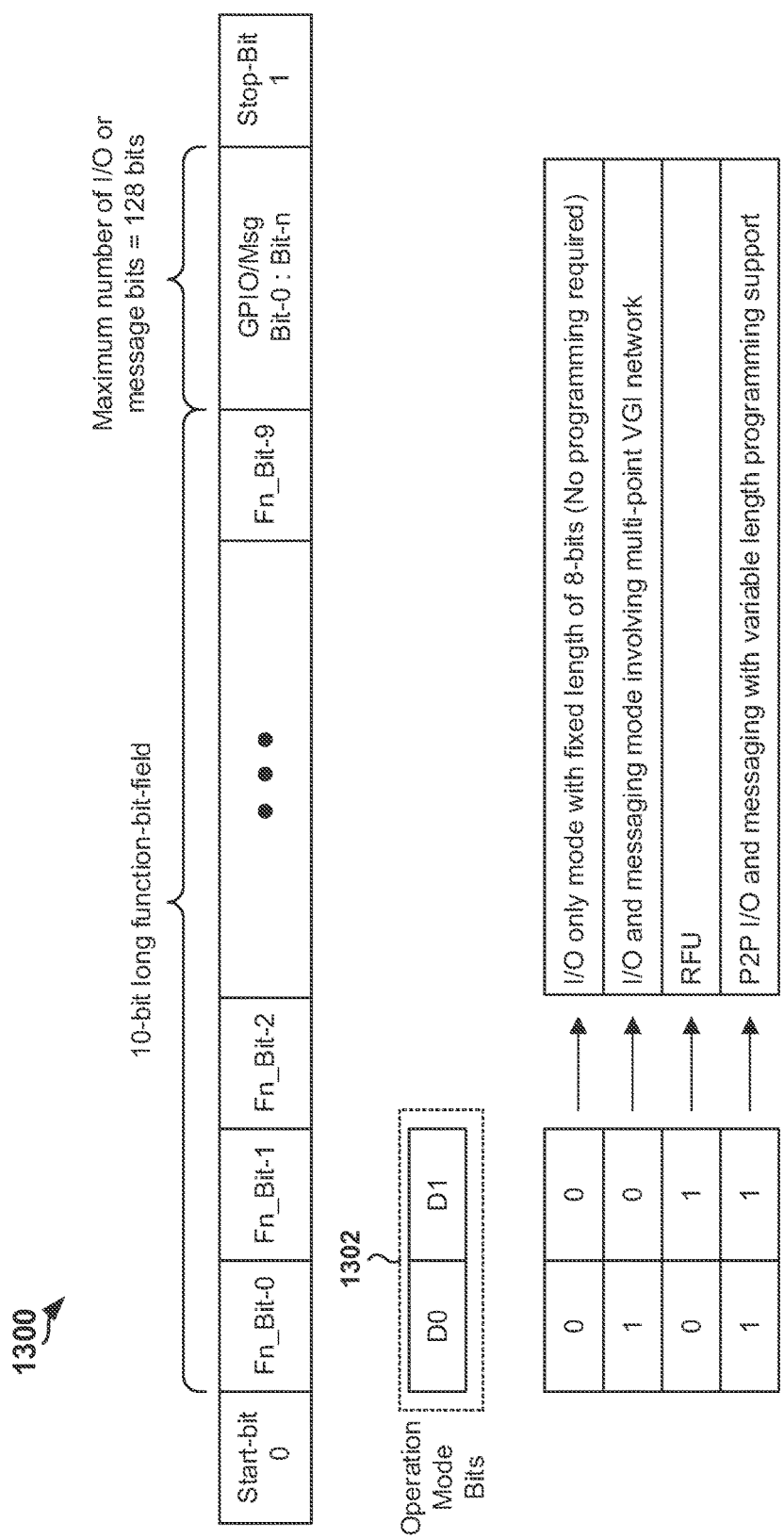
FIG. 13 illustrates an enhanced VGI hybrid frame.

An example frame 1300 with error correction is shown in FIG. 13. Similar to the frames discussed with regard to FIGS. 4 and 6-9, frame 1300 begins with a logic low (grounded) start bit and ends with a logic high (asserted to VDD) stop bit. A 10-bit long function bit field provides the meta-data associated with the data payload of, for example, up to 128 data bits. These data bits may include VGI data and/or messaging data as discussed with regard to FIGS. 4 and 6-9. The first two function bits D0 and D1 (e.g., operation mode bits 1302) identify the network topology (point-to-point or point-to-multi-point) and also whether the frame size is fixed or variable. In this embodiment, if D0 and D1 are both logic low (zero), the network topology is point-to-point and the frame size (data payload) is fixed at eight bits. If D0 is a logic one and D1 a logic zero, the following frame is for a point-to-multi-point network that requires addressing. Conversely, if D0 and D1 are both logic one, the following frame is for a point-to-point network that requires no addressing. An operation mode identified by D0 equaling binary zero while D1 equals binary one may be reserved for future use (RFU). It will be appreciated that alternative codings may be utilized to identify the mode of operation. The formatting of the first two function bits 0 and 1 also helps synchronize the clocks in the receiving devices.

The function bits 2 through 9 (eight bits) may form a Hamming (8,4) code word that forms the remainder of the function header. FIG. 14 represents some example code words for function bits 2 through 9. In one embodiment, the function header code words may form bit-inverted pairs to advantageously simplify the resulting decoding. For example, code word 6 (indicated as "Code-6" in FIG. 14) is an addressed ACK for a point-to-multi-point network whereas bit-inverted code word 9 (indicated as "Code-9" in FIG. 14) is an addressed NACK. Similarly, code word 7 (indicated as "Code-7" in FIG. 14) is a direct ACK (point-to-point network) whereas bit-inverted code word 8 (indicated as "Code-8" in FIG. 14) is a direct NACK. Code word 5 (indicated as "Code-5" in FIG. 14) and its bit-inverted corresponding code word 10 (indicated as "Code-10" in FIG. 14) may be reserved for future use. Code word 4 (indicated as "Code-4" in FIG. 14) designates a flow control override message (FCOM) for an addressed network. Corresponding bit-inverted code word 11 (indicated as "Code-11" in FIG. 14) is a flow control override message for a direct network. Code word 3 (indicated as "Code-3" in FIG. 14) identifies the associated data payload as being a messaging payload for an addressed network whereas corresponding bit-inverted code word 12 indicates that the associated data payload is a messaging payload for a direct network. Code word 2 (indicated as "Code-2" in FIG. 14) indicates that the associated data payload is a VGI payload for an addressed network whereas bit-inverted code word 13 indicates that the associated data payload is a VGI payload for a direct network. Code word 1 (indicated as "Code-1" in FIG. 14) signifies that the frame is a broadcast frame whereas bit-inverted code word 14 (indicated as "Code-14" in FIG. 14) signifies that the frame is a listen-only query. Finally, code word 0 (indicated as "Code-0" in FIG. 14) triggers a soft reset whereas corresponding bit-inverted code word 15 (indicated as "Code-15" in FIG. 14) triggers a lowest speed mode of operation. It will be appreciated that the assignment of code words in FIG. 14 is merely illustrative of one embodiment and that numerous alternative code word assignments may be utilized.

Two-Pin VGI Interface for High-Speed Data Cable

In Peripheral Component Interconnect Special Interest Group (PCI-SIG) cables/modules, a memory device (e.g., an electrically erasable programmable read-only memory (EEPROM)) with an I2C interface may be used to store module parameters. This approach is used for not only cables but also for on-board interface scenarios for parameter storage. In some aspects of the present disclosure, since VGI may be used to consolidate sideband signaling and relatively low (tens of kilobits per second) to medium (tens of megabits per second) speed messaging, dedicated interface(s) for reading a device that contains system parameters may be absorbed over VGI by dynamically selecting the proper physical link. Continuation of the status-quo requires additional port availability on a host device (e.g., SOC or processor) to support such dedicated interfaces (i.e., I2C) and demands extra pins, which in turn adds to cost.

Figure 15:
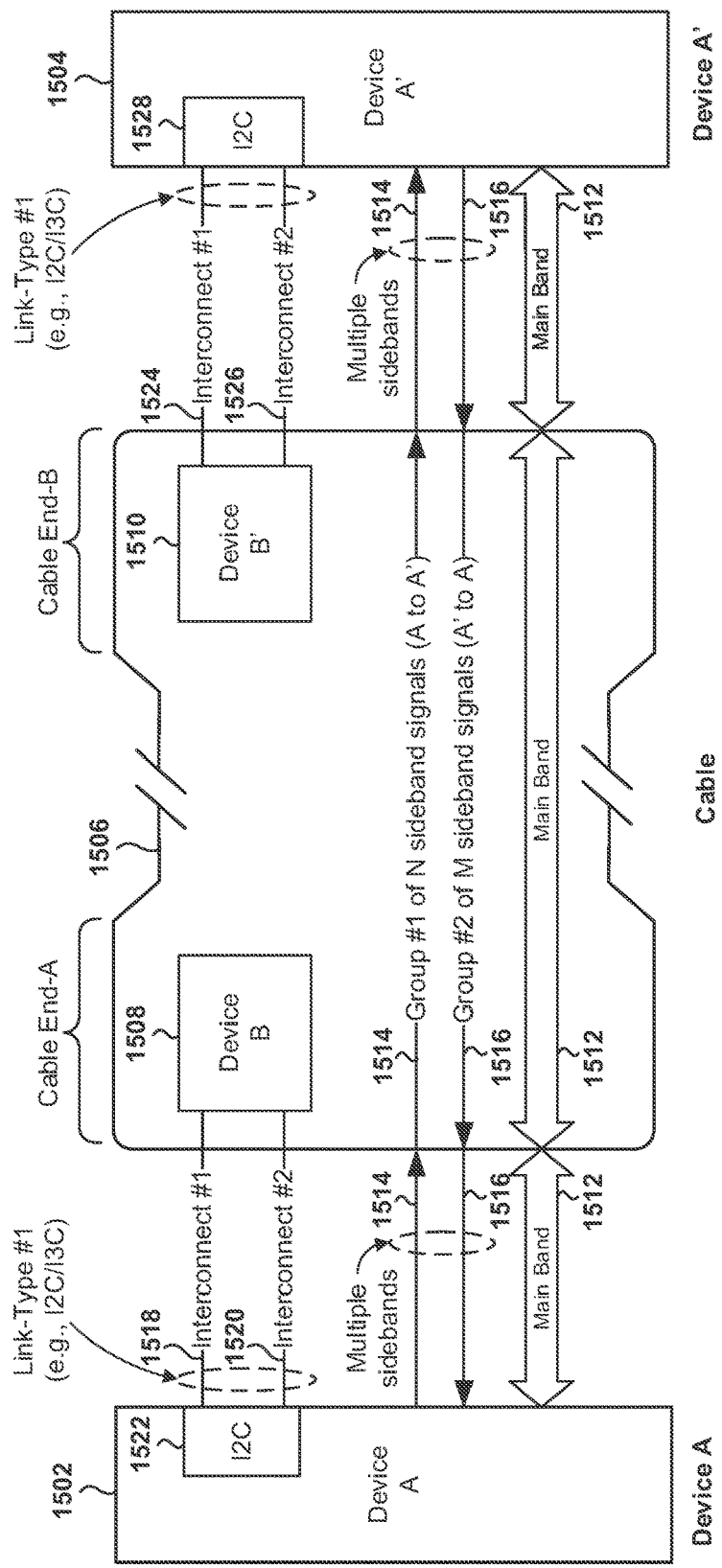
FIG. 15 is a diagram of a host device configured to communicate with a peripheral device using a conventional high-speed cable.

FIG. 15 is a diagram of a host device configured to communicate with a peripheral device using a conventional high-speed cable. In the example configuration of FIG. 15, the device A 1502 may be a host device and the device A' 1504 may be a peripheral device. As shown in FIG. 15, the device A 1502 is coupled to the device A' 1504 through the cable 1506. For example, the cable 1506 may be a PCI-SIG cable that includes one or more electronic devices, such as device B 1508 and device B' 1510, which may store configuration information (e.g., parameters of the cable 1506) associated with the cable 1506. In such example, the cable 1506 may be referred to as a smart cable or a high-speed smart cable. For example, the device B 1508 and/or the device B' 1510 may include at least one EEPROM.

As shown in the example configuration of FIG. 15, the device A 1502 is configured to communicate with the device B 1508 over a first dedicated link, such as an I2C link (or I3C link). For example, the first dedicated link may include the first interconnect 1518 and the second interconnect 1520. Accordingly, the device A 1502 may include an I2C interface 1522 that is configured to communicate with the device B 1508 using the I2C serial communication protocol over the first interconnect 1518 and the second interconnect 1520. For example, the first interconnect 1518 may be an I2C data line and the second interconnect 1520 may be an I2C clock line. The device A' 1504 is configured to communicate with the device B' 1510 over a second dedicated link, such as an I2C link (or I3C link). For example, the second dedicated link may include the first interconnect 1524 and the second interconnect 1526. Accordingly, the device A' 1504 may include an I2C interface 1528 that is configured to communicate with the device B' 1510 using the I2C serial communication protocol over the first interconnect 1524 and the second interconnect 1526. For example, the first interconnect 1524 may be an I2C data line and the second interconnect 1526 may be an I2C clock line.

As shown in FIG. 15, the cable 1506 may enable communication of main band signals 1512 between the device A 1502 and the device A' 1504. As further shown in FIG. 15, the cable 1506 may enable transmission of sideband signals 1514 to the device A' 1504 and reception of sideband signals 1516 from the device A' 1504. The sideband signals 1514 may include a first group of N sideband signals, and the sideband signals 1516 may include a second group of M sideband signals. In the configuration of FIG. 15, it should be understood that each of the sideband signals 1514 is transmitted over a separate physical interconnect line (e.g., N separate physical interconnect lines) and each of the sideband signals 1516 is received over a separate physical interconnect line (e.g., M separate physical interconnect lines).

Figure 16:
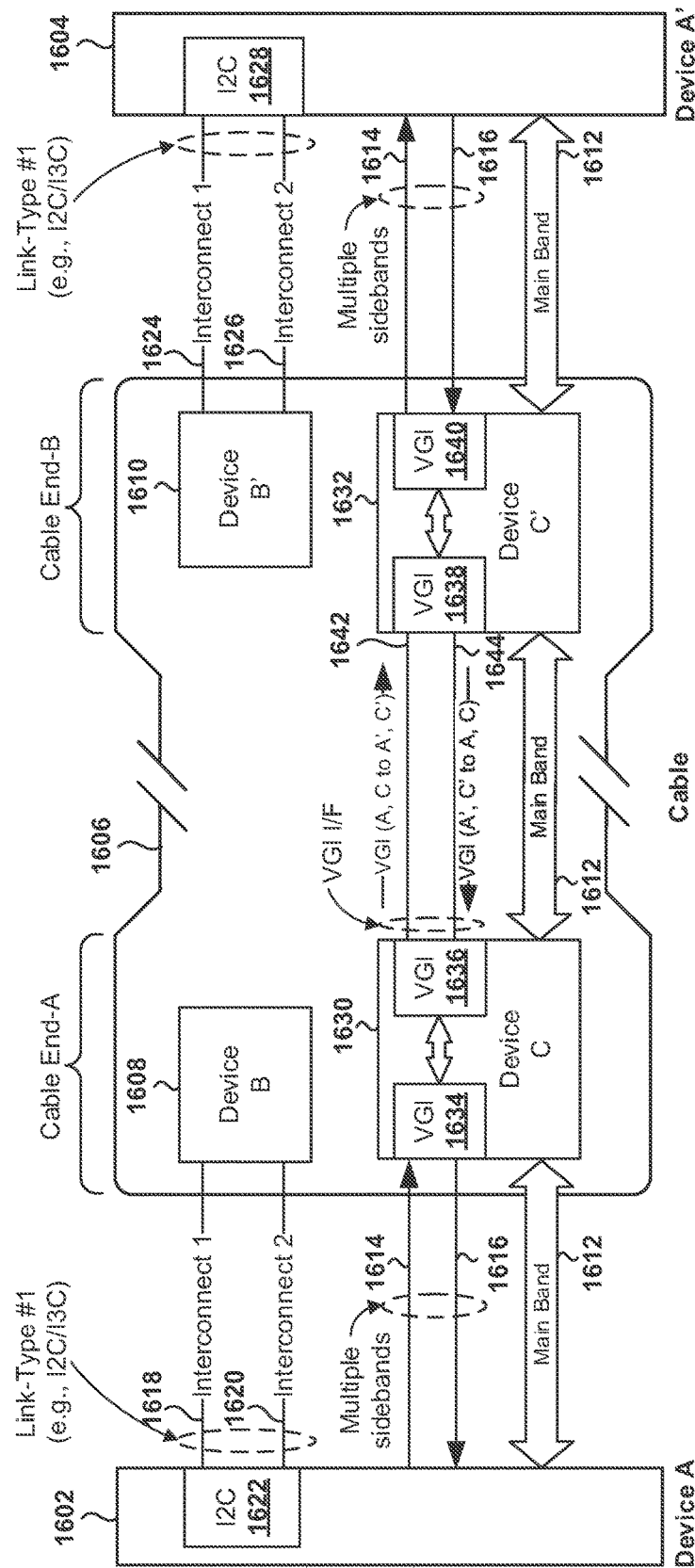
FIG. 16 is a diagram of a host device configured to communicate with a peripheral device using a conventional high-speed cable.

FIG. 16 is a diagram of a host device configured to communicate with a peripheral device using a conventional high-speed cable. In the example configuration of FIG. 16, the device A 1602 may be a host device and the device A' 1604 may be a peripheral device. As shown in FIG. 16, the device A 1602 is coupled to the device A' 1604 through the cable 1606. For example, the cable 1606 may be a PCI-SIG cable that includes one or more electronic devices, such as device B 1608, device B' 1610, device C 1630, and device C' 1632. For example, the device B 1608 and the device B' 1610 may store configuration information (e.g., parameters of the cable 1606) associated with the cable 1606. In such example, the cable 1606 may be referred to as a smart cable or a high-speed smart cable. For example, the device B 1608 and/or the device B' 1610 may include at least one EEPROM. The device C 1630 and the device C' 1632 may each be configured as a retimer and a sideband signal consolidator. For example, and as shown in FIG. 16, the device C 1630 may include a first VGI interface 1634 and a second VGI interface 1636, and the device C' 1630 may include a third VGI interface 1638 and a fourth VGI interface 1640.

As shown in the example configuration of FIG. 16, the device A 1602 is configured to communicate with the device B 1608 over a first dedicated link, such as an I2C link (or I3C link). For example, the first dedicated link may include the first interconnect 1618 and the second interconnect 1620. Accordingly, the device A 1602 may include an I2C interface 1622 that is configured to communicate with the device B 1608 using the I2C serial communication protocol over the first interconnect 1618 and the second interconnect 1620. For example, the first interconnect 1618 may be an I2C data line and the second interconnect 1620 may be an I2C clock line. The device A' 1604 is configured to communicate with the device B' 1610 over a second dedicated link, such as an I2C link (or I3C link). For example, the second dedicated link may include the first interconnect 1624 and the second interconnect 1626. Accordingly, the device A' 1604 may include an I2C interface 1628 that is configured to communicate with the device B' 1610 using the I2C serial communication protocol over the first interconnect 1624 and the second interconnect 1626. For example, the first interconnect 1624 may be an I2C data line and the second interconnect 1626 may be an I2C clock line.

As shown in FIG. 16, the cable 1606 may enable communication of main band signals 1612 between the device A 1602 and the device A' 1604. As further shown in FIG. 16, the cable 1606 may enable transmission of sideband signals 1614 to the device A' 1604 and reception of sideband signals 1616 from the device A' 1604. The sideband signals 1614 may include a first group of N sideband signals, and the sideband signals 1616 may include a second group of M sideband signals. In the configuration of FIG. 16, it should be understood that each of the sideband signals 1614 is transmitted over a separate physical interconnect line and each of the sideband signals 1616 is received over a separate physical interconnect line.

In the configuration of FIG. 16, the sideband signals 1614 transmitted from the device A 1602 to the device A' 1604 may be received (e.g., in parallel) by the device C 1630. The first VGI interface 1634 may serialize the sideband signals 1614 and may transfer the serialized sideband signals to the second VGI interface 1636. The second VGI interface 1636 may transmit the serialized sideband signals to the device C' 1632 over the VGI interconnect 1642. The third VGI interface 1638 of the device C' 1632 may transfer the serialized sideband signals to the fourth VGI interface 1640. The fourth VGI interface 1640 may then deserialize the serialized sideband signals and may transmit the sideband signals 1614 (e.g., in parallel) to the device A' 1604. Similarly, the sideband signals 1616 transmitted from the device A' 1604 to the device A 1602 (e.g., in parallel) may be received by the device C' 1632. The fourth VGI interface 1640 may serialize the sideband signals 1616 and may transfer the serialized sideband signals to the third VGI interface 1638. The third VGI interface 1638 may transmit the serialized sideband signals to the device C 1630 over the VGI interconnect 1644. The second VGI interface 1636 of the device C 1630 may transfer the serialized sideband signals to the first VGI interface 1634. The first VGI interface 1634 may then deserialize the serialized sideband signals and may transmit the sideband signals 1616 (e.g., in parallel) to the device A 1602.

Therefore, it can be appreciated that the consolidation of the sideband signals 1614 over the VGI interconnect 1642, and the consolidation of the sideband signals 1616 over the VGI interconnect 1644 may reduce the number of lines needed to carry the sideband signals 1614, 1616 in the cable 1606. However, it should be noted that in the configuration of FIG. 16, implementation of the VGI communication protocol is only inside the cable 1606. Therefore, the configuration of FIG. 16 may still require a large number of sideband lines (e.g., interconnects) between the device A 1602 and cable end A of the cable 1606, as well a large number of sideband lines (e.g., interconnects) between the device A' 1604 and cable end B of the cable 1606. As such, the configuration of FIG. 16 may not aid in the reduction of pins at the device A 1602 and/or the device A' 1604.

Figure 17:
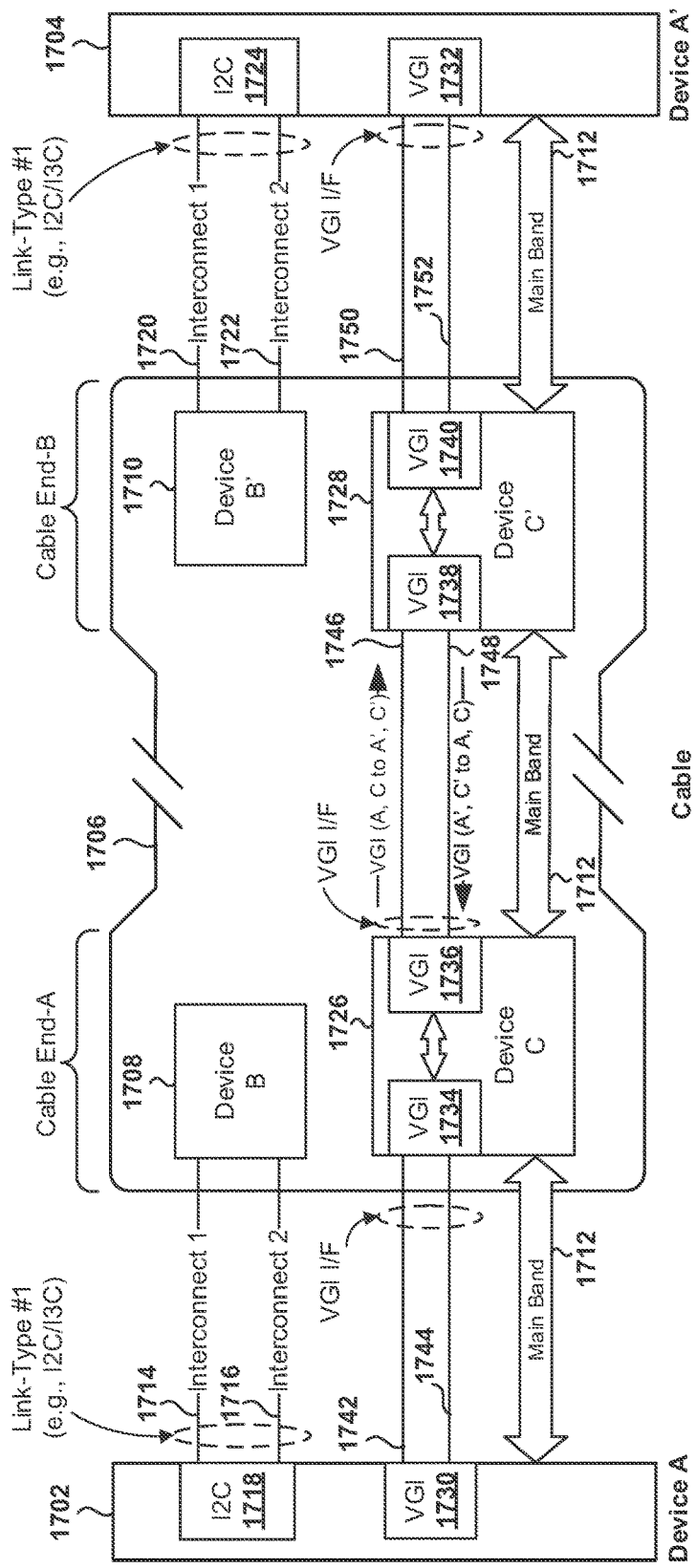
FIG. 17 is a diagram of a host device configured to communicate with a peripheral device using a conventional high-speed cable.

FIG. 17 is a diagram of a host device configured to communicate with a peripheral device using a conventional high-speed cable. In the example configuration of FIG. 17, the device A 1702 may be a host device and the device A' 1704 may be a peripheral device. As shown in FIG. 17, the device A 1702 is coupled to the device A' 1704 through the cable 1706. For example, the cable 1706 may be a PCI-SIG cable that includes one or more electronic devices, such as device B 1708, device B' 1710, device C 1726, and device C' 1728. For example, the device B 1708 and the device B' 1710 may store configuration information (e.g., parameters of the cable 1706) associated with the cable 1706. In such example, the cable 1706 may be referred to as a smart cable or a high-speed smart cable. For example, the device B 1708 and/or the device B' 1710 may include at least one EEPROM. The device C 1726 and the device C' 1728 may each be configured as a retimer and a sideband signal consolidator. For example, and as shown in FIG. 17, the device C 1726 may include a first VGI interface 1734 and a second VGI interface 1736, and the device C' 1728 may include a third VGI interface 1738 and a fourth VGI interface 1740.

As shown in the example configuration of FIG. 17, the device A 1702 is configured to communicate with the device B 1708 over a first dedicated link, such as an I2C link (or I3C link). For example, the first dedicated link may include the first interconnect 1714 and the second interconnect 1716. Accordingly, the device A 1702 may include an I2C interface 1718 that is configured to communicate with the device B 1708 using the I2C serial communication protocol over the first interconnect 1714 and the second interconnect 1716. For example, the first interconnect 1714 may be an I2C data line and the second interconnect 1716 may be an I2C clock line. The device A' 1704 is configured to communicate with the device B' 1710 over a second dedicated link, such as an I2C link (or I3C link). For example, the second dedicated link may include the first interconnect 1720 and the second interconnect 1722. Accordingly, the device A' 1704 may include an I2C interface 1724 that is configured to communicate with the device B' 1710 using the I2C serial communication protocol over the first interconnect 1720 and the second interconnect 1722. For example, the first interconnect 1720 may be an I2C data line and the second interconnect 1722 may be an I2C clock line. As shown in FIG. 17, the cable 1706 may enable communication of main band signals 1712 between the device A 1702 and the device A' 1704.

As shown in FIG. 17, the device A 1702 is further configured to communicate with the device C 1726 over a third dedicated link, such as a VGI link. For example, the third dedicated link may include the first VGI interconnect 1742 and the second VGI interconnect 1744. Accordingly, the device A 1702 may include a VGI interface 1730 that is configured to transmit VGI signals to the device C 1726 over the first VGI interconnect 1742 and to receive VGI signals from the device C 1726 over the second VGI interconnect 1744. Similarly, the device A' 1704 is further configured to communicate with the device C' 1728 over a fourth dedicated link, such as a VGI link. For example, the fourth dedicated link may include the first VGI interconnect 1750 and the second VGI interconnect 1752. Accordingly, the device A' 1704 may include a VGI interface 1732 that is configured to receive VGI signals from the device C' 1728 over the first VGI interconnect 1750 and to transmit signals to the device C' 1728 over the second VGI interconnect 1752.

In the configuration of FIG. 17, sideband signals to be transmitted from the device A 1702 to the device A' 1704 may be converted to VGI signals at the VGI interface 1730 and transmitted to the device A' 1704 over the first VGI interconnect 1742. The VGI signals may be received at the first VGI interface 1734 and transferred to the second VGI interface 1736. The second VGI interface 1736 may transmit the VGI signals to the third VGI interface 1738 through the first VGI interconnect 1746. The third VGI interface 1738 may transfer the VGI signals to the fourth VGI interface 1740. The fourth VGI interface 1740 may transfer the VGI signals to the device A' 1704 through the first VGI interconnect 1750. The device A 1702 may receive sideband signals from the device A' 1704 as VGI signals over the second VGI interconnect 1744. For example, sideband signals to be transmitted from the device A' 1704 to the device A 1702 may be converted to VGI signals at the VGI interface 1732 and transmitted to the device A 1702 over the second VGI interconnect 1752. The VGI signals may be received at the fourth VGI interface 1740 and transferred to the third VGI interface 1738. The third VGI interface 1738 may transmit the VGI signals to the second VGI interface 1736 through the second VGI interconnect 1748. The second VGI interface 1736 may transfer the VGI signals to the first VGI interface 1734. The first VGI interface 1734 may transmit the VGI signals to the device A 1702 through the second VGI interconnect 1744. The device A' 1704 may transmit and receive VGI signals in a similar manner at cable end B of the cable 1706. Therefore, it can be appreciated that the consolidation of the sideband signals over the first VGI interconnect 1742 and second VGI interconnect 1744 at cable end A, and the consolidation of the sideband signals over the first VGI interconnect 1750 and second VGI interconnect 1752 at cable end B may reduce the number of pins needed to carry the sideband signals between the device A 1702 and the device A' 1704.

Figure 18:
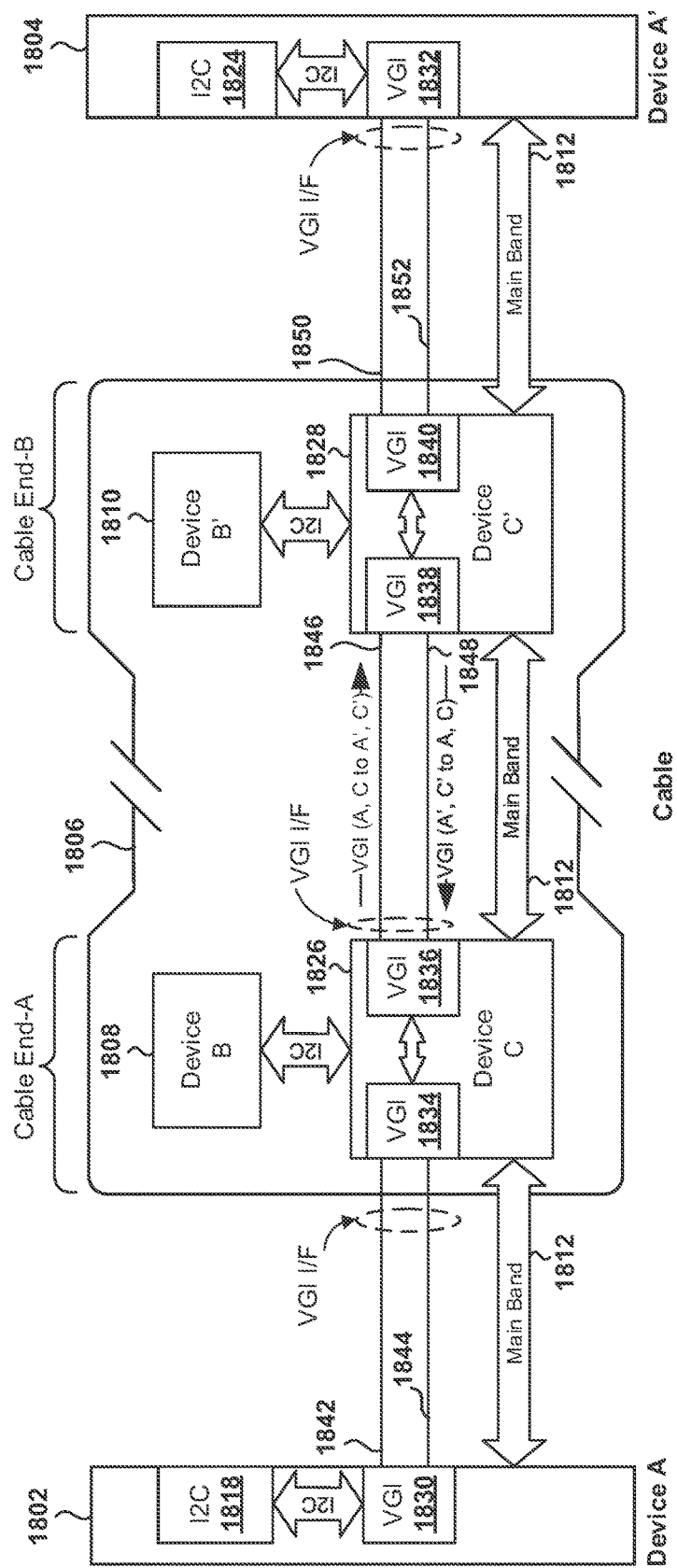
FIG. 18 is a diagram of a host device configured to communicate with a peripheral device using a cable in accordance with the various aspects of the disclosure.

FIG. 18 is a diagram of a host device configured to communicate with a peripheral device using a cable in accordance with the various aspects of the disclosure. In the example configuration of FIG. 18, the device A 1802 may be a host device and the device A' 1804 may be a peripheral device. As shown in FIG. 18, the device A 1802 is coupled to the device A' 1804 through the cable 1806. For example, the cable 1806 may be a PCI-SIG cable that includes one or more electronic devices, such as device B 1808, device B' 1810, device C 1826, and device C' 1828. For example, the device B 1808 and the device B' 1810 may store configuration information (e.g., parameters of the cable 1806) associated with the cable 1806. In such example, the cable 1806 may be referred to as a smart cable or a high-speed smart cable. For example, the device B 1808 and/or the device B' 1810 may include at least one EEPROM. The device C 1826 and the device C' 1828 may each be configured as a retimer and a sideband signal consolidator. For example, and as shown in FIG. 18, the device C 1826 may include a first VGI interface 1834 and a second VGI interface 1836, and the device C' 1828 may include a third VGI interface 1838 and a fourth VGI interface 1840.

As shown in FIG. 18, the device A 1802 may be configured to communicate with the device C 1826 over a first link, such as a first VGI link. For example, the first VGI link may include the first VGI interconnect 1842 and the second VGI interconnect 1844. Accordingly, the device A 1802 may include a VGI interface 1830 that is configured to transmit VGI signals to the device C 1826 over the first VGI interconnect 1842 and to receive VGI signals from the device C 1826 over the second VGI interconnect 1844. Similarly, the device A' 1804 is further configured to communicate with the device C' 1828 over a fourth dedicated link, such as a VGI link. For example, the fourth dedicated link may include the first VGI interconnect 1850 and the second VGI interconnect 1852. Accordingly, the device A' 1804 may include a VGI interface 1832 that is configured to receive VGI signals from the device C' 1828 over the first VGI interconnect 1850 and to transmit signals to the device C' 1828 over the second VGI interconnect 1852.

In an aspect, each VGI interface in the configuration of FIG. 18 may include an FSM, such as the FSM 1016 which does not require a clock pin as previously described with respect to FIG. 10. As shown in FIG. 18, the device A 1802 may include an I2C interface 1818 that is coupled to the VGI interface 1830. Accordingly, in the configuration of FIG. 18, the I2C interface 1818 may transmit I2C signals to the device B 1808 over the first VGI interconnect 1842 and to receive I2C signals from the device B 1808 over the second VGI interconnect 1844. As further shown in FIG. 18, the device A' 1804 may include an I2C interface 1824 that is coupled to the VGI interface 1832. Accordingly, in the configuration of FIG. 18, the I2C interface 1824 may transmit I2C signals to the device B' 1810 over the first VGI interconnect 1850 and to receive I2C signals from the device B' 1810 over the second VGI interconnect 1852. As shown in FIG. 18, the cable 1806 may enable communication of main band signals 1812 between the device A 1802 and the device A' 1804.

Therefore, with respect to the configuration in FIG. 18, I2C signals may be communicated between the device A 1802 and the device B 1808 over the VGI link (e.g., the first VGI interconnect 1842 and/or the second VGI interconnect 1844). Similarly, I2C signals may be communicated between the device A' 1804 and the device B' 1810 over the VGI link (e.g., the first VGI interconnect 1850 and/or the second VGI interconnect 1852). In an aspect, and as described below with respect to FIGS. 19 and 20, the communication of I2C signals over the VGI link may be achieved by implementing a dynamic link selection approach which enables communication of I2C signals over the VGI interface without protocol consolidation (e.g., without converting the I2C signals into VGI signals). In accordance with one aspect, a pre-determined amount of I2C data may be communicated over the VGI link for each data transaction. In accordance with another aspect, the dynamic link selection approach may incorporate a timeout feature to address communication failures and to control link occupancy periods.

In another aspect, I2C signals may be communicated over the VGI link by implementing a link tunneling approach which enables communication of I2C signals over the VGI interface with protocol consolidation (e.g., converting the I2C signals into VGI signals). Therefore, in this aspect, each of the VGI interfaces in FIG. 18 may include an interface bridge module. In one example, such interface bridge module may serve as a VGI to I2C interface bridge. In other examples, such interface bridge module may support other types of interfaces. For example, each of the VGI interfaces in FIG. 18 may include a VGI to UART interface bridge and/or a VGI to SPI interface bridge in addition to or in place of a VGI to I2C interface bridge.

It should be noted that in the configuration of FIG. 18, the number of interconnects needed between the device A 1802 and the cable 1806 at cable end A for communicating sideband signals may be reduced to two interconnects (e.g., first VGI interconnect 1842 and second VGI interconnect 1844). In other words, no dedicated links (e.g., an I2C link or an I3C link) are needed between the device A 1802 and the cable 1806 at cable end A. As such, no I2C pins are necessary on the device A 1802 and the device A' 1804, nor on high-speed cable 1806 (e.g., since I2C signals may be communicated over the first VGI interconnect 1842 and the second VGI interconnect, or the first VGI interconnect 1850 and the second VGI interconnect 1852). Therefore, the first VGI interconnect 1842 and the second VGI interconnect 1844 may be used to communicate VGI signals (e.g., VGI messages and/or VGI 1/Os) and/or I2C (or I3C) signals. In contrast, the configurations of FIGS. 15 through 17 need more than two interconnects to accommodate communication of such VGI signals and I2C (or I3C) signals.

It should also be noted that in general use, the first VGI interface 1834 in the cable 1806 may forward virtual GPIO and tunneled I2C signals it receives from VGI interface 1830 in device A 1802 to the second VGI interface 1836. The second VGI interface 1836 may forward the virtual GPIO and tunneled I2C signals to the third VGI interface 1838, which may transfer the virtual GPIO and tunneled I2C signals to the fourth VGI interface 1840. The fourth VGI interface 1840 may forward the virtual GPIO and tunneled I2C signals to the VGI interface 1832 in the device A' 1804. A similar end-to-end messaging occurs for signal flow from the device A' 1804 to the device A 1802. However, there are scenarios in which signaling is intended for the first VGI interface 1834 or the fourth VGI interface 1840. For example, the device A 1802 may need to poll device B 1808 to obtain cable characteristics of the cable 1806. To do so, the device A 1802 communicates through the VGI interface 1830 to the first VGI interface 1834. Similarly, the device A' 1804 may need to poll device B' 1810 through the fourth VGI interface 1840. In general, addressing would be necessary to indicate to the first VGI interface 1834 (or the fourth VGI interface 1840) as to whether a signal should be forwarded or not. In an aspect, however, the register mapping architecture of the VGI interfaces as disclosed herein enables multi-hop tunneling without an address header.

Link Selection without Protocol Consolidation

Figure 19:
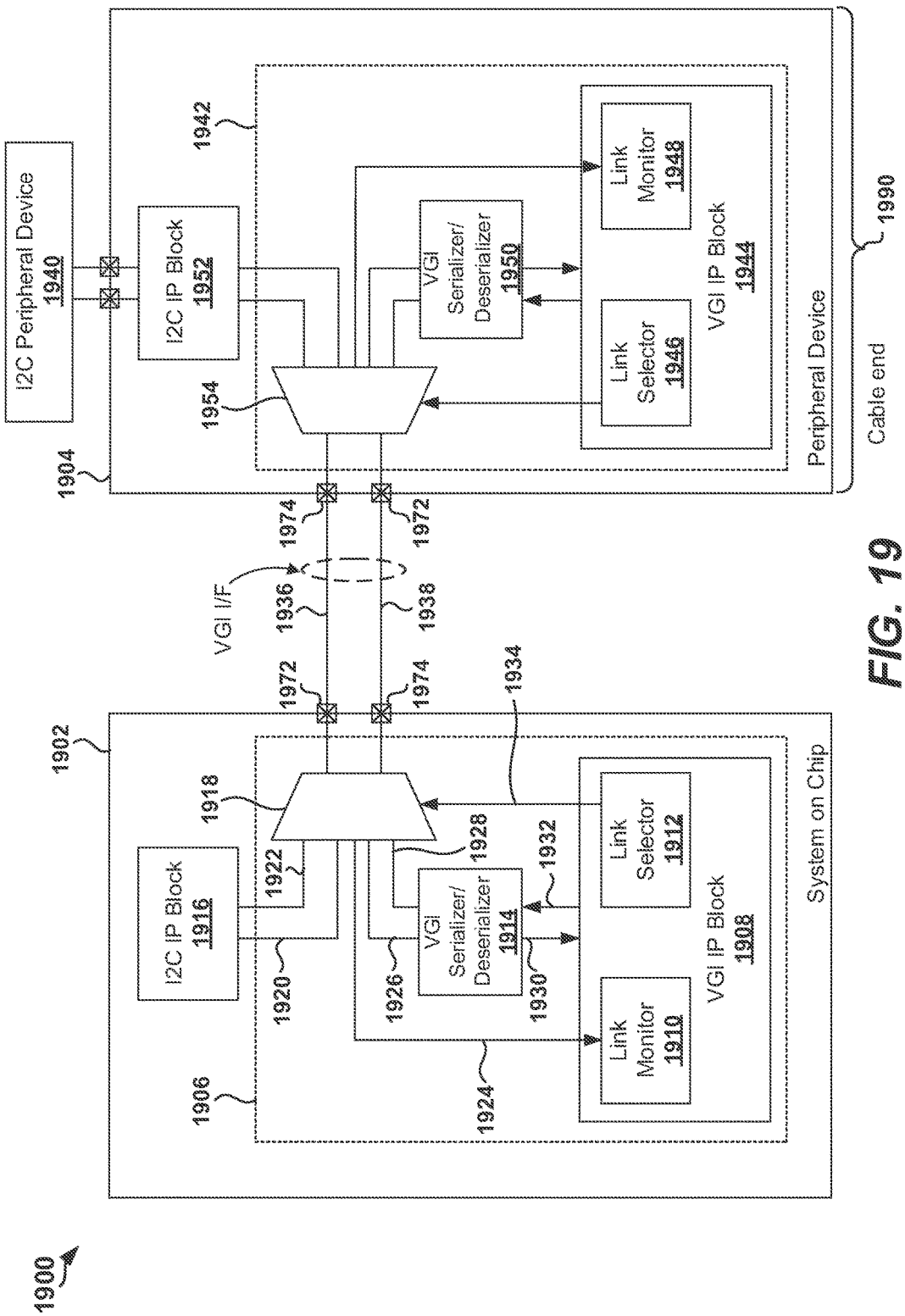
FIG. 19 illustrates an architecture that enables dynamic data-link selection without protocol consolidation.

FIG. 19 illustrates an architecture 1900 that enables dynamic data-link selection without protocol consolidation. As shown in FIG. 19, the architecture 1900 includes a first device 1902 coupled to a second device 1904 at a cable end 1990. For example, the first device 1902 may be a host device, such as a host SoC processor, and may include a VGI interface 1906 coupled to an I2C intellectual property (IP) block 1916. In such aspect, the VGI interface 1906 may include a VGI IP block 1908, a VGI serializer/deserializer module 1914, and a switch 1918. For example, the switch 1918 may be implemented as a multiplexer. In an aspect, the second device 1904 may be a peripheral device and may correspond to the device C 1826 situated at cable end A of the cable 1806 in FIG. 18. In such aspect, the VGI interface 1906 may correspond to the VGI interface 1830 in FIG. 18, the VGI interface 1942 may correspond to the VGI interface 1834 in FIG. 18, and the I2C peripheral device 1940 may correspond to the device B 1808 in FIG. 18.

The I2C IP block 1916 may communicate I2C signals through the I2C interconnects 1920 and 1922. For example, the I2C interconnect 1922 may be an I2C data line and the I2C interconnect 1920 may be an I2C clock line. The VGI IP block 1908 may transmit signals 1932 to the VGI serializer/deserializer module 1914, which may then serially transmit the signals 1932 through the interconnect 1928. The VGI serializer/deserializer module 1914 may serially receive signals through the interconnect 1926 and may transit the received signals 1930 (e.g., after deserializing the received signals 1930) to the VGI IP block 1908. As shown in FIG. 19, the interconnects 1920, 1922, 1926, and 1928 are coupled to the switch 1918. As further shown in FIG. 19, the VGI IP block 1908 may include a link selector 1912 and a link monitor 1910 that are coupled to the switch 1918. The link selector 1912 may provide a control signal 1934 that selectively couples the interconnects 1920 and 1922 or interconnects 1926 and 1928 to the interconnects 1936 and 1938. The link monitor 1910 may be configured to detect whether the I2C IP block 1916 has generated any I2C signals. If no I2C signals are detected at the link monitor 1910, the link monitor 1910 may control the link selector 1912 to select serialized VGI signals from the VGI serializer-deserializer 1914. For example, the link monitor 1910 may control the link selector 1912 to couple the interconnect 1926 to the interconnect 1938 and to couple the interconnect 1928 to the interconnect 1936. In one aspect, the link selector 1912 may be configured to perform arbitration in a case where both the I2C IP block 1916 and the VGI IP block 1908 need to transmit and/or receive signals. In an aspect, the arbitration may be performed based on a predetermined priority scheme. In another aspect, the arbitration may be performed based on an amount of data transmitted through the interconnects 1936, 1938 during a transmission and/or an amount of time of the transmission.

When the switch 1918 is configured by the link selector 1912 to communicate serialized VGPIO signals, the switch 1918 may drive the transmit pin 1972 as previously discussed with regard to hybrid virtual GPIO operation. In this scenario, the switch 1918 may receive serialized virtual GPIO signals through the receive pin 1974. However, when the switch 1918 is configured by the link selector 1912 to communicate I2C signals, the pin 1972 is repurposed as an I2C data pin, and the pin 1974 is repurposed as an I2C clock pin for I2C signal transmissions. In this scenario, the I2C signals are not tunneled through a virtual GPIO protocol as discussed with regard to the tunneling aspect of the disclosure. The link monitor 1910 at the VGI IP block 1908 may monitor the multiple links. Therefore, the link (e.g., the I2C IP block 1916 or the VGI IP block 1908) needing communication with the external device (e.g., the second device 1904) may be given access to the external physical interconnect (the VGI interface that includes the interconnects 1936 and 1938) coupling the first device 1902 and the second device 1904. In an aspect, the external physical interconnect may be a cable, such as the smart cable 1806, as described herein. In an aspect, the link monitor 1910 may receive signals 1924 from the switch 1918 and may keep track of the data transfer based on allocated volume and/or time. It can be appreciated that the VGI interface including the interconnects 1936 and 1938 may support more than one protocol without the need for protocol consolidation, thereby reducing the complexity of the architecture 1900.

In the aspect of FIG. 19, the second device 1904 may be a peripheral device and may include a VGI interface 1942 coupled to an I2C IP block 1952. In such aspect, and similar to the VGI interface 1906, the VGI interface 1942 may include a VGI IP block 1944, a VGI serializer/deserializer module 1950, and a switch 1954. The VGI IP block 1944 may include a link selector 1946 and a link monitor 1948. For example, the switch 1954 may be implemented as a multiplexer. In an aspect, the I2C IP block 1952 may transmit and receive I2C signals to and from an I2C peripheral 1940. For example, the VGI interface 1942 may operate in a manner similar to the previously described VGI interface 1906. Accordingly, the VGI interface 1942 may dynamically configure the switch 1954 for communicating the appropriate signals (e.g., VGPIO signals or I2C signals) with the VGI interface 1906 through the interconnects 1936, 1938.

Figure 20:
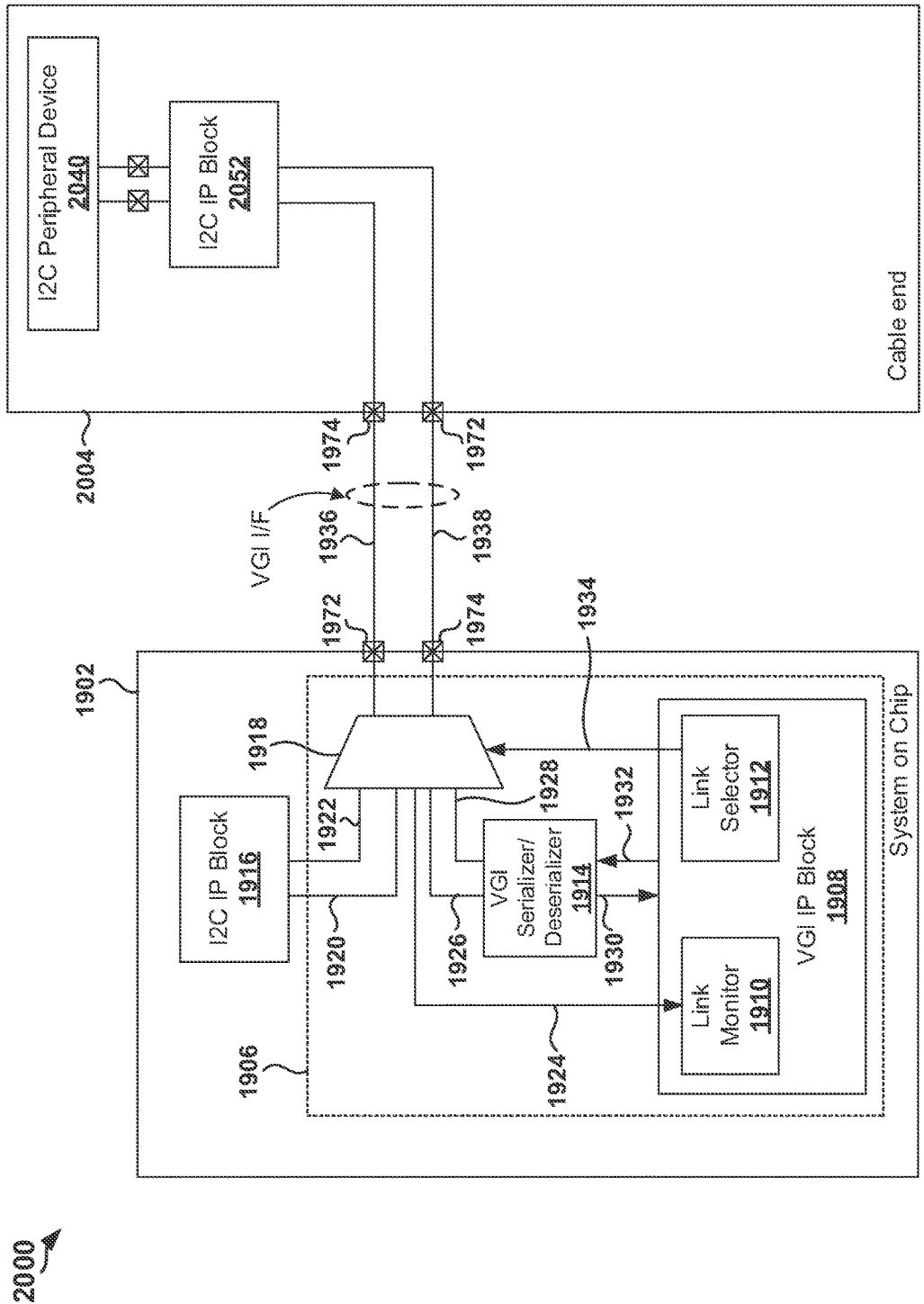
FIG. 20 illustrates an architecture that enables dynamic data-link selection without protocol consolidation in accordance with various aspects of the disclosure.

FIG. 20 illustrates an architecture 2000 that enables dynamic data-link selection without protocol consolidation in accordance with various aspects of the disclosure. In the aspect of FIG. 20, the previously described first device 1902 is coupled to a cable end 2004. As shown in FIG. 20, the cable end 2004 includes an I2C peripheral device 2040 and an I2C IP block 2052. It should be noted that in the aspect of FIG. 20, the cable end 2004 does not include a VGI interface. Therefore, it can be appreciated that the VGI interface 1906 may communicate I2C signals (e.g., with the I2C peripheral device 2040) via the interconnects 1936, 1938 with a cable that does not include a VGI interface.

Link Bridging with Protocol Consolidation

Figure 21:
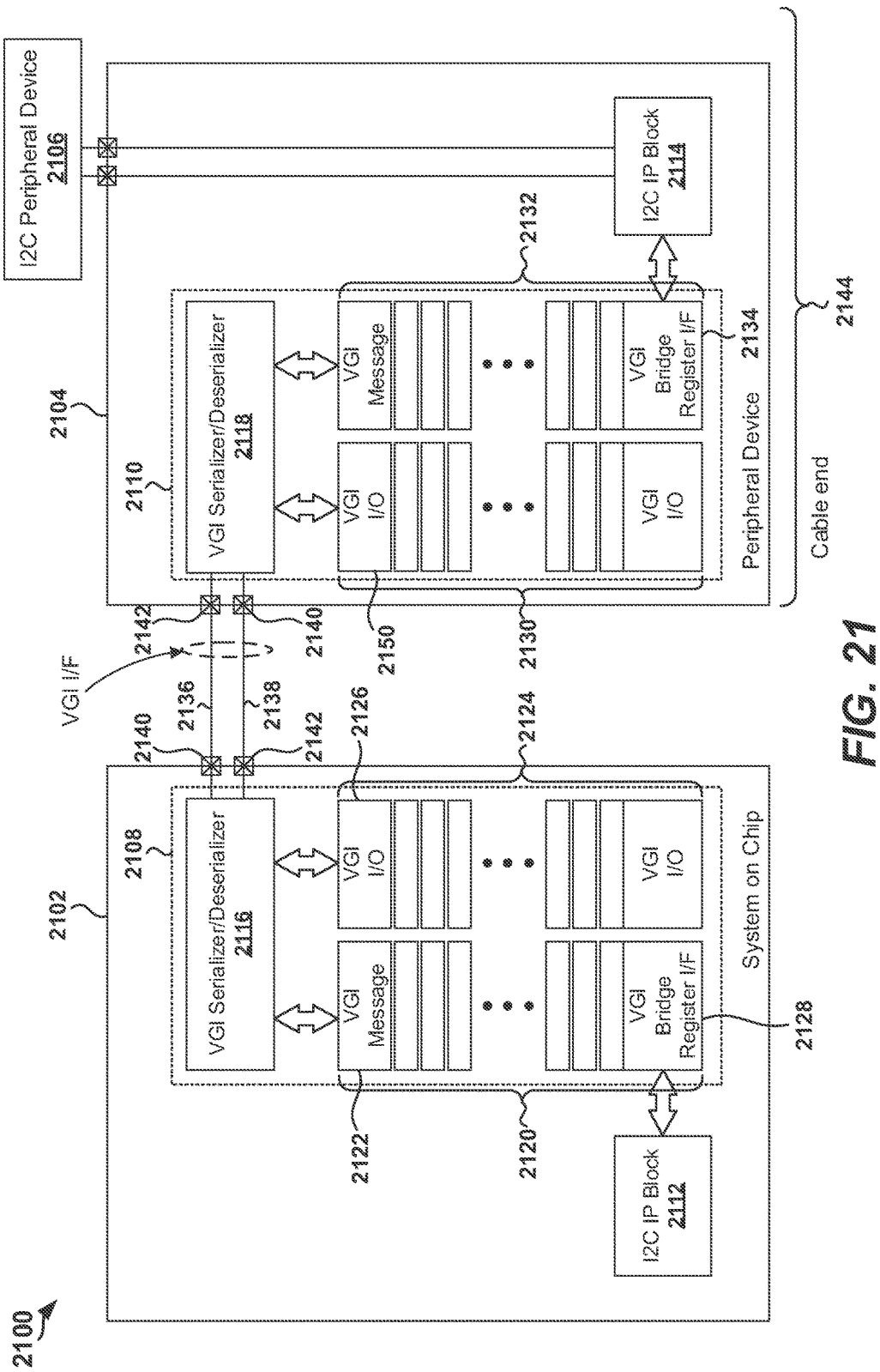
FIG. 21 illustrates an architecture that implements link bridging with protocol consolidation.

FIG. 21 illustrates an architecture 2100 that implements link bridging with protocol consolidation. As shown in FIG. 21, the architecture 2100 includes a first device 2102 and a second device 2104. For example, the first device 2102 may be a host device, such as a host SoC processor, and may include a VGI interface 2108 coupled to an I2C intellectual property (IP) block 2112. In such aspect, the VGI interface 2108 may include a VGI serializer/deserializer 2116, a set of VGI message registers 2120, and a set a VGI I/O registers 2124. In an aspect, the VGI serializer/deserializer 2116 may access one or more registers in the set of VGI message registers 2120, such as the VGI message register 2122. The VGI serializer/deserializer 2116 may also access one or more registers in the set of VGI I/O registers 2124, such as the VGI I/O register 2126. For example, the second device 2104 may be a peripheral device and may include a VGI interface 2110 coupled to an I2C intellectual property (IP) block 2114. In such aspect, the VGI interface 2110 may include a VGI serializer/deserializer 2118, a set of VGI message registers 2132, and a set a VGI I/O registers 2130. In an aspect, the VGI serializer/deserializer 2118 may access one or more registers in the set of VGI message registers 2132 and/or one or more registers in the set of VGI I/O registers 2130. As shown in FIG. 21, the VGI interface 2108 of the first device 2102 may be coupled to the VGI interface 2110 of the second device 2104 via a VGI interface that includes VGI interconnects 2136, 2138.

In one aspect, one or more of the registers in the set of VGI message registers 2120 may be configured as bridge registers for communicating signals of a different serial bus communication protocol (e.g., signals of an IP block different from a VGI IP block, such as an I2C IP block). For example, in the configuration of FIG. 21, the VGI bridge register 2128 in the VGI interface 2108 may be mapped to a VGI bridge register 2134 in the VGI interface 2110. In such example, the I2C IP block 2112 may transfer an I2C signal (e.g., an I2C signal intended for the I2C peripheral 2106) to the VGI bridge register 2128. Accordingly, the VGI interface 2108 may detect the I2C signal in the VGI bridge register 2128 and may transmit the I2C signal over the VGI interconnect 2136 as a VGI serial transmission using the VGI communication protocol. The VGI interface 2110 may receive the VGI transmission and may obtain the I2C signal. The VGI interface 2110 may then transfer the I2C signal to the VGI bridge register 2134 (e.g., due to the mapping of the VGI bridge register 2128 to the VGI bridge register 2134). The I2C IP block 2114 may detect the I2C signal in the VGI bridge register 2134 and may transfer the I2C signal to the I2C peripheral device 2106. Therefore, in this aspect, a signal of a different protocol (e.g., I2C communication protocol) may be consolidated over a unified VGI communication protocol.

Similarly, the I2C IP block 2114 may receive an I2C signal (e.g., an I2C signal intended for the I2C IP block 2112) from the I2C peripheral 2106 and may transfer the I2C signal to the VGI bridge register 2134. The VGI interface 2110 may detect the I2C signal in the VGI bridge register 2134 and may transmit the I2C signal over the VGI interconnect 2138 as a VGI serial transmission using the VGI communication protocol. The VGI interface 2108 may receive the VGI serial transmission and may obtain the I2C signal. The VGI interface 2108 may then transfer the I2C signal to the VGI bridge register 2128 (e.g., due to the mapping of the VGI bridge register 2128 to the VGI bridge register 2134). The I2C IP block 2112 may detect the I2C signal in the VGI bridge register 2128 and may receive the I2C signal. Therefore, in this aspect, a signal of a different protocol (e.g., I2C protocol) may be consolidated over a unified VGI communication protocol. In an aspect, the second device 2104 and the I2C peripheral device 2106 may be configured at a cable end 2144. For example, the cable end 2144 may correspond to the cable end A of cable 1806 in FIG. 18.

Figure 22:
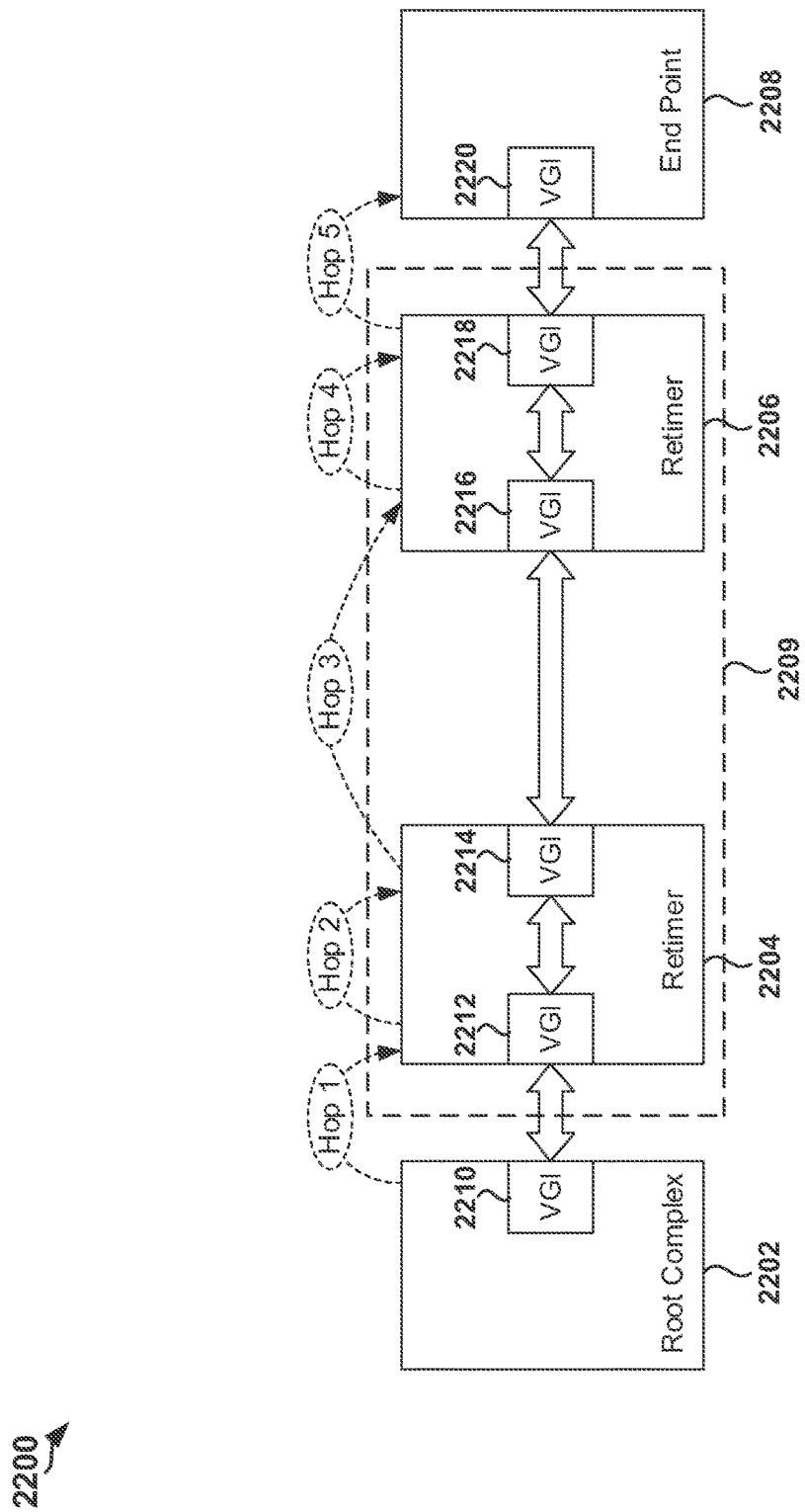
FIG. 22 shows an architecture for PCI-SIG sideband signaling with multi-hop messaging.

FIG. 22 shows an architecture 2200 for PCI-SIG sideband signaling with multi-hop messaging. As shown in FIG. 22, the architecture 2200 includes a first device 2202 coupled to a second device 2208 via a cable 2209. In one example, the first device 2202 may be a host device, such as a host SoC processor, and may include a VGI interface 2210. In such example, the second device 2208 may be a peripheral device and may include a VGI interface 2220. The cable 2209 may be a smart cable that includes a first retimer 2204 and a second retimer 2206.

In one example scenario, the first device 2202 (also referred to as a root complex in FIG. 22) may obtain sideband signals that are to be transmitted to the second device 2208 (also referred to as an end point in FIG. 22). The first device 2202 may transmit the sideband signals in a source-routed addressing message to the second device 2208 via the VGI interface 2210. The first retimer 2204 may be configured to receive the message from the VGI interface 2210 at the VGI interface 2212. The VGI interface 2212 may transfer the message to the VGI interface 2214, which may then transmit the message to the second retimer 2206 with adequate signal quality to ensure proper reception at the second retimer 2206. The second retimer 2206 may receive the message at the VGI interface 2216 and may transfer the message to the VGI interface 2218. The VGI interface 2218 may transmit the message to the VGI interface 2220 of the second device 2208. The second device 2208 may then obtain the sideband signals from the received message.

The source-routed addressing message approach described above may be complex and may suffer limitations based on the number of hops that the source-routed addressing message must pass through to reach a destination (e.g., an endpoint or end node). For example, in the example described above with respect to architecture 2200, the source-routed addressing message transmitted from the first device 2202 to the second device 2208 must take five hops (as shown in FIG. 22) to reach the second device 2208. Therefore, a source-routing addressing scheme involving an 11-bit address field may need to be used in this case. In an aspect, a Cartesian addressing scheme may be implemented to allow address-table free message passing within the VGI network.

Figure 23:
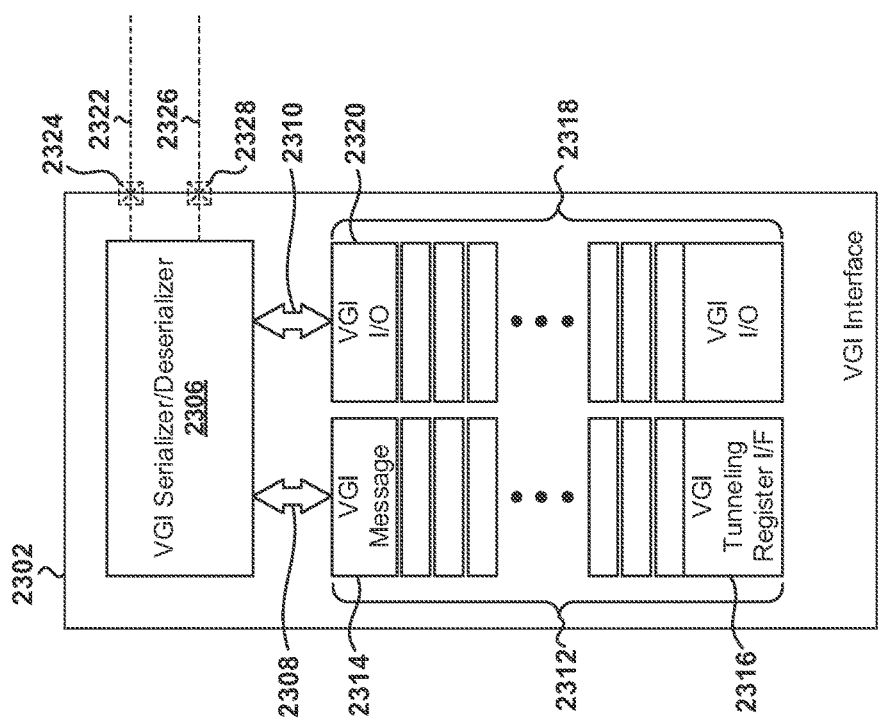
FIG. 23 illustrates an example VGI interface in accordance with various aspects of the disclosure.

FIG. 23 illustrates an example VGI interface 2302 in accordance with various aspects of the disclosure. As shown in FIG. 23, the VGI interface 2302 may include a VGI serializer/deserializer 2306, a set of VGI message registers 2312, and a set a VGI I/O registers 2318. In an aspect, the VGI serializer/deserializer 2306 may access (e.g., via bus 2308) one or more registers in the set of VGI message registers 2312, such as the VGI message register 2314. In an aspect, one or more of the VGI message registers may be designated as VGI tunneling registers (e.g., the VGI tunneling register 2316). The VGI serializer/deserializer 2306 may also access (e.g., via bus 2310) one or more registers in the set of VGI I/O registers 2318, such as the VGI I/O register 2320. As shown in FIG. 23, the VGI interface 2302 may transmit VGI signals through a first VGI interconnect 2322 coupled to a transmit pin 2324, and may receive VGI signals through a second VGI interconnect 2326 coupled to a receive pin 2328.

Figure 24:
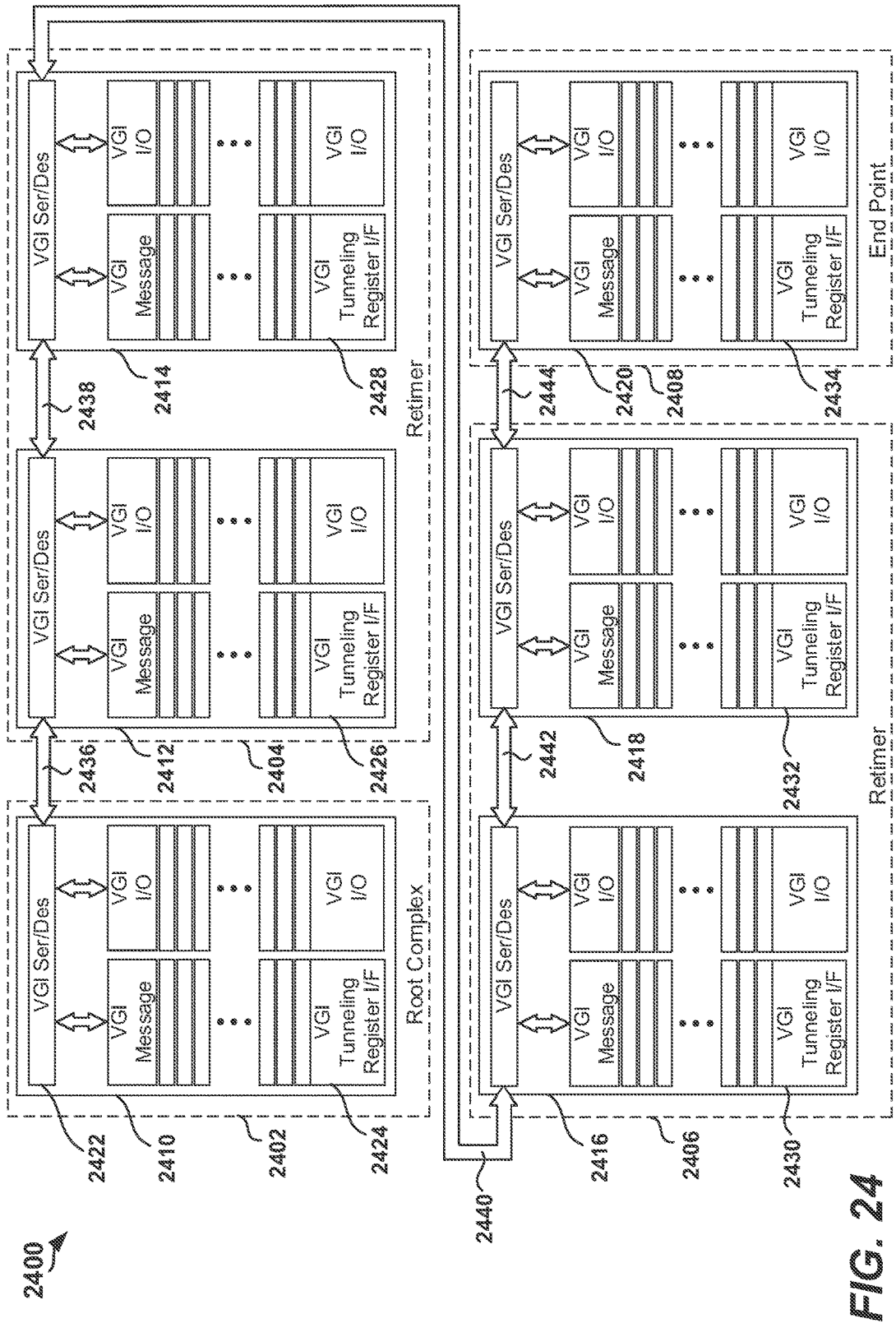
FIG. 24 is an example register mapping architecture for implementing multi-hop link tunneling in accordance with various aspects of the disclosure.

FIG. 24 is an example register mapping architecture 2400 for implementing multi-hop link tunneling in accordance with various aspects of the disclosure. As shown in FIG. 24, architecture 2400 includes a first device 2402 coupled to a second device 2408. In one example, the first device 2402 may be a host device, such as a host SoC processor, and may include a VGI interface 2410. In such example, the second device 2408 may be a peripheral device and may include a VGI interface 2420.

In an aspect, the first device 2402 may communicate messages (e.g., VGI messages) to the second device 2408 through the retimers 2404 and 2406. In an aspect, the retimers 2204 and 2206 may be installed in a cable (e.g., a smart cable) to provide for the retiming, such as the previously described cable 1806 in FIG. 18. As shown in FIG. 24, the retimer 2204 may include VGI interfaces 2412, 2414, and the retimer 2204 may include VGI interfaces 2416, 2418. In an aspect, each of the VGI interfaces 2410, 2412, 2414, 2416, 2418, and 2420 may be similar to the previously described VGI interface 2302 of FIG. 23. Accordingly, in such aspect, each of the data paths 2436, 2438, 2440, 2442, and 2444 in FIG. 24 may include first and second VGI interconnects (e.g., first VGI interconnect 2322 and second VGI interconnect 2326).

In an aspect, a message (e.g., a tunneled I2C message) that is to be transmitted from the VGI interface 2410 (also referred to as a root complex) to the VGI interface 2420 (also referred to as an end point) via end-to-end multi-hop tunneling may be written by the VGI interface 2410 to a VGI tunneling register 2424. Each VGI interface, such as the VGI interface 2412, may recognize the presence of a bit (or bits) in its VGI tunneling register (e.g., VGI tunneling register 2426) as a command to forward the corresponding message in its VGI tunneling register to a next VGI tunneling register (e.g., VGI tunneling register 2428). Retimer 2404 at one end of the high-speed cable transmits to a retimer 2406 at an opposing end of the high-speed cable. Due to the indication in their tunneling registers, the VGI interface 2416 forwards the message in its VGI tunneling register 2430 to the VGI tunneling register 2432 at the VGI interface 2418. The VGI interface 2418 then forwards the message to the VGI tunneling register 2434 at the VGI interface 2420. In a scenario where a message at the VGI interface 2410 is intended for an intermediate stop (for example, from first device 2402 to the VGI interface 2416), a node identifier associated with the VGI interface 2416 may be transmitted with the message. In either case, no explicit addressing scheme is necessary. Note that this protocol consolidation is not limited to the tunneling of I2C messages over a VGI link. The same protocol consolidation may be widely applied to other protocols using messaging signals such as UART, SPI, etc.

First Exemplary Device and Method

Figure 25:
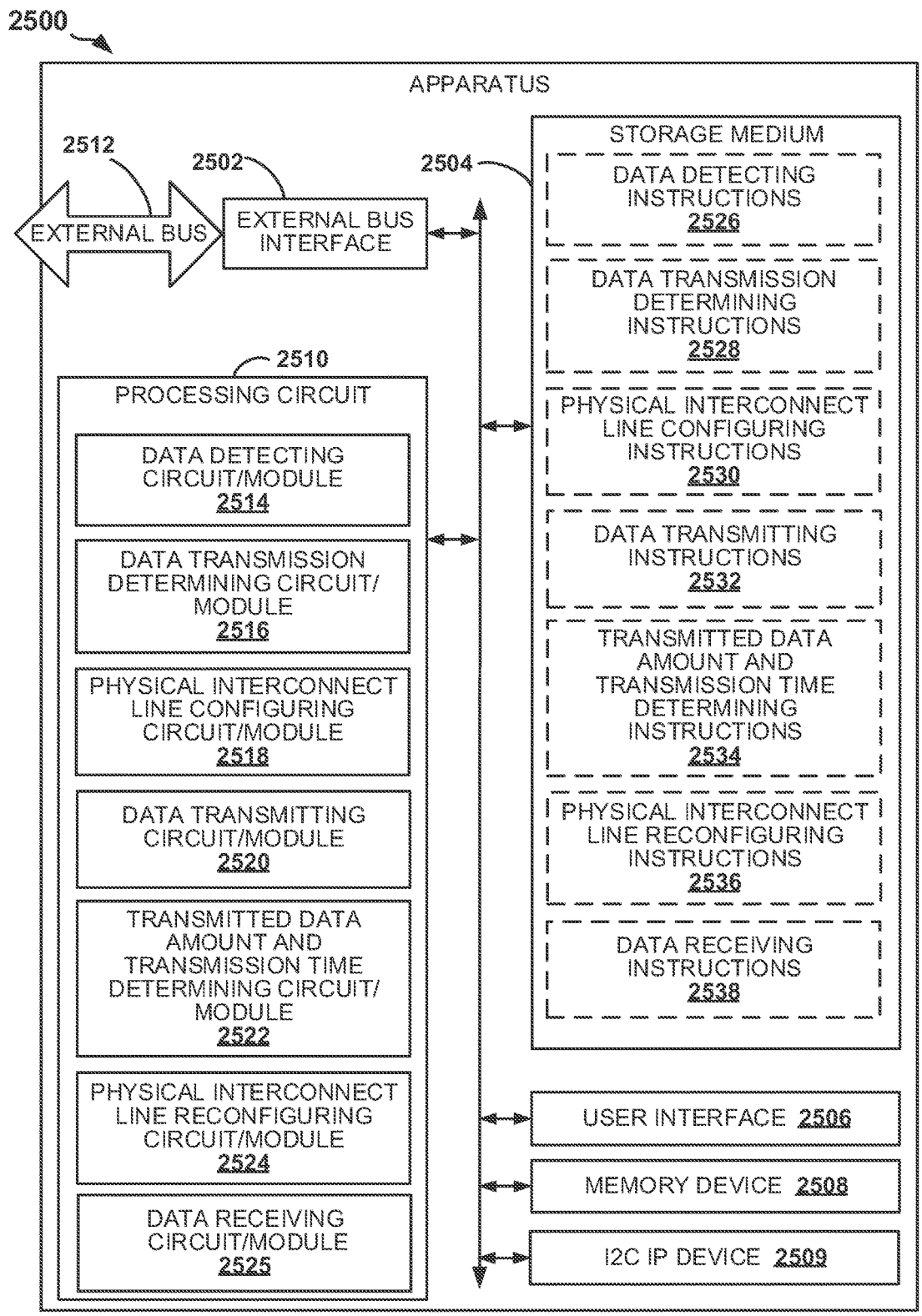
FIG. 25 is block diagram illustrating select components of an apparatus according to at least one example of the disclosure.

FIG. 25 is block diagram illustrating select components of an apparatus 2500 according to at least one example of the disclosure. The apparatus 2500 includes an external bus interface (or communication interface circuit) 2502, a storage medium 2504, a user interface 2506, a memory device 2508, an I2C IP device 2509, and a processing circuit 2510. The processing circuit is coupled to or placed in electrical communication with each of the external bus interface 2502, the storage medium 2504, the user interface 2506, the memory device 2508, and the I2C IP device 2509.

The external bus interface 2502 provides an interface for the components of the apparatus 2500 to an external bus 2512. The external bus interface 2502 may include, for example, one or more of: signal driver circuits, signal receiver circuits, amplifiers, signal filters, signal buffers, or other circuitry used to interface with a signaling bus or other types of signaling media. In an aspect, the external bus 2512 may include two physical interconnect lines (e.g., the first VGI interconnect 1842 and the second VGI interconnect 1844 shown in FIG. 18) for transmitting and receiving VGI signals and/or I2C signals.

The processing circuit 2510 is arranged to obtain, process and/or send data, control data access and storage, issue commands, and control other desired operations. The processing circuit 2510 may include circuitry adapted to implement desired programming provided by appropriate media in at least one example. In some instances, the processing circuit 2510 may include circuitry adapted to perform a desired function, with or without implementing programming. By way of example, the processing circuit 2510 may be implemented as one or more processors, one or more controllers, and/or other structure configured to execute executable programming and/or perform a desired function. Examples of the processing circuit 2510 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2510 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2510 are for illustration and other suitable configurations within the scope of the disclosure are also contemplated.

The processing circuit 2510 is adapted for processing, including the execution of programming, which may be stored on the storage medium 2504. As used herein, the terms "programming" or "instructions" shall be construed broadly to include without limitation instruction sets, instructions, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 2510 may include one or more of: a data detecting circuit/module 2514, a data transmission determining circuit/module 2516, a physical interconnect line configuring circuit/module 2518, a data transmitting circuit/module 2520, a transmitted data amount and transmission time determining circuit/ module 2522, a physical interconnect line reconfiguring circuit/module 2524, or a data receiving circuit/module 2525.

The data detecting circuit/module 2514 may include circuitry and/or instructions (e.g., data detecting instructions 2526 stored on the storage medium 2504) adapted to detect at least one of first data to be transmitted to a first device using a serial bus communication protocol or second data to be transmitted to a second device using a virtual general purpose input/output communication protocol. In an aspect, the link monitor 1910 in FIG. 19 may be implemented using the data detecting circuit/module 2514. For example, the first data may include a set of I2C signals, and the second data may include a set of virtual general purpose input/ output signals. In an aspect, the data detecting circuit/ module 2514 may be configured to monitor a first communication module for a transmission attempt of the first data and monitor a second communication module for a transmission attempt of the second data. For example, the first communication module may be an I2C IP block (e.g., I2C IP block 1916 in FIG. 19), and the second communication module may be a VGI IP block (e.g., VGI IP block 1908 in FIG. 19).

The data transmission determining circuit/module 2516 may include circuitry and/or instructions (e.g., data transmission determining instructions 2528 stored on the storage medium 2504) adapted to determine whether to transmit the first data or the second data. In an aspect, the data transmission determining circuit/module 2516 may determine whether to transmit the first data or the second data through the physical interconnect line based on a priority setting. For example, the priority setting may indicate to allow the transmission of any second data (e.g., VGI signals) prior to any first data (e.g., I2C signals).

The physical interconnect line configuring circuit/module 2518 may include circuitry and/or instructions (e.g., physical interconnect line configuring instructions 2530 stored on the storage medium 2504) adapted to configure the physical interconnect line coupled to the integrated circuit for either the serial bus communication protocol or the virtual general purpose input/output communication protocol based on the determination. In an aspect, the physical interconnect line configuring circuit/module 2518 may configure the physical interconnect line by coupling one of a first communication module that includes the first data or a second communication module that includes the second data to the physical interconnect line. In an aspect, at least a portion of the physical interconnect line is configured in a cable that couples a host device to a remote device. For example, the physical interconnect line configuring circuit/module 2518 may be implemented as a switch (e.g., the switch 1918 in FIG. 19), such as a multiplexer.

The data transmitting circuit/module 2520 may include circuitry and/or instructions (e.g., data transmitting instructions 2532 stored on the storage medium 2504) adapted to transmit, through the physical interconnect line, the first data to the first device using the serial bus communication protocol or the second data to the second device using the virtual general purpose input/output communication protocol. For example, the physical interconnect line may be the interconnect 1936 in FIG. 19.

The transmitted data amount and transmission time determining circuit/module 2522 may include circuitry and/or instructions (e.g., transmitted data amount and transmission time determining instructions 2534 stored on the storage medium 2504) adapted to determine at least one of an amount of data transmitted through the physical interconnect during a transmission or an amount of time of the transmission.

The physical interconnect line reconfiguring circuit/module 2524 may include circuitry and/or instructions (e.g., physical interconnect line reconfiguring instructions 2536 stored on the storage medium 2504) adapted to reconfigure the physical interconnect line coupled to the integrated circuit for either the serial bus communication protocol or the virtual general purpose input/output communication protocol when the amount of data exceeds a first threshold or when the amount of time exceeds a second threshold. For example, the physical interconnect line reconfiguring circuit/module 2524 may provide a control signal to the physical interconnect line configuring circuit/module 2518 to achieve the reconfiguration. For example, such control signal may be similar to the control signal 1934 (previously described with respect to FIG. 19) that selectively couples the interconnects 1920 and 1922 or interconnects 1926 and 1928 to the interconnects 1936 and 1938 in FIG. 19.

The data receiving circuit/module 2525 may include circuitry and/or instructions (e.g., data receiving instructions 2538 stored on the storage medium 2504) adapted to receive, through the physical interconnect line, third data from the first device using the serial bus communication protocol or fourth data from the second device using the virtual general purpose input/output communication protocol. For example, the first device may be a memory device (e.g., device B 1808 in FIG. 18) situated in a cable (e.g., cable 1806) that couples a host device (e.g., device A 1802) to a remote device (e.g., device A' 1804). In such example, at least a portion of the physical interconnect line (e.g., the first VGI interconnect 1842) may be configured in the cable (e.g., cable 1806), and the third data may be stored in the first device. The third data may include configuration data associated with the cable and may be received as I2C signals.

The storage medium 2504 may represent one or more processor-readable devices for storing programming, electronic data, databases, or other digital information. The storage medium 2504 may also be used for storing data that is manipulated by the processing circuit 2510 when executing programming. The storage medium 2504 may be any available media that can be accessed by the processing circuit 2510, including portable or fixed storage devices, optical storage devices, and various other mediums capable of storing, containing and/or carrying programming. By way of example and not limitation, the storage medium 2504 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof. Thus, in some implementations, the storage medium may be a non-transitory (e.g., tangible) storage medium.

The storage medium 2504 may be coupled to the processing circuit 2510 such that the processing circuit 2510 can read information from, and write information to, the storage medium 2504. That is, the storage medium 2504 can be coupled to the processing circuit 2510 so that the storage medium 2504 is at least accessible by the processing circuit 2510, including examples where the storage medium 2504 is integral to the processing circuit 2510 and/or examples where the storage medium 2504 is separate from the processing circuit 2510.

Programming/instructions stored by the storage medium 2504, when executed by the processing circuit 2510, causes the processing circuit 2510 to perform one or more of the various functions and/or process steps described herein. For example, the storage medium 2504 may include one or more of: the data detecting instructions 2526, data transmission determining instructions 2528, physical interconnect line configuring instructions 2530, data transmitting instructions 2532, transmitted data amount and transmission time determining instructions 2534, physical interconnect line reconfiguring instructions 2536, or data receiving instructions 2538. Thus, according to one or more aspects of the disclosure, the processing circuit 2510 is adapted to perform (in conjunction with the storage medium 2504) any or all of the processes, functions, steps and/or routines for any or all of the apparatuses described herein. As used herein, the term "adapted" in relation to the processing circuit 2510 may refer to the processing circuit 2510 being one or more of configured, employed, implemented, and/or programmed (in conjunction with the storage medium 2504) to perform a particular process, function, step and/or routine according to various features described herein.

The memory device 2508 may represent one or more memory devices and may comprise any of the memory technologies listed above or any other suitable memory technology. The memory device 2508 may store information used by one or more of the components of the apparatus 2500. The memory device 2508 also may be used for storing data that is manipulated by the processing circuit 2510 or some other component of the apparatus 2500. In some implementations, the memory device 2508 and the storage medium 2504 are implemented as a common memory component.

The user interface 2506 includes functionality that enables a user to interact with the apparatus 2500. For example, the user interface 2506 may interface with one or more user output devices (e.g., a display device, etc.) and one or more user input devices (e.g., a keyboard, a tactile input device, etc.).

With the above in mind, examples of operations according to the disclosed aspects will be described in more detail in conjunction with the flowchart of FIG. 26. For convenience, the operations of FIG. 26 (or any other operations discussed or taught herein) may be described as being performed by specific components. It should be appreciated, however, that in various implementations these operations may be performed by other types of components and may be performed using a different number of components. It also should be appreciated that one or more of the operations described herein may not be employed in a given implementation.

Figure 26:
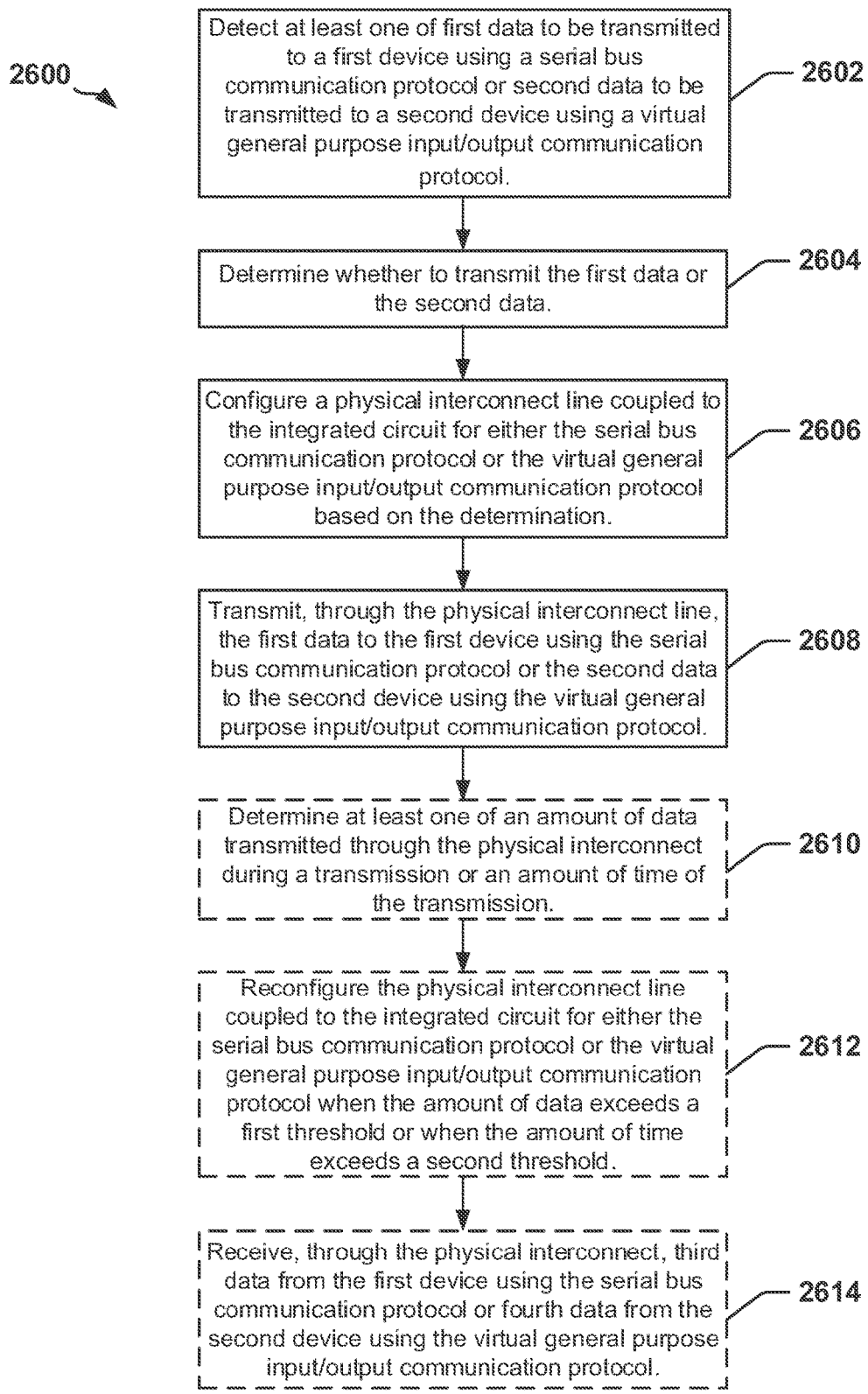
FIG. 26 is a flowchart illustrating a method for an integrated circuit.

FIG. 26 is a flowchart 2600 illustrating a method for an integrated circuit (e.g., the VGI interface 1902 or the processing circuit 2510) to enable dynamic data-link selection without protocol consolidation. It should be understood that the operations in FIG. 26 represented with dashed lines represent optional operations.

The integrated circuit detects at least one of first data to be transmitted to a first device using a serial bus communication protocol (e.g., I2C or I3C) or second data to be transmitted to a second device using a virtual general purpose input/output communication protocol 2602. The integrated circuit determines whether to transmit the first data or the second data 2604. The integrated circuit configures a physical interconnect line coupled to the integrated circuit for either the serial bus communication protocol or the virtual general purpose input/output communication protocol based on the determination 2606. The integrated circuit transmits, through the physical interconnect line, the first data to the first device using the serial bus communication protocol or the second data to the second device using the virtual general purpose input/output communication protocol 2608. The integrated circuit determines at least one of an amount of data transmitted through the physical interconnect during a transmission or an amount of time of the transmission 2610. The integrated circuit reconfigures the physical interconnect line coupled to the integrated circuit for either the serial bus communication protocol or the virtual general purpose input/output communication protocol when the amount of data exceeds a first threshold or when the amount of time exceeds a second threshold 2612. The integrated circuit receives, through the physical interconnect, third data from the first device using the serial bus communication protocol or fourth data from the second device using the virtual general purpose input/output communication protocol 2614.

In an aspect, configuring the physical interconnect line includes coupling one of a first communication module (e.g., an I2C IP block) that includes the first data or a second communication module (e.g., a VGI IP block) that includes the second data to the physical interconnect line. In an aspect, the determining whether to transmit the first data or the second data through the physical interconnect line is based on a priority setting. In an aspect, at least a portion of the physical interconnect line is configured in a cable (e.g., cable 1806) that couples a host device to a remote device. In an aspect, the first data comprises a set of I2C signals, and the second data comprises a set of virtual general purpose input/output signals. In an aspect, the detecting includes monitoring a first communication module (e.g., an I2C IP block) for a transmission attempt of the first data and monitoring a second communication module (e.g., a VGI IP block) for a transmission attempt of the second data. In an aspect, the first device is a memory device situated in a cable that couples a host device to a remote device, wherein at least a portion of the physical interconnect line is configured in the cable, and wherein the third data is stored in the first device and comprises configuration data associated with the cable.

Second Exemplary Device and Method

Figure 27:
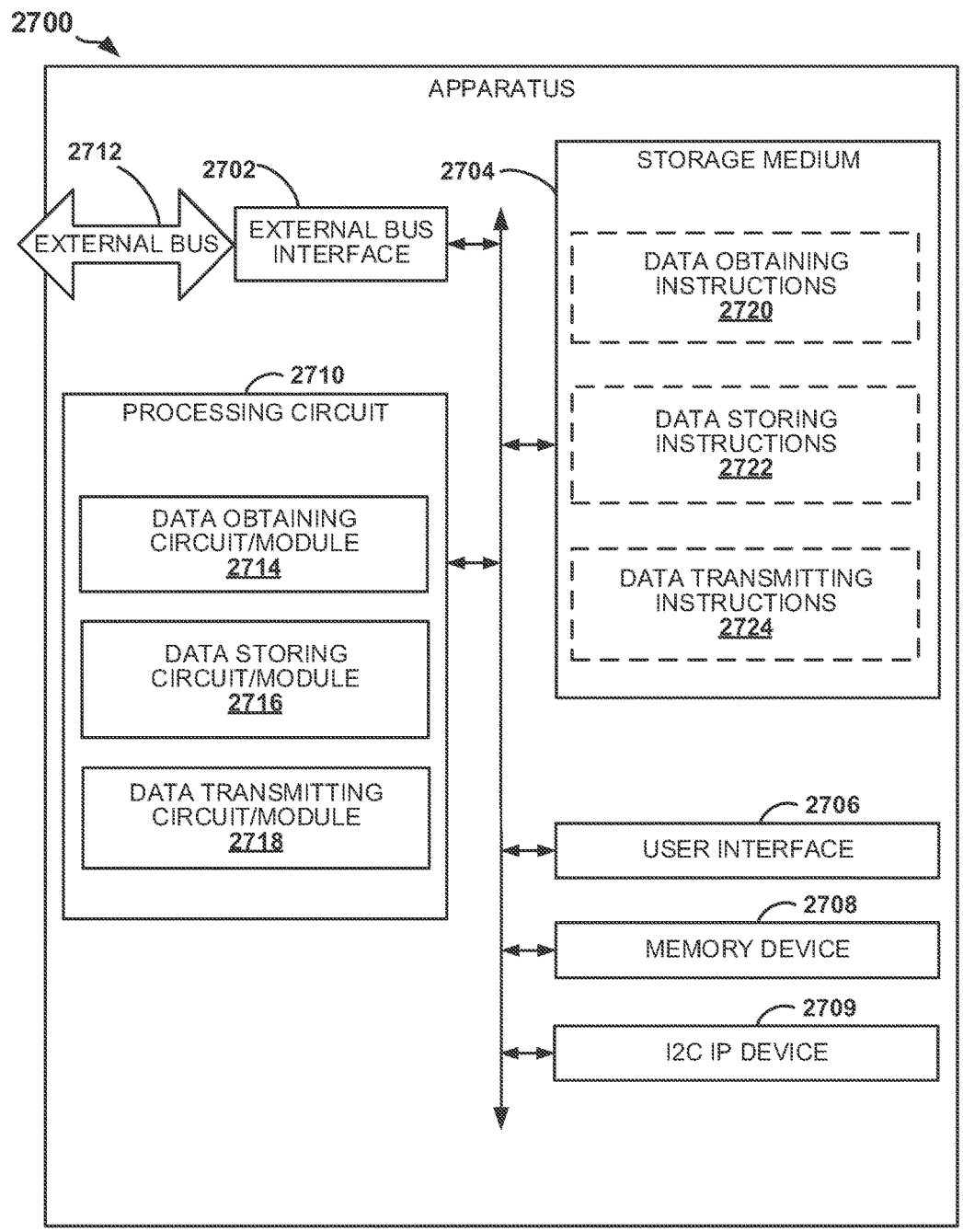
FIG. 27 is block diagram illustrating select components of an apparatus according to at least one example of the disclosure.

FIG. 27 is block diagram illustrating select components of an apparatus 2700 according to at least one example of the disclosure. The apparatus 2700 includes an external bus interface (or communication interface circuit) 2702, a storage medium 2704, a user interface 2706, a memory device 2708, an I2C IP device 2709, and a processing circuit 2710. The processing circuit is coupled to or placed in electrical communication with each of the external bus interface 2702, the storage medium 2704, the user interface 2706, the memory device 2708, and the I2C IP device 2709.

The external bus interface 2702 provides an interface for the components of the apparatus 2700 to an external bus 2712. The external bus interface 2702 may include, for example, one or more of: signal driver circuits, signal receiver circuits, amplifiers, signal filters, signal buffers, or other circuitry used to interface with a signaling bus or other types of signaling media.

The external bus interface 2702 provides an interface for the components of the apparatus 2700 to an external bus 2712. The external bus interface 2702 may include, for example, one or more of: signal driver circuits, signal receiver circuits, amplifiers, signal filters, signal buffers, or other circuitry used to interface with a signaling bus or other types of signaling media. In an aspect, the external bus 2712 may include two physical interconnect lines (e.g., the VGI interconnects 2136, 2138 shown in FIG. 21) for transmitting and receiving VGI signals.

The processing circuit 2710 is arranged to obtain, process and/or send data, control data access and storage, issue commands, and control other desired operations. The processing circuit 2710 may include circuitry adapted to implement desired programming provided by appropriate media in at least one example. In some instances, the processing circuit 2710 may include circuitry adapted to perform a desired function, with or without implementing programming. By way of example, the processing circuit 2710 may be implemented as one or more processors, one or more controllers, and/or other structure configured to execute executable programming and/or perform a desired function. Examples of the processing circuit 2710 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2710 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2710 are for illustration and other suitable configurations within the scope of the disclosure are also contemplated.

The processing circuit 2710 is adapted for processing, including the execution of programming, which may be stored on the storage medium 2704. As used herein, the terms "programming" or "instructions" shall be construed broadly to include without limitation instruction sets, instructions, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 2710 may include one or more of: a data obtaining circuit/module 2714, a data storing circuit/module 2716, or a data transmitting circuit/module 2718.

The data obtaining circuit/module 2714 may include circuitry and/or instructions (e.g., data obtaining instructions 2720 stored on the storage medium 2704) adapted to obtain first data configured for transmission to a first device using a serial bus communication protocol (e.g., I2C or I3C) and obtain second data configured for transmission to a second device using a virtual general purpose input/output communication protocol. For example, the first data may include a set of I2C signals, and the second data may include a set of virtual general purpose input/output signals. In an aspect, the first device is a memory device situated in a cable that couples a host device to a remote device, and at least a portion of the physical interconnect line is configured in the cable.

The data storing circuit/module 2716 may include circuitry and/or instructions (e.g., data storing instructions 2722 stored on the storage medium 2504) adapted to store the first data in a first message register (e.g., the VGI bridge register 2128) associated with the serial bus communication protocol. The first message register is mapped to a second message register (e.g., the VGI bridge register 2134) at a second device, and the second message register is associated with the serial bus communication protocol. The data storing circuit/module 2716 may further include circuitry and/or instructions adapted to store the second data in a first register (e.g., the VGI I/O register 2126) associated with the virtual general purpose input/output communication protocol. The first register is mapped to a second register (e.g., the VGI I/O register 2150) at the second device, and the second register is associated with the virtual general purpose input/output communication protocol.

The data transmitting circuit/module 2718 may include circuitry and/or instructions (e.g., data transmitting instructions 2724 stored on the storage medium 2704) adapted to transmit the first data to the second message register at the second device through a physical interconnect line (e.g., VGI interconnect 2136) using a virtual general purpose input/output communication protocol, and to transmit the second data to the second register at the second device through the physical interconnect line using a virtual general purpose input/output communication protocol. In an aspect, the first data is tunneled to the second message register in a message associated with the virtual general purpose input/output communication protocol. In an aspect, the data transmitting circuit/module 2718 may transmit the first data by transmitting the first data using virtual general input/output signals in a first frame, and may transmit the second data by using virtual general input/output signals in a second frame. For example, the first frame includes a first header that identifies the first frame as a messaging frame, and the second frame includes a second header that identifies the second frame as a virtual general purpose input/output frame. In an aspect, at least a portion of the physical interconnect line is configured in a cable that couples a host device to a remote device.

The storage medium 2704 may represent one or more processor-readable devices for storing programming, electronic data, databases, or other digital information. The storage medium 2704 may also be used for storing data that is manipulated by the processing circuit 2710 when executing programming. The storage medium 2704 may be any available media that can be accessed by the processing circuit 2710, including portable or fixed storage devices, optical storage devices, and various other mediums capable of storing, containing and/or carrying programming. By way of example and not limitation, the storage medium 2704 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof. Thus, in some implementations, the storage medium may be a non-transitory (e.g., tangible) storage medium.

The storage medium 2704 may be coupled to the processing circuit 2710 such that the processing circuit 2710 can read information from, and write information to, the storage medium 2704. That is, the storage medium 2704 can be coupled to the processing circuit 2710 so that the storage medium 2704 is at least accessible by the processing circuit 2710, including examples where the storage medium 2704 is integral to the processing circuit 2710 and/or examples where the storage medium 2704 is separate from the processing circuit 2710.

Programming/instructions stored by the storage medium 2704, when executed by the processing circuit 2710, causes the processing circuit 2710 to perform one or more of the various functions and/or process steps described herein. For example, the storage medium 2704 may include one or more of: the data obtaining instructions 2720, data storing instructions 2722, or data transmitting instructions 2724. Thus, according to one or more aspects of the disclosure, the processing circuit 2710 is adapted to perform (in conjunction with the storage medium 2704) any or all of the processes, functions, steps and/or routines for any or all of the apparatuses described herein. As used herein, the term "adapted" in relation to the processing circuit 2710 may refer to the processing circuit 2710 being one or more of configured, employed, implemented, and/or programmed (in conjunction with the storage medium 2704) to perform a particular process, function, step and/or routine according to various features described herein.

The memory device 2708 may represent one or more memory devices and may comprise any of the memory technologies listed above or any other suitable memory technology. The memory device 2708 may store information used by one or more of the components of the apparatus 2700. The memory device 2708 also may be used for storing data that is manipulated by the processing circuit 2710 or some other component of the apparatus 2700. In some implementations, the memory device 2708 and the storage medium 2704 are implemented as a common memory component.

The user interface 2706 includes functionality that enables a user to interact with the apparatus 2700. For example, the user interface 2706 may interface with one or more user output devices (e.g., a display device, etc.) and one or more user input devices (e.g., a keyboard, a tactile input device, etc.).

With the above in mind, examples of operations according to the disclosed aspects will be described in more detail in conjunction with the flowchart of FIG. 28. For convenience, the operations of FIG. 28 (or any other operations discussed or taught herein) may be described as being performed by specific components. It should be appreciated, however, that in various implementations these operations may be performed by other types of components and may be performed using a different number of components. It also should be appreciated that one or more of the operations described herein may not be employed in a given implementation.

Figure 28:
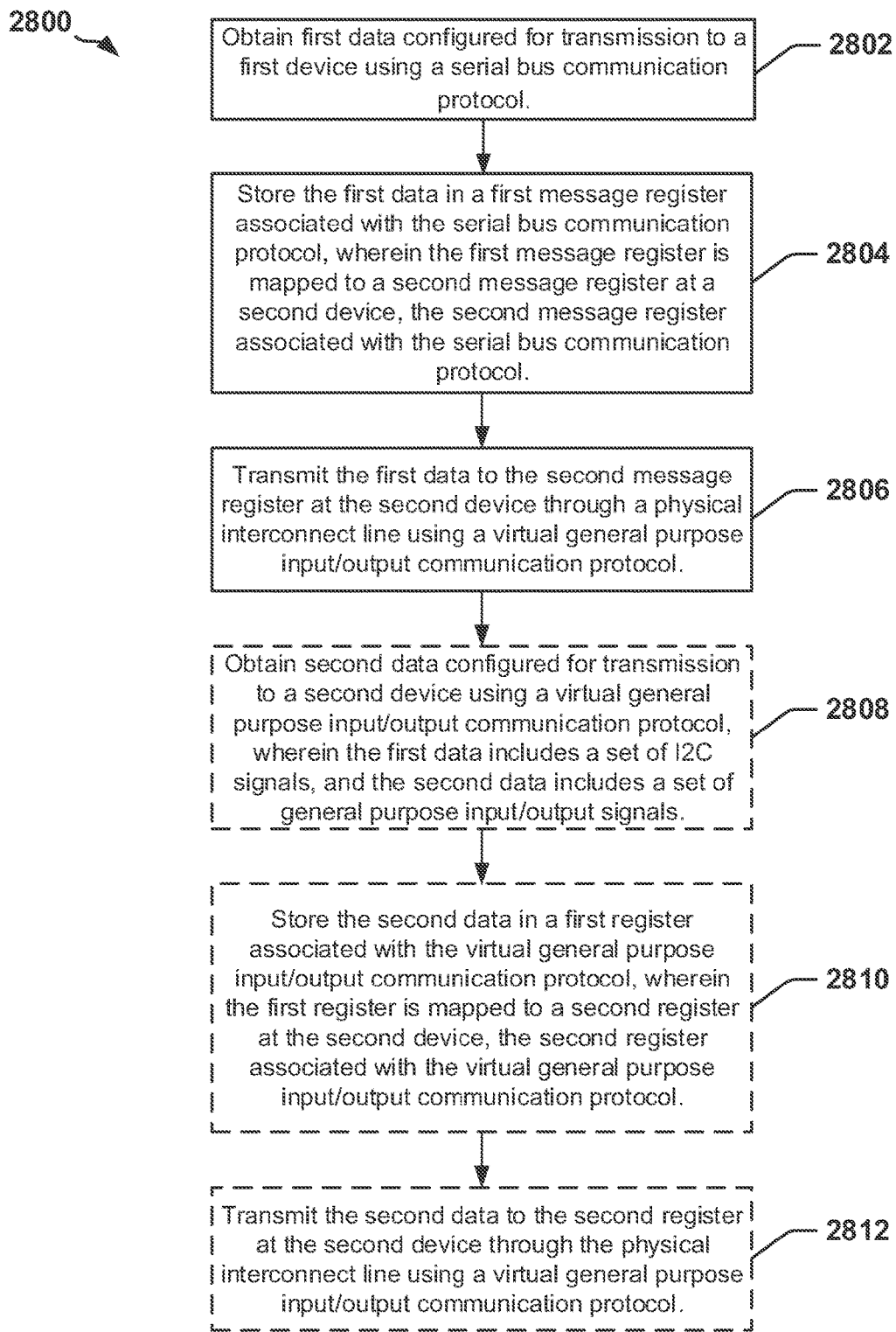
FIG. 28 is a flowchart illustrating a method for an integrated circuit.

FIG. 28 is a flowchart 2800 illustrating a method for an integrated circuit (e.g., the VGI interface 2108 or the processing circuit 2710) to enable link bridging with protocol consolidation. It should be understood that the operations in FIG. 28 represented with dashed lines represent optional operations.

The integrated circuit obtains first data configured for transmission to a first device (e.g., I2C peripheral device) using a serial bus communication protocol (e.g., I2C. I3C, or System Management Bus (SMBus)) 2802. The integrated circuit stores the first data in a first message register associated with the serial bus communication protocol, wherein the first message register is mapped to a second message register at a second device, the second message register associated with the serial bus communication protocol 2804. The integrated circuit transmits the first data to the second message register at the second device through a physical interconnect line using a virtual general purpose input/output communication protocol 2806. The integrated circuit obtains second data configured for transmission to a second device (e.g., the device A' 1804) using a virtual general purpose input/output communication protocol, wherein the first data comprises a set of I2C signals, and the second data comprises a set of virtual general purpose input/output signals 2808. The integrated circuit stores the second data in a first register associated with the virtual general purpose input/output communication protocol, wherein the first register is mapped to a second register at the second device, the second register associated with the virtual general purpose input/output communication protocol 2810. The integrated circuit transmits the second data to the second register at the second device through the physical interconnect line using a virtual general purpose input/output communication protocol 2812.

In an aspect, the first data is tunneled to the second message register in a message associated with the virtual general purpose input/output communication protocol. In an aspect, the transmitting the first data includes transmitting the first data using virtual general input/output signals in a first frame, wherein transmitting the second data comprises transmitting the second data using virtual general input/output signals in a second frame. In an aspect, the first frame includes a first header that identifies the first frame as a messaging frame, and the second frame includes a second header that identifies the second frame as a virtual general purpose input/output frame. In an aspect, at least a portion of the physical interconnect line is configured in a cable that couples a host device to a remote device. In an aspect, the first device is a memory device situated in a cable that couples a host device to a remote device, wherein at least a portion of the physical interconnect line is configured in the cable.

Third Exemplary Device and Method

Figure 29:
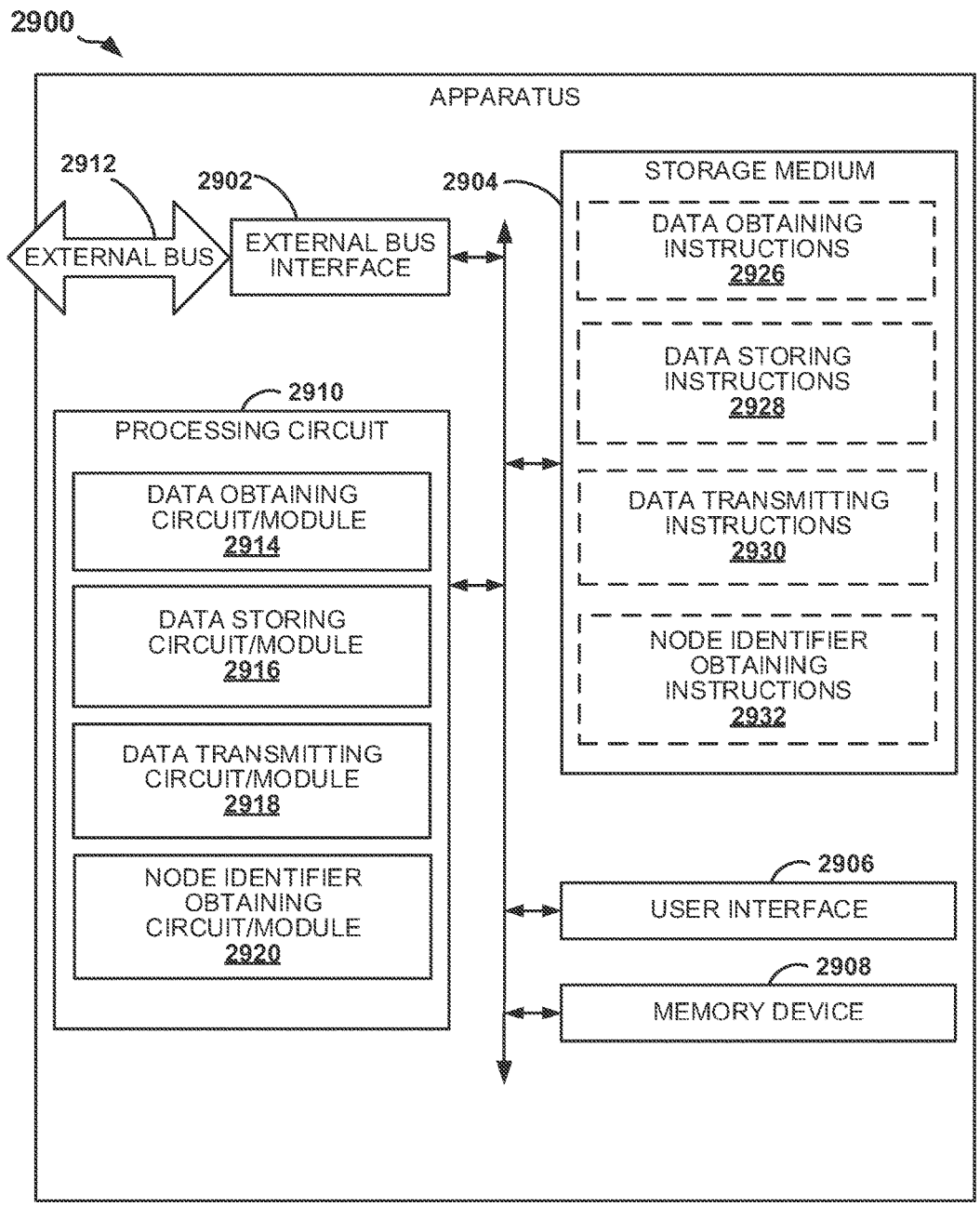
FIG. 29 is block diagram illustrating select components of an apparatus according to at least one example of the disclosure.

FIG. 29 is block diagram illustrating select components of an apparatus 2900 according to at least one example of the disclosure. The apparatus 2900 includes an external bus interface (or communication interface circuit) 2902, a storage medium 2904, a user interface 2906, a memory device 2908, and a processing circuit 2910. The processing circuit 2910 is coupled to or placed in electrical communication with each of the external bus interface 2902, the storage medium 2904, the user interface 2906, and the memory device 2908.

The external bus interface 2902 provides an interface for the components of the apparatus 2900 to an external bus 2912. The external bus interface 2902 may include, for example, one or more of: signal driver circuits, signal receiver circuits, amplifiers, signal filters, signal buffers, or other circuitry used to interface with a signaling bus or other types of signaling media.

The processing circuit 2910 is arranged to obtain, process and/or send data, control data access and storage, issue commands, and control other desired operations. The processing circuit 2910 may include circuitry adapted to implement desired programming provided by appropriate media in at least one example. In some instances, the processing circuit 2910 may include circuitry adapted to perform a desired function, with or without implementing programming. By way of example, the processing circuit 2910 may be implemented as one or more processors, one or more controllers, and/or other structure configured to execute executable programming and/or perform a desired function. Examples of the processing circuit 2910 may include a general purpose processor, a digital signal processor (DSP), an application specific integrated circuit (ASIC), a field programmable gate array (FPGA) or other programmable logic component, discrete gate or transistor logic, discrete hardware components, or any combination thereof designed to perform the functions described herein. A general purpose processor may include a microprocessor, as well as any conventional processor, controller, microcontroller, or state machine. The processing circuit 2910 may also be implemented as a combination of computing components, such as a combination of a DSP and a microprocessor, a number of microprocessors, one or more microprocessors in conjunction with a DSP core, an ASIC and a microprocessor, or any other number of varying configurations. These examples of the processing circuit 2910 are for illustration and other suitable configurations within the scope of the disclosure are also contemplated.

The processing circuit 2910 is adapted for processing, including the execution of programming, which may be stored on the storage medium 2904. As used herein, the terms "programming" or "instructions" shall be construed broadly to include without limitation instruction sets, instructions, code, code segments, program code, programs, programming, subprograms, software modules, applications, software applications, software packages, routines, subroutines, objects, executables, threads of execution, procedures, functions, etc., whether referred to as software, firmware, middleware, microcode, hardware description language, or otherwise.

In some instances, the processing circuit 2910 may include one or more of: a data obtaining circuit/module 2914, a data storing circuit/module 2916, a data transmitting circuit/module 2918, or a node identifier obtaining circuit/module 2920.

The data obtaining circuit/module 2914 may include circuitry and/or instructions (e.g., data obtaining instructions 2926 stored on the storage medium 2904) adapted to obtain first data configured for transmission to a second device using a virtual general purpose input/output communication protocol. In an aspect, data obtaining circuit/module 2914 may further obtain second data configured for transmission to an intermediate device of the one or more intermediate devices using a virtual general purpose input/output communication protocol. In an aspect, the apparatus is coupled to the second device through a cable.

The data storing circuit/module 2916 may include circuitry and/or instructions (e.g., data storing instructions 2928 stored on the storage medium 2904) adapted to store the first data in a first message tunneling register (e.g., VGI tunneling register 2424) at the apparatus. In an aspect, the data storing circuit/module 2916 may store the second data in the first message tunneling register.

The data transmitting circuit/module 2918 may include circuitry and/or instructions (e.g., data transmitting instructions 2930 stored on the storage medium 2904) adapted to transmit the first data to a second message tunneling register at the second device using a virtual general purpose input/output communication protocol. In an aspect, the first data is forwarded by one or more intermediate devices (e.g., retimers 2404, 2406) situated in the cable until the first data is received at the second message tunneling register (e.g., VGI tunneling register 2434). In an aspect, the data transmitting circuit/module 2918 may further transmit the second data and the node identifier to a third message tunneling register (e.g., VGI tunneling register 2430) at the intermediate device (e.g., retimer 2406) using a virtual general purpose input/output communication protocol. In such aspect, the second data may be forwarded by the one or more intermediate devices (e.g., retimer 2404) situated in the cable until the second data is received at the intermediate device (e.g., retimer 2406) associated with the node identifier.

The node identifier obtaining circuit/module 2920 may include circuitry and/or instructions (e.g., node identifier obtaining instructions 2932 stored on the storage medium 2904) adapted to obtain a node identifier associated with the intermediate device.

The storage medium 2904 may represent one or more processor-readable devices for storing programming, electronic data, databases, or other digital information. The storage medium 2904 may also be used for storing data that is manipulated by the processing circuit 2910 when executing programming. The storage medium 2904 may be any available media that can be accessed by the processing circuit 2910, including portable or fixed storage devices, optical storage devices, and various other mediums capable of storing, containing and/or carrying programming. By way of example and not limitation, the storage medium 2904 may include a processor-readable storage medium such as a magnetic storage device (e.g., hard disk, floppy disk, magnetic strip), an optical storage medium (e.g., compact disk (CD), digital versatile disk (DVD)), a smart card, a flash memory device (e.g., card, stick, key drive), random access memory (RAM), read only memory (ROM), programmable ROM (PROM), erasable PROM (EPROM), electrically erasable PROM (EEPROM), a register, a removable disk, and/or other mediums for storing programming, as well as any combination thereof. Thus, in some implementations, the storage medium may be a non-transitory (e.g., tangible) storage medium.

The storage medium 2904 may be coupled to the processing circuit 2910 such that the processing circuit 2910 can read information from, and write information to, the storage medium 2904. That is, the storage medium 2904 can be coupled to the processing circuit 2910 so that the storage medium 2904 is at least accessible by the processing circuit 2910, including examples where the storage medium 2904 is integral to the processing circuit 2910 and/or examples where the storage medium 2904 is separate from the processing circuit 2910.

Programming/instructions stored by the storage medium 2904, when executed by the processing circuit 2910, causes the processing circuit 2910 to perform one or more of the various functions and/or process steps described herein. For example, the storage medium 2904 may include one or more of: the data obtaining instructions 2926, data storing instructions 2928, data transmitting instructions 2930, or node identifier obtaining instructions 2932. Thus, according to one or more aspects of the disclosure, the processing circuit 2910 is adapted to perform (in conjunction with the storage medium 2904) any or all of the processes, functions, steps and/or routines for any or all of the apparatuses described herein. As used herein, the term "adapted" in relation to the processing circuit 2910 may refer to the processing circuit 2910 being one or more of configured, employed, implemented, and/or programmed (in conjunction with the storage medium 2904) to perform a particular process, function, step and/or routine according to various features described herein.

The memory device 2908 may represent one or more memory devices and may comprise any of the memory technologies listed above or any other suitable memory technology. The memory device 2908 may store information used by one or more of the components of the apparatus 2900. The memory device 2908 also may be used for storing data that is manipulated by the processing circuit 2910 or some other component of the apparatus 2900. In some implementations, the memory device 2908 and the storage medium 2904 are implemented as a common memory component.

The user interface 2906 includes functionality that enables a user to interact with the apparatus 2900. For example, the user interface 2906 may interface with one or more user output devices (e.g., a display device, etc.) and one or more user input devices (e.g., a keyboard, a tactile input device, etc.).

With the above in mind, examples of operations according to the disclosed aspects will be described in more detail in conjunction with the flowchart of FIG. 30. For convenience, the operations of FIG. 30 (or any other operations discussed or taught herein) may be described as being performed by specific components. It should be appreciated, however, that in various implementations these operations may be performed by other types of components and may be performed using a different number of components. It also should be appreciated that one or more of the operations described herein may not be employed in a given implementation.

Figure 30:
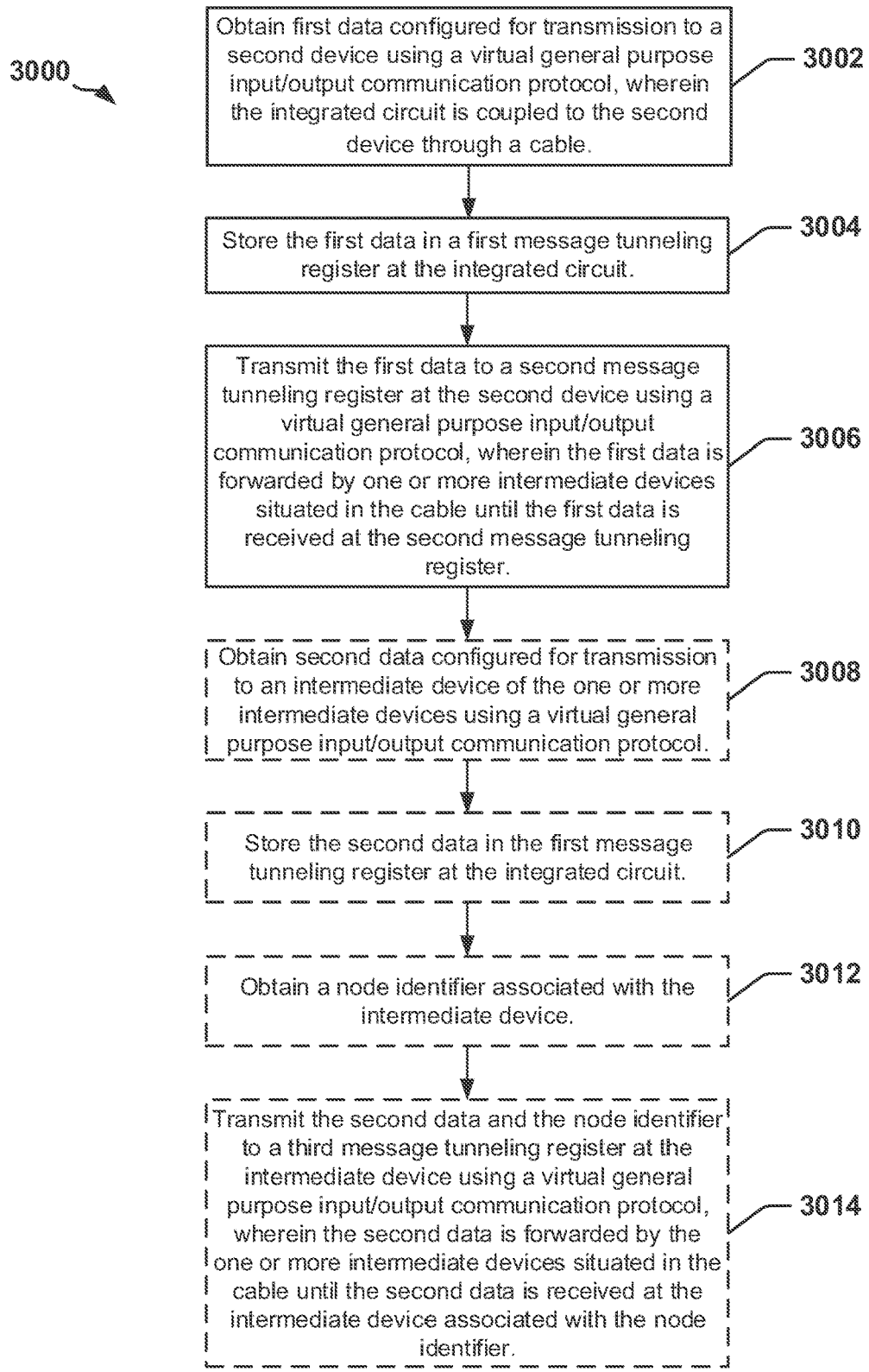
FIG. 30 is a flowchart illustrating a method for an integrated circuit.

FIG. 30 is a flowchart 3000 illustrating a method for an integrated circuit (e.g., the VGI interface 2410 or the processing circuit 2910) to enable multi-hop link tunneling without using addressing. It should be understood that the operations in FIG. 30 represented with dashed lines represent optional operations.

The integrated circuit obtains first data configured for transmission to a second device using a virtual general purpose input/output communication protocol, wherein the integrated circuit is coupled to the second device through a cable 3002. The integrated circuit stores the first data in a first message tunneling register at the integrated circuit 3004. The integrated circuit transmits the first data to a second message tunneling register at the second device using a virtual general purpose input/output communication protocol, wherein the first data is forwarded by one or more intermediate devices situated in the cable until the first data is received at the second message tunneling register 3006. The integrated circuit obtains second data configured for transmission to an intermediate device of the one or more intermediate devices using a virtual general purpose input/output communication protocol 3008. The integrated circuit stores the second data in the first message tunneling register at the integrated circuit 3010. The integrated circuit obtains a node identifier associated with the intermediate device 3012. The integrated circuit transmits the second data and the node identifier to a third message tunneling register at the intermediate device using a virtual general purpose input/output communication protocol, wherein the second data is forwarded by the one or more intermediate devices situated in the cable until the second data is received at the intermediate device associated with the node identifier 3014.

The aspects disclosed herein provide distinct interface operations over one physical link, such as link selection without protocol consolidation and link bridging with protocol consolidation. Therefore, such aspects allow operation with and without protocol consolidation. The aspects disclosed herein may avoid the use of complex source-routing schemes in PCI-SIG cable interconnections. It can be appreciated that the aspects described herein, although illustrated in context of VGI and PCI-SIG, may be applicable to other similar and/or related protocols and bus technologies. As discussed herein, the disclosed aspects overcomes the issue of legacy data-link support while eliminating the physical pins required for maintaining legacy data-links. One example includes the use of an I2C based EEPROM in many high-speed physical links (such as a PCI cable) to store cable parameters. The aspects disclosed herein eliminate the requirement of dedicated I2C interface pins on the host device and cable while absorbing the interface functionality of the same over a VGI link. It can be appreciated that the aspects disclosed herein may be applicable to any other scenario where two or more types of physical links (sharing some level of signaling similarities at the electrical level) have to be supported over a common interconnect. Moreover, the approaches described above may reduce the overall design complexity.

It is understood that the specific order or hierarchy of steps in the processes disclosed is an illustration of exemplary approaches. The specific order or hierarchy of steps in the processes may be rearranged based upon design preferences. The accompanying method claims present elements of the various steps in a sample order, and are not meant to be limited to the specific order or hierarchy presented.

As used in this application, the terms "component," "module," "system" and the like are intended to include a computer-related entity, such as, but not limited to hardware, firmware, a combination of hardware and software, software, or software in execution. For example, a component may be, but is not limited to being, a process running on a processor, a processor, an object, an executable, a thread of execution, a program and/or a computer. By way of illustration, both an application running on a computing device and the computing device can be a component. One or more components can reside within a process and/or thread of execution and a component may be localized on one computing device and/or distributed between two or more computing devices. In addition, these components can execute from various computer readable media having various data structures stored thereon. The components may communicate by way of local and/or remote processes such as in accordance with a signal having one or more data packets, such as data from one component interacting with another component in a local system, distributed system, and/or across a network such as the Internet with other systems by way of the signal.

Moreover, the term "or" is intended to mean an inclusive "or" rather than an exclusive "or." That is, unless specified otherwise, or clear from the context, the phrase "X employs A or B" is intended to mean any of the natural inclusive permutations. That is, the phrase "X employs A or B" is satisfied by any of the following instances: X employs A; X employs B; or X employs both A and B. In addition, the articles "a" and "an" as used in this application and the appended claims should generally be construed to mean "one or more" unless specified otherwise or clear from the context to be directed to a singular form.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." Unless specifically stated otherwise, the term "some" refers to one or more. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. An apparatus, comprising:
   a communication interface circuit; and
   a processing circuit configured to via the communication interface circuit:
      detect at least one of first data to be transmitted to a first device using a serial bus communication protocol or second data to be transmitted to a second device using a virtual general purpose input/output communication protocol;
      determine whether to transmit the first data or the second data;
      configure first and second physical interconnect lines coupled to the apparatus for either the serial bus communication protocol or the virtual general purpose input/output communication protocol based on the determination, wherein the first and second physical interconnect lines are respectively configured as a data line and a clock line for the serial bus communication protocol, and wherein the first and second physical interconnect lines are respectively configured as a signal transmission line and a signal reception line for the virtual general purpose input/output communication protocol; and
      transmit, through the first physical interconnect line, the first data to the first device using the serial bus communication protocol or the second data to the second device using the virtual general purpose input/output communication protocol.

2. The apparatus of claim 1, wherein the processing circuit configures the first physical interconnect line by coupling one of a first communication module that includes the first data or a second communication module that includes the second data to the first physical interconnect line.

3. The apparatus of claim 1, wherein the processing circuit determines whether to transmit the first data or the second data through the first physical interconnect line based on a priority setting.

4. The apparatus of claim 1, wherein at least a portion of the first physical interconnect line and a portion of the second physical interconnect line are configured in a cable that couples a host device to a remote device.

5. The apparatus of claim 1, wherein the first data comprises a set of I2C signals, and the second data comprises a set of general purpose input/output signals.

6. The apparatus of claim 1, wherein the processing circuit configured to
   detect the at least one of the first data to be transmitted to the first device using the serial bus communication protocol or the second data to be transmitted to the second device using the virtual general purpose input/output communication protocol is further configured to monitor a first communication module for a transmission attempt of the first data and monitor a second communication module for a transmission attempt of the second data.

7. The apparatus of claim 1, wherein the processing circuit is further configured to determine at least one of an amount of data transmitted through the first physical interconnect line during a transmission or an amount of time of the transmission; and reconfigure the first physical interconnect line coupled to the apparatus for either the serial bus communication protocol or the virtual general purpose input/output communication protocol when the amount of data exceeds a first threshold or when the amount of time exceeds a second threshold.

8. The apparatus of claim 1, wherein the processing circuit is further configured to receive, through the first physical interconnect line, third data from the first device using the serial bus communication protocol or fourth data from the second device using the virtual general purpose input/output communication protocol.

9. The apparatus of claim 8, wherein the first device is a memory device situated in a cable that couples a host device to a remote device, wherein at least a portion of the first physical interconnect line is configured in the cable, and wherein the third data is stored in the first device and comprises configuration data associated with the cable.

10. A method for an integrated circuit, comprising:

detecting at least one of first data to be transmitted to a first device using a serial bus communication protocol or second data to be transmitted to a second device using a virtual general purpose input/output communication protocol;

determining whether to transmit the first data or the second data;

configuring first and second physical interconnect lines coupled to the integrated circuit for either the serial bus communication protocol or the virtual general purpose input/output communication protocol based on the determination, wherein the first and second physical interconnect lines are respectively configured as a data line and a clock line for the serial bus communication protocol, and wherein the first and second physical interconnect lines are respectively configured as a signal transmission line and a signal reception line for the virtual general purpose input/output communication protocol; and transmitting, through the first physical interconnect line, the first data to the first device using the serial bus communication protocol or the second data to the second device using the virtual general purpose input/output communication protocol.

11. The method of claim 10, wherein configuring the first physical interconnect line comprises coupling one of a first communication module that includes the first data or a second communication module that includes the second data to the first physical interconnect line.

12. The method of claim 10, wherein the determining whether to transmit the first data or the second data through the first physical interconnect line is based on a priority setting.

13. The method of claim 10, wherein at least a portion of the first physical interconnect line is configured in a cable that couples a host device to a remote device.

14. The method of claim 10, wherein the first data comprises a set of I2C signals, and the second data comprises a set of general purpose input/output signals.

15. The method of claim 10, wherein the detecting comprises monitoring a first communication module for a transmission attempt of the first data and monitoring a second communication module for a transmission attempt of the second data.

16. The method of claim 10, further comprising:

determining at least one of an amount of data transmitted through the first physical interconnect line during a transmission or an amount of time of the transmission; and reconfiguring the first physical interconnect line coupled to the integrated circuit for either the serial bus communication protocol or the virtual general purpose input/output communication protocol when the amount of data exceeds a first threshold or when the amount of time exceeds a second threshold.

17. The method of claim 10, further comprising:

receiving, through the first physical interconnect line, third data from the first device using the serial bus communication protocol or fourth data from the second device using the virtual general purpose input/output communication protocol.

18. The method of claim 17, wherein the first device is a memory device situated in a cable that couples a host device to a remote device, wherein at least a portion of the first physical interconnect line is configured in the cable, and wherein the third data is stored in the first device and comprises configuration data associated with the cable.

19. An apparatus, comprising:

a communication interface circuit; and a processing circuit configured to via the communication interface circuit:

obtain first data configured for transmission to a first device using a serial bus communication protocol;

store the first data in a first message register associated with the serial bus communication protocol, wherein the first message register is mapped to a second message register at a second device, the second message register associated with the serial bus communication protocol; and transmit the first data to the second message register at the second device through a physical interconnect line using a virtual general purpose input/output communication protocol.

20. The apparatus of claim 19, wherein the processing circuit is further configured to obtain second data configured for transmission to the second device using the virtual general purpose input/output communication protocol, wherein the first data comprises a set of I2C signals, and the second data comprises a set of general purpose input/output signals;

store the second data in a first register associated with the virtual general purpose input/output communication protocol, wherein the first register is mapped to a second register at the second device, the second register associated with the virtual general purpose input/output communication protocol; and transmit the second data to the second register at the second device through the physical interconnect line using the virtual general purpose input/output communication protocol.

21. The apparatus of claim 19, wherein the first data is tunneled to the second message register in a message associated with the virtual general purpose input/output communication protocol.

22. The apparatus of claim 20, wherein the processing circuit is configured to transmit the first data using virtual general input/output signals in a first frame, and wherein the processing circuit is configured to transmit the second data using virtual general input/output signals in a second frame.

23. The apparatus of claim 22, wherein the first frame includes a first header that identifies the first frame as a messaging frame, and the second frame includes a second header that identifies the second frame as a virtual general purpose input/output frame.

24. The apparatus of claim 19, wherein at least a portion of the physical interconnect line is configured in a cable that couples a host device to a remote device.

25. The apparatus of claim 19, wherein the first device is a memory device situated in a cable that couples a host device to a remote device, wherein at least a portion of the physical interconnect line is configured in the cable.

26. A method for an integrated circuit, comprising:
obtaining first data configured for transmission to a first device using a serial bus communication protocol;
storing the first data in a first message register associated with the serial bus communication protocol, wherein the first message register is mapped to a second message register at a second device, the second message register associated with the serial bus communication protocol; and
transmitting the first data to the second message register at the second device through a physical interconnect line using a virtual general purpose input/output communication protocol.

27. The method of claim 26, further comprising:
obtaining second data configured for transmission to the second device using the virtual general purpose input/output communication protocol, wherein the first data comprises a set of I2C signals, and the second data comprises a set of general purpose input/output signals;
storing the second data in a first register associated with the virtual general purpose input/output communication protocol, wherein the first register is mapped to a second register at the second device, the second register associated with the virtual general purpose input/output communication protocol; and
transmitting the second data to the second register at the second device through the physical interconnect line using the virtual general purpose input/output communication protocol.

28. The method of claim 26, wherein the first data is tunneled to the second message register in a message associated with the virtual general purpose input/output communication protocol.

29. The method of claim 27, wherein transmitting the first data comprises transmitting the first data using virtual general input/output signals in a first frame, and wherein transmitting the second data comprises transmitting the second data using virtual general input/output signals in a second frame.

30. The method of claim 29, wherein the first frame includes a first header that identifies the first frame as a messaging frame, and the second frame includes a second header that identifies the second frame as a virtual general purpose input/output frame.

31. The method of claim 26, wherein at least a portion of the physical interconnect line is configured in a cable that couples a host device to a remote device.

32. The method of claim 26, wherein the first device is a memory device situated in a cable that couples a host device to a remote device, wherein at least a portion of the physical interconnect line is configured in the cable.

33. An apparatus, comprising:
a communication interface circuit; and
a processing circuit configured to via the communication interface circuit:
obtain first data configured for transmission to a second device using a virtual general purpose input/output communication protocol, wherein the apparatus is coupled to the second device through a cable;
store the first data in a first message tunneling register at the apparatus; and
transmit the first data to a second message tunneling register at the second device using the virtual general purpose input/output communication protocol, wherein the first data is forwarded by one or more intermediate devices situated in the cable until the first data is received at the second message tunneling register.

34. The apparatus of claim 33, wherein the processing circuit is further configured to
obtain second data configured for transmission to an intermediate device of the one or more intermediate devices using the virtual general purpose input/output communication protocol;
store the second data in the first message tunneling register at the apparatus;
obtain a node identifier associated with the intermediate device; and
transmit the second data and the node identifier to a third message tunneling register at the intermediate device using the virtual general purpose input/output communication protocol, wherein the second data is forwarded by the one or more intermediate devices situated in the cable until the second data is received at the intermediate device associated with the node identifier.

35. A method for an integrated circuit, comprising:
obtaining first data configured for transmission to a second device using a virtual general purpose input/output communication protocol, wherein the integrated circuit is coupled to the second device through a cable;
storing the first data in a first message tunneling register at the integrated circuit; and
transmitting the first data to a second message tunneling register at the second device using the virtual general purpose input/output communication protocol, wherein the first data is forwarded by one or more intermediate devices situated in the cable until the first data is received at the second message tunneling register.

36. The method of claim 35, further comprising:
obtaining second data configured for transmission to an intermediate device of the one or more intermediate devices using the virtual general purpose input/output communication protocol;
storing the second data in the first message tunneling register at the integrated circuit;
obtaining a node identifier associated with the intermediate device; and
transmitting the second data and the node identifier to a third message tunneling register at the intermediate device using the virtual general purpose input/output communication protocol, wherein the second data is forwarded by the one or more intermediate devices situated in the cable until the second data is received at the intermediate device associated with the node identifier.

37. A cable for enabling communication between a host device and a peripheral device, comprising:
a first device installed in the cable and situated at a first end of the cable, the first device including a first virtual general purpose input/output interface and a second virtual general purpose input/output interface, the first virtual general purpose input/output interface coupled to the host device through a first physical interconnect line;

a second device installed in the cable and situated at a second end of the cable, the second device including a third virtual general purpose input/output interface and a fourth virtual general purpose input/output interface, the fourth virtual general purpose input/output interface coupled to the peripheral device through a second physical interconnect line, wherein the first and second devices are configured to communicate along a length of the cable via the second and third virtual general purpose input/output interfaces using a virtual general purpose input/output communication protocol; and a third device installed in the cable and coupled to the first device, the third device configured to communicate with the first device using a serial bus communication protocol, wherein the first virtual general purpose input/output interface is configured to transmit, to the host device through the first physical interconnect line, data from the third device using either the serial bus communication protocol or using the virtual general purpose input/output communication protocol.

38. The cable of claim 37, wherein the serial bus communication protocol is an I2C protocol and wherein the data comprises a set of I2C signals.

39. The cable of claim 37, wherein the first device is a first retimer circuit, the second device is a second retimer circuit, and the third device is a memory device.

* * * * *